US012696082B2

(12) United States Patent
Guo et al.

(10) Patent No.: US 12,696,082 B2
(45) Date of Patent: Jul. 28, 2026

(54) KEY GENERATION METHOD AND APPARATUS

(71) Applicant: HUAWEI TECHNOLOGIES CO., LTD., Shenzhen (CN)

(72) Inventors: Longhua Guo, Shanghai (CN); Yuanping Zhu, Shanghai (CN); Li Hu, Shanghai (CN); Rong Wu, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 406 days.

(21) Appl. No.: 18/311,998

(22) Filed: May 4, 2023

(65) Prior Publication Data

US 2023/0319554 A1 Oct. 5, 2023

Related U.S. Application Data

(63) Continuation of application No. PCT/CN2020/127300, filed on Nov. 6, 2020.

(51) Int. Cl.
H04W 12/041 (2021.01)
H04W 12/069 (2021.01)

(52) U.S. Cl.
CPC ....... *H04W 12/041* (2021.01); *H04W 12/069* (2021.01)

(58) Field of Classification Search
CPC ............................ H04L 63/029; H04W 84/047
See application file for complete search history.

(56) References Cited

U.S. PATENT DOCUMENTS

2020/0267801 A1     8/2020  Jung et al.
2020/0396611 A1*   12/2020  Rajadurai ........... H04W 12/069
(Continued)

FOREIGN PATENT DOCUMENTS

CN         110536377 A     12/2019
WO       2020036527 A1      2/2020
WO       2020149653 A1      7/2020

OTHER PUBLICATIONS

3GPP TS 33.501 V16.3.0, "3rd Generation Partnership Project; Technical Specification Group Services and System Aspects; Security architecture and procedures for 5G system (Release 16)," Jul. 2020, 248 pages.
(Continued)

*Primary Examiner* — Fabricio R Murillo Garcia
(74) *Attorney, Agent, or Firm* — Fish & Richardson P.C.

(57) ABSTRACT

A key generation method and an apparatus are provided. One example key generation method includes the following steps: determining, by a communication apparatus, that a master base station or a secondary base station serves as an integrated access and backhaul (IAB) donor, wherein the master base station and the secondary base station are connected to an IAB node; and performing at least one of the following when the master base station serves as the IAB donor, generating, by the communication apparatus, an IAB key $K_{IAB}$ based on a master base station key; or when the secondary base station serves as the IAB donor, generating, by the communication apparatus, the IAB key $K_{IAB}$ based on a secondary base station key.

22 Claims, 28 Drawing Sheets

(56) References Cited

U.S. PATENT DOCUMENTS

| | | | | |
|---|---|---|---|---|
| 2021/0195539 A1* | 6/2021 | Sheng | .................. | H04W 88/14 |
| 2021/0243683 A1* | 8/2021 | Harada | ................ | H04W 24/02 |
| 2021/0314838 A1* | 10/2021 | Sheng | .................. | H04W 48/16 |
| 2021/0400532 A1* | 12/2021 | Zhou | ..................... | H04W 24/02 |
| 2025/0184724 A1* | 6/2025 | Jost | ...................... | H04L 63/062 |

OTHER PUBLICATIONS

[No Author Listed] [online], "LTE eNB—5G gNB dual connectivity (EN-DC)," Feb. 2, 2019, retrieved from URL: <http://www.eventhelix.com/5G/non-standalone-access-en-dc/en-dc-secondary-node-addition.pdf>, 6 pages.

3GPP TR 33.824 V0.6.0, "3rd Generation Partnership Project; Technical Specification Group Services and System Aspects; Study on Security for NR Integrated Access and Backhaul; (Release 16)," Nov. 2019, 22 pages.

3GPP TS 33.401 V16.3.0, "3rd Generation Partnership Project; Technical Specification Group Services and System Aspects; 3GPP System Architecture Evolution (SAE); Security architecture (Release 16)," Jul. 2020, 170 pages.

3GPP TS 33.501 V15.10.0, "3rd Generation Partnership Project; Technical Specification Group Services and System Aspects; Secu-rity architecture and procedures for 5G system (Release 15)," Sep. 2020, 192 pages.

3GPP TS 36.423 V16.3.0, "3rd Generation Partnership Project; Technical Specification Group Radio Access Network; Evolved Universal Terrestrial Radio Access Network (E-UTRAN); X2 appli-cation protocol (X2AP) (Release 16)," Sep. 2020, 496 pages.

3GPP TS 38.331 v16.2.0, "3rd Generation Partnership Project; Technical Specification Group Radio Access Network; NR; Radio Resource Control (RRC) protocol specification (Release 16)," Sep. 2020, 921 pages.

3GPP TS 38.401 V16.3.0, "3rd Generation Partnership Project; Technical Specification Group Radio Access Network; NG-RAN; Architecture description (Release 16)," Sep. 2020, 78 pages.

International Search Report and Written Opinion in International Appln. No. PCT/CN2020/127300, mailed on Aug. 4, 2021, 15 pages (with English translation).

3GPP TS 33.501 V16.4.0, "3rd Generation Partnership Project; Technical Specification Group Services and System Aspects; Secu-rity architecture and procedures for 5G system (Release 16)," Sep. 2020, 250 pages.

Extended European Search Report in European Appln No. 20960437.0, dated Oct. 30, 2023, 11 pages.

Office Action in Indian Appln. No. 202327034634, mailed on Mar. 7, 2024, 6 pages (with English translation).

* cited by examiner

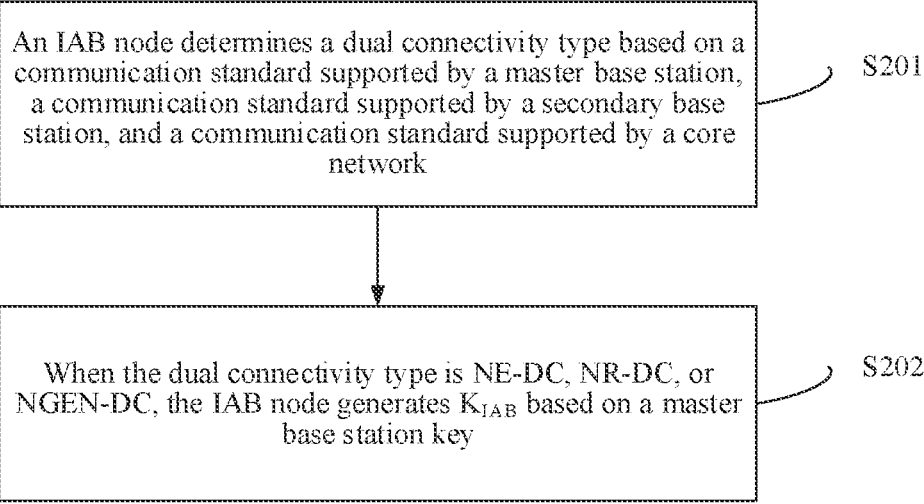

An IAB node determines a dual connectivity type based on a communication standard supported by a master base station, a communication standard supported by a secondary base station, and a communication standard supported by a core network          S201

When the dual connectivity type is NE-DC, NR-DC, or NGEN-DC, the IAB node generates $K_{IAB}$ based on a master base station key          S202

FIG. 11

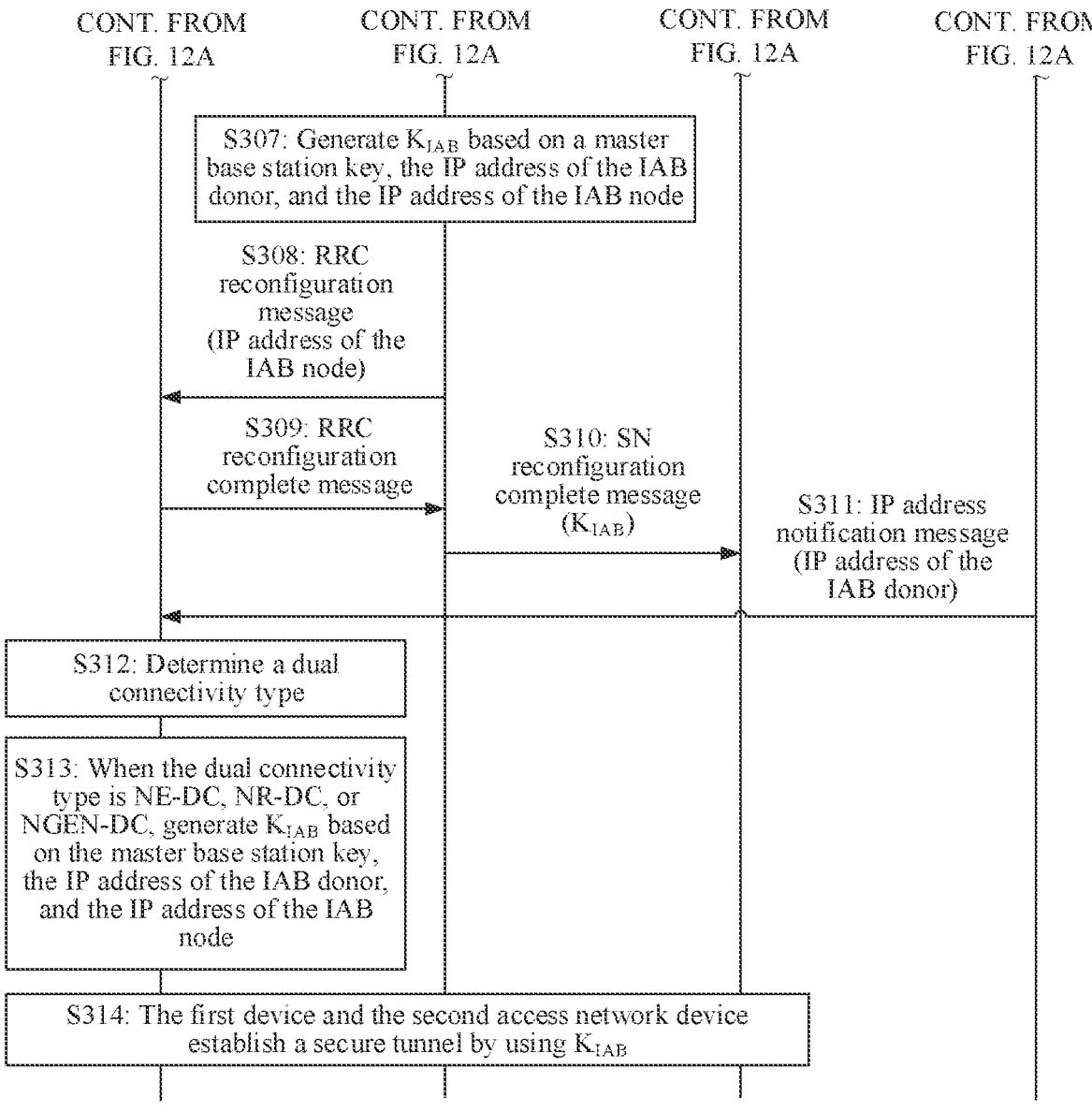

CONT. FROM
FIG. 12A

CONT. FROM
FIG. 12A

CONT. FROM
FIG. 12A

CONT. FROM
FIG. 12A

S307: Generate $K_{IAB}$ based on a master base station key, the IP address of the IAB donor, and the IP address of the IAB node S308: RRC reconfiguration message (IP address of the IAB node)

S309: RRC reconfiguration complete message

S310: SN reconfiguration complete message ($K_{IAB}$)

S311: IP address notification message (IP address of the IAB donor)

S312: Determine a dual connectivity type

S313: When the dual connectivity type is NE-DC, NR-DC, or NGEN-DC, generate $K_{IAB}$ based on the master base station key, the IP address of the IAB donor, and the IP address of the IAB node S314: The first device and the second access network device establish a secure tunnel by using $K_{IAB}$

FIG. 12B

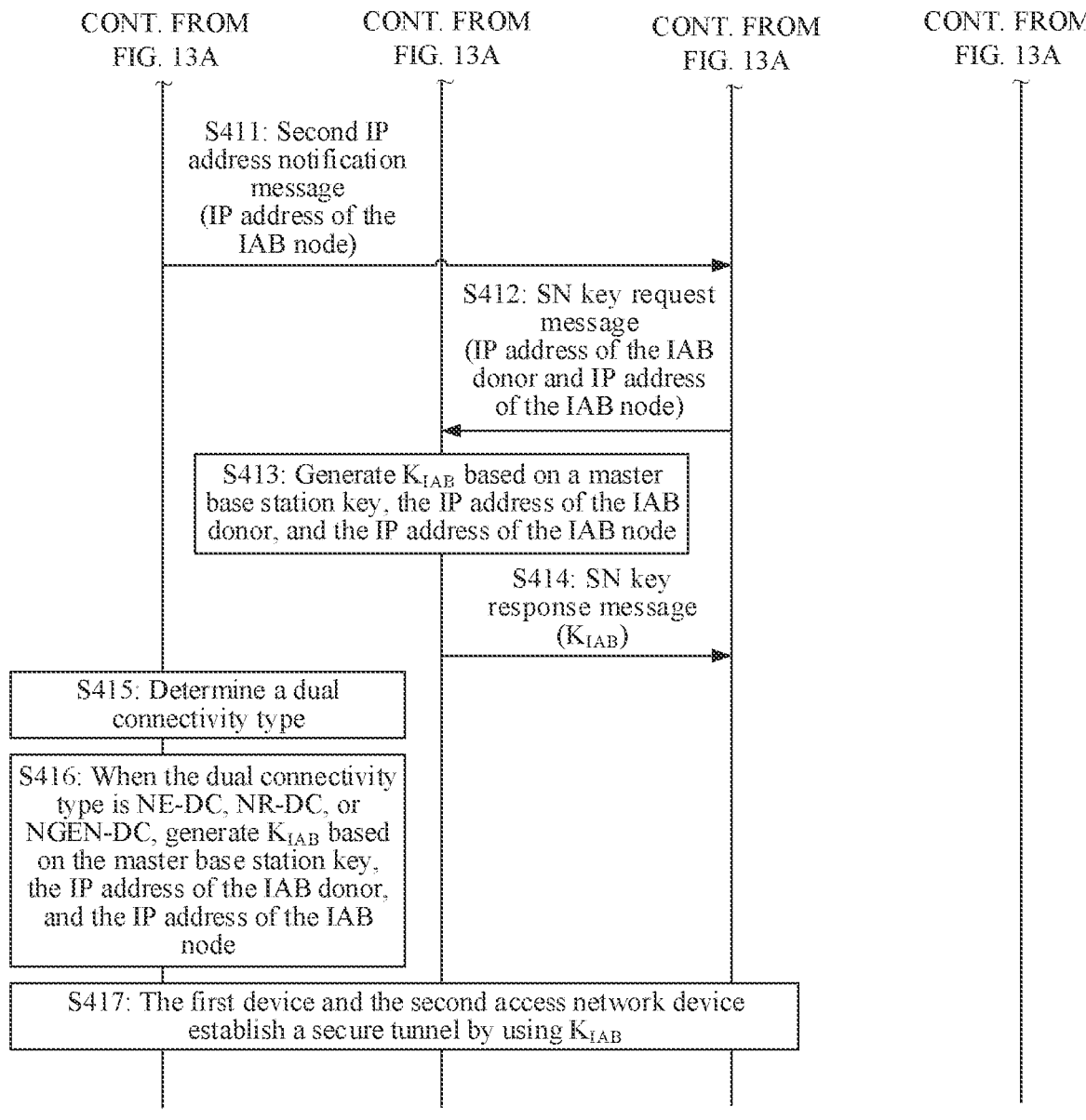

CONT. FROM
FIG. 13A

CONT. FROM
FIG. 13A

CONT. FROM
FIG. 13A

CONT. FROM
FIG. 13A

S411: Second IP
address notification
message
(IP address of the
IAB node)

S412: SN key request
message
(IP address of the IAB
donor and IP address
of the IAB node)

S413: Generate $K_{IAB}$ based on a master
base station key, the IP address of the IAB
donor, and the IP address of the IAB node S414: SN key
response message
($K_{IAB}$)

S415: Determine a dual
connectivity type

S416: When the dual connectivity
type is NE-DC, NR-DC, or
NGEN-DC, generate $K_{IAB}$ based
on the master base station key,
the IP address of the IAB donor,
and the IP address of the IAB
node S417: The first device and the second access network device
establish a secure tunnel by using $K_{IAB}$

FIG. 13B

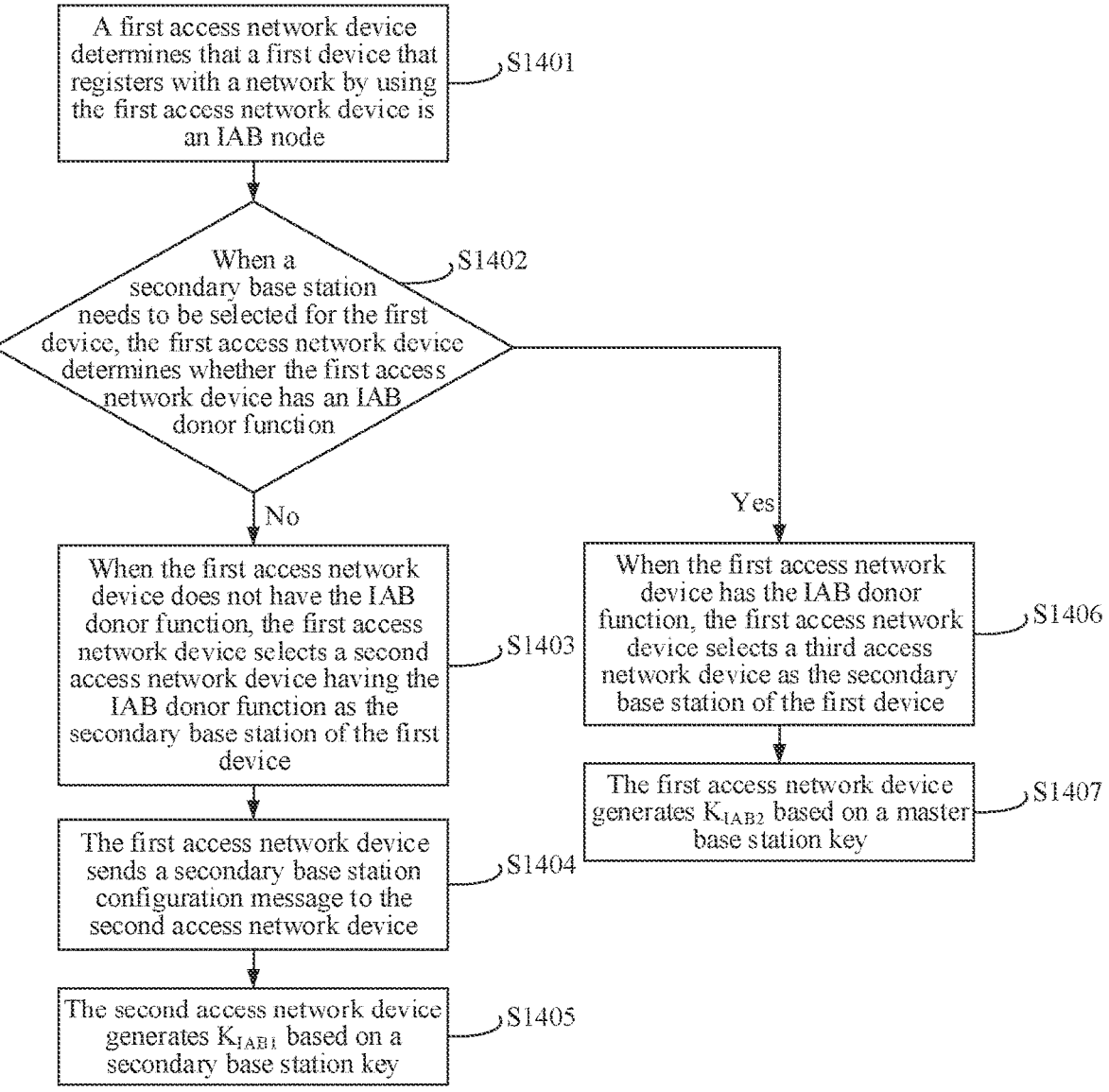

A first access network device determines that a first device that registers with a network by using the first access network device is an IAB node ──,S1401

When a secondary base station needs to be selected for the first device, the first access network device determines whether the first access network device has an IAB donor function ──,S1402

No

Yes

When the first access network device does not have the IAB donor function, the first access network device selects a second access network device having the IAB donor function as the secondary base station of the first device ──,S1403

When the first access network device has the IAB donor function, the first access network device selects a third access network device as the secondary base station of the first device ──,S1406

The first access network device sends a secondary base station configuration message to the second access network device ──,S1404

The first access network device generates $K_{IAB2}$ based on a master base station key ──,S1407

The second access network device generates $K_{IAB1}$ based on a secondary base station key ──,S1405

FIG. 23

KEY GENERATION METHOD AND APPARATUS

CROSS-REFERENCE TO RELATED APPLICATIONS

This application is a continuation of International Application No. PCT/CN2020/127300, filed on Nov. 6, 2020, the disclosure of which is hereby incorporated by reference in its entirety.

TECHNICAL FIELD

This application relates to the field of communication technologies, and in particular, to a key generation method and an apparatus.

BACKGROUND

To reduce construction burden of a wired transmission network and provide flexible and dense new radio (new radio, NR) deployment, a 5th generation (5th generation, 5G) mobile communication system uses an integrated access and backhaul (integrated access backhaul, IAB) technology. Based on the IAB technology, base stations may include an IAB node (node) and an IAB donor (donor). The IAB donor is configured to: provide a user equipment interface to a core network and support a wireless backhaul function of the IAB node. The IAB node can support wireless access of a terminal device and wireless backhaul of data. Because the IAB donor and the IAB node can exchange data through a wireless backhaul link, there is no need to lay a cable between the IAB donor and the IAB node. This facilitates more flexible IAB node deployment.

To ensure communication security of an F1 interface between the IAB node and the IAB donor, a secure tunnel (for example, an internet protocol security (internet protocol security, IPsec) secure tunnel) may be established between the IAB node and the IAB donor. In a process of establishing the secure tunnel, the IAB node and the IAB donor need to use a same IAB key $K_{IAB}$ as an authentication credential.

To ensure network coverage performance and a service transmission reliability requirement, the IAB node may be enabled to support dual connectivity (dual connectivity, DC), to cope with a possible exception of the wireless backhaul link, for example, interruption or blockage of the wireless backhaul link.

Currently, for a dual connectivity type other than evolved-universal mobile telecommunications system terrestrial radio access (evolved-universal mobile telecommunications system terrestrial radio access, EUTRA)-NR dual connectivity (EUTRA-NR dual connection, EN-DC), for example, NR-EUTRA dual connectivity (NR-EUTRA dual connection, NE-DC) or NR-DC, no solution for generating $K_{IAB}$ has been provided in the industry. Consequently, $K_{IAB}$ generated by the IAB node may be different from $K_{IAB}$ generated by the IAB donor, and therefore the security tunnel cannot be properly established between the IAB node and the IAB donor.

SUMMARY

This application provides a key generation method and an apparatus, to ensure that an IAB donor and an IAB node generate same $K_{IAB}$ in a dual connectivity scenario.

According to a first aspect, a key generation method is provided. The method includes: A first access network device determines that a first device that registers with a 5G core network by using the first access network device is an IAB node. When a secondary base station needs to be selected for the first device, the first access network device determines whether the first access network device has an IAB donor function. If the first access network device does not have the IAB donor function, the first access network device selects a second access network device having the IAB donor function as the secondary base station of the first device. The first access network device obtains a first key input parameter associated with the second access network device. The first access network device generates a first IAB key $K_{IAB1}$ based on a master base station key and the first key input parameter. The master base station key is used to perform security protection on communication between a master base station (the first access network device) and the first device, and $K_{IAB1}$ is used to establish a secure tunnel between the second access network device and the first device. The first access network device sends $K_{IAB1}$ to the second access network device.

Based on the foregoing technical solution, after an IAB node (for example, the first device) accesses the 5G core network by using the first access network device, the first access network device may select, for the first device when the first access network device does not have the IAB donor function, the second access network device having the IAB donor function as the secondary base station, to ensure that in a dual connectivity scenario, there is an access network device that serves as an IAB donor to provide a corresponding service for the first device. In addition, in a dual connectivity scenario such as NE-DC, NR-DC, or NGEN-DC, the first access network device generates the first IAB key $K_{IAB1}$ based on the master base station key and the first key input parameter, and sends $K_{IAB1}$ to the first access network device. In this way, the IAB key generated by using the master base station key is uniformly used between the IAB node and the IAB donor, to ensure that a secure tunnel can be established between the IAB node and the IAB donor by using the same IAB key as an authentication credential.

In a possible design, that the first access network device selects a second access network device having the IAB donor function as the secondary base station of the first device includes: The first access network device sends a first request message to a second device. The first request message includes an identifier of the first device. The first access network device receives a first response message sent by the second device. The first response message includes an identifier of the second access network device.

In a possible design, the first key input parameter includes a first IP address and a second IP address, the first IP address is an IP address used by the first device to communicate with an IAB donor, and the second IP address is an IP address used by the second access network device to communicate with an IAB node.

In a possible design, that the first access network device obtains a first key input parameter associated with the second access network device includes: The first access network device sends a secondary base station configuration message to the second access network device. The secondary base station configuration message is used to configure the second access network device as the secondary base station of the first device, the secondary base station configuration message includes first indication information and/or second indication information, the first indication information is used to request the first IP address, and the second indication information is used to request the second IP address. The first access network device receives a secondary base station configuration response message sent by the second access network device. The secondary base station configuration response message includes the first IP address and/or the second IP address. Based on this design, when the second access network device is responsible for assigning the first IP address, the first access network device obtains the first key input parameter by reusing an existing procedure, so that signaling overheads are reduced, and an operation procedure is simplified.

In a possible design, the secondary base station configuration message includes a secondary base station key derived from the master base station key, and the secondary base station key is used to perform security protection on communication between the secondary base station and the first device.

In a possible design, the key generation method further includes: The first access network device sends the first IP address to the first device.

In a possible design, that the first access network device obtains a first key input parameter associated with the second access network device includes: The first access network device receives an IP address notification message sent by the first device. The IP address notification message includes the first IP address. The first access network device sends a secondary base station configuration message to the second access network device. The secondary base station configuration message is used to configure the second access network device as the secondary base station of the first device, the secondary base station configuration message includes second indication information, and the second indication information is used to request the second IP address. The first access network device receives a secondary base station configuration response message sent by the second access network device. The secondary base station configuration response message includes the second IP address. Based on this design, when the second device is responsible for assigning the first IP address, the first access network device may obtain the first IP address by using the first device, and obtain the second IP address by using the second access network device.

In a possible design, the key generation method further includes: If the first access network device has the IAB donor function, the first access network device selects a third access network device as the secondary base station of the first device. The first access network device obtains a second key input parameter associated with the first access network device. The first access network device generates a second IAB key $K_{IAB2}$ based on the master base station key and the second key input parameter. $K_{IAB2}$ is used to establish a secure tunnel between the first access network device and the first device.

In a possible design, the second key input parameter includes the first IP address and a third IP address, the first IP address is the IP address used by the first device to communicate with the IAB donor, and the third IP address is an IP address used by the first access network device to communicate with the IAB node.

In a possible design, that the first access network device obtains a second key input parameter associated with the first access network device includes: The first access network device assigned the first IP address to the first device. The first access network device obtains the third IP address from a database.

In a possible design, that the first access network device obtains a second key input parameter associated with the first access network device includes: The first access network device receives an IP address notification message sent by the first device. The IP address notification message includes the first IP address. The first access network device obtains the third IP address from a database.

According to a second aspect, a key generation method is provided. The method includes: A second access network device receives a secondary base station configuration message sent by a first access network device. The secondary base station configuration message is used to configure the second access network device as a secondary base station of a first device. When the secondary base station configuration message includes third indication information, the second access network device determines whether the second access network device has an IAB donor function. The third indication information indicates that the first device is an IAB node. When the second access network device has the IAB donor function, the second access network device obtains a first IAB key $K_{IAB1}$ from the first access network device. $K_{IAB1}$ is used to establish a secure tunnel between the second access network device and the first device, $K_{IAB1}$ is generated based on a master base station key, and the master base station key is used to perform security protection on communication between the first access network device and the first device.

Based on the foregoing technical solution, the second access network device having the IAB donor function serves as the secondary base station of the first device, to ensure that in a dual connectivity scenario, there is an access network device that serves as an IAB donor to provide a corresponding service for an IAB node (namely, the first device). The second access network device receives $K_{IAB1}$ sent by the first access network device, so that the IAB key generated by using the master base station key is uniformly used between the IAB node and the IAB donor, thereby ensuring that a secure tunnel can be established between the IAB node and the IAB donor by using the same IAB key as an authentication credential.

In a possible design, that $K_{IAB1}$ is generated based on a master base station key includes: $K_{IAB1}$ is generated based on the master base station key and a first key input parameter. The first key input parameter includes a first IP address and a second IP address, the first IP address is an IP address used by the first device to communicate with an IAB donor, and the second IP address is an IP address used by the second access network device to communicate with an IAB node.

In a possible design, the secondary base station configuration message further includes first indication information and/or second indication information, the first indication information is used to request the first IP address, and the second indication information is used to request the second IP address.

In a possible design, the key generation method further includes: The second access network device sends a secondary base station configuration response message to the first access network device. The secondary base station configuration response message includes the first IP address and/or the second IP address.

In a possible design, that the second access network device obtains $K_{IAB1}$ from the first access network device includes: The second access network device receives a secondary base station reconfiguration complete message sent by the first access network device. The secondary base station reconfiguration complete message includes $K_{IAB1}$.

In a possible design, that the second access network device obtains $K_{IAB1}$ from the first access network device includes: The second access network device sends a key request message to the first access network device. The key request message is used to request $K_{IAB1}$. The second access network device receives a key response message sent by the first access network device. The key response message includes $K_{IAB1}$.

In a possible design, the key request message further includes the first IP address and/or the second IP address.

According to a third aspect, a key generation method is provided. The method is applied to a scenario in which a first device is connected to a master base station and a secondary base station. The first device has an IAB node function. The key generation method includes: The first device determines a dual connectivity type based on a communication standard supported by the master base station, a communication standard supported by the secondary base station, and a communication standard supported by a core network. When the dual connectivity type is NE-DC, NR-DC, or NGEN-DC, the first device generates an IAB key $K_{IAB}$ based on a master base station key. The master base station key is used to perform security protection on communication security between the first device and the master base station.

Based on the foregoing technical solution, an IAB node determines the dual connectivity type, so that in an NE-DC, NR-DC, or NGEN-DC scenario, the IAB node generates the IAB key $K_{IAB}$ by using the master base station key, so that the IAB key generated by using the master base station key is uniformly used between the IAB node and an IAB donor, thereby ensuring that a secure tunnel can be established between the IAB node and the IAB donor by using the same IAB key as an authentication credential.

In a possible design, the key generation method further includes: The first device receives a broadcast message from the master base station. The first device determines, based on a configuration parameter in the broadcast message, the communication standard supported by the master base station. The configuration parameter includes one or more of the following: a base station identifier, a logical cell identifier, a physical cell identifier, an uplink frequency, or a downlink frequency.

In a possible design, that the first device determines, based on a configuration parameter in the broadcast message, the communication standard supported by the master base station includes: When the configuration parameter in the broadcast message belongs to a 5G communication system, the first device determines that the master base station supports a 5G communication standard; or when the configuration parameter in the broadcast message belongs to a 4G communication system, the first device determines that the master base station supports a 4G communication standard.

In a possible design, the key generation method further includes: The first device receives an RRC reconfiguration message sent by the master base station. The RRC reconfiguration message includes secondary cell group configuration information. The first device determines, based on the secondary cell group configuration information, the communication standard supported by the secondary base station.

In a possible design, that the first device determines, based on the RRC reconfiguration message, the communication standard supported by the secondary base station includes: When the secondary cell group configuration information belongs to a 5G communication standard, the first device determines that the secondary base station supports the 5G communication standard; or when the secondary cell group configuration information belongs to a 4G communication standard, the first device determines that the secondary base station supports the 4G communication standard.

In a possible design, the key generation method further includes: The first device receives a broadcast message sent by the master base station. The first device determines, based on cell configuration information in the broadcast message, the communication standard supported by the core network.

In a possible design, that the first device determines, based on cell configuration information in the broadcast message, the communication standard supported by the core network includes: When the cell configuration information belongs to a 5G communication standard, the first device determines that the core network supports the 5G communication standard; or when the cell configuration information belongs to a 4G communication standard, the first device determines that the core network supports the 4G communication standard.

In a possible design, that the first device determines a dual connectivity type based on a communication standard supported by the master base station, a communication standard supported by the secondary base station, and a communication standard supported by a core network includes: When the master base station supports the 5G network standard, the secondary base station supports the 4G network standard, and the core network supports the 5G network standard, the first device determines that the dual connectivity type is NE-DC; or when the master base station supports the 5G network standard, the secondary base station supports the 5G network standard, and the core network supports the 5G network standard, the first device determines that the dual connectivity type is NR-DC; or when the master base station supports the 4G network standard, the secondary base station supports the 5G network standard, and the core network supports the 5G network standard, the first device determines that the dual connectivity type is NGEN-DC; or when the master base station supports the 4G network standard, the secondary base station supports the 5G network standard, and the core network supports the 4G network standard, the first device determines that the dual connectivity type is EN-DC.

According to a fourth aspect, a key generation method is provided. The method includes: A first access network device determines that a first device that registers with a network by using the first access network device is an IAB node. If the first access network device has an IAB donor function, the first access network device selects a third access network device as a secondary base station of the first device. The first access network device generates a second IAB key $K_{IAB2}$ based on a secondary base station key. $K_{IAB2}$ is used to establish a secure tunnel between the first access network device and the first device, and the secondary base station key is used to perform security protection on communication between the secondary base station and the first device.

Based on the foregoing technical solution, because the first access network device determines that the first device is an IAB node, and the first access network device has the IAB donor function, the first access network device may serve as an IAB donor of the first device. Further, in a dual connectivity scenario, the first access network device generates $K_{IAB2}$ based on the secondary base station key, so that it is ensured that the IAB key generated by using the secondary base station key is uniformly used between the IAB node and the IAB donor, thereby ensuring that a secure tunnel can be established between the IAB node and the IAB donor by using the same IAB key as an authentication credential.

In a possible design, the secondary base station key is derived from a master base station key, and the master base station key is used to perform security protection on communication between the first access network device and the first device.

In a possible design, after the first access network device generates $K_{IAB2}$ based on the secondary base station key, the method further includes: The first access network device sends a secondary base station configuration message to a second access network device. The secondary base station configuration message includes the secondary base station key. The first access network device receives a secondary base station configuration response message sent by the second access network device.

In a possible design, that the first access network device generates $K_{IAB2}$ based on a secondary base station key includes: The first access network device generates $K_{IAB2}$ based on the secondary base station key after sending the secondary base station configuration message.

In a possible design, that the first access network device generates $K_{IAB2}$ based on a secondary base station key includes: The first access network device generates $K_{IAB2}$ based on the secondary base station key after receiving the secondary base station configuration response message.

In a possible design, the key generation method further includes: If the first access network device does not have the IAB donor function, the first access network device selects the second access network device having the IAB donor function as the secondary base station of the first device. The first access network device sends the secondary base station configuration message to the second access network device. The secondary base station configuration message includes the secondary base station key.

According to a fifth aspect, a key generation method is provided. The method is applied to a scenario in which a first device is connected to a master base station and a secondary base station. The first device has an IAB node function. The key generation method includes: The first device determines a dual connectivity type based on a communication standard supported by the master base station, a communication standard supported by the secondary base station, and a communication standard supported by a core network. When the dual connectivity type is NE-DC, NR-DC, or NGEN-DC, the first device generates an IAB key $K_{IAB}$ based on a secondary base station key. The secondary base station key is used to perform security protection on communication security between the first device and the secondary base station.

Based on the foregoing technical solution, an IAB node determines the dual connectivity type, so that in an NE-DC, NR-DC, or NGEN-DC scenario, the IAB node generates the IAB key $K_{IAB}$ by using the secondary base station key, so that the IAB key generated by using the secondary base station key is uniformly used between the IAB node and an IAB donor, thereby ensuring that a secure tunnel can be established between the IAB node and the IAB donor by using the same IAB key as an authentication credential.

In a possible design, the key generation method further includes: The first device receives a broadcast message from the master base station. The first device determines, based on a configuration parameter in the broadcast message, the communication standard supported by the master base station. The configuration parameter includes one or more of the following: a base station identifier, a logical cell identifier, a physical cell identifier, an uplink frequency, or a downlink frequency.

In a possible design, that the first device determines, based on a configuration parameter in the broadcast message, the communication standard supported by the master base station includes: When the configuration parameter in the broadcast message belongs to a 5G communication system, the first device determines that the master base station supports a 5G communication standard; or when the configuration parameter in the broadcast message belongs to a 4G communication system, the first device determines that the master base station supports a 4G communication standard.

In a possible design, the key generation method further includes: The first device receives an RRC reconfiguration message sent by the master base station. The RRC reconfiguration message includes secondary cell group configuration information. The first device determines, based on the secondary cell group configuration information, the communication standard supported by the secondary base station.

In a possible design, that the first device determines, based on the RRC reconfiguration message, the communication standard supported by the secondary base station includes: When the secondary cell group configuration information belongs to a 5G communication standard, the first device determines that the secondary base station supports the 5G communication standard; or when the secondary cell group configuration information belongs to a 4G communication standard, the first device determines that the secondary base station supports the 4G communication standard.

In a possible design, the key generation method further includes: The first device receives a broadcast message sent by the master base station. The first device determines, based on cell configuration information in the broadcast message, the communication standard supported by the core network.

In a possible design, that the first device determines, based on cell configuration information in the broadcast message, the communication standard supported by the core network includes: When the cell configuration information belongs to a 5G communication standard, the first device determines that the core network supports the 5G communication standard; or when the cell configuration information belongs to a 4G communication standard, the first device determines that the core network supports the 4G communication standard.

In a possible design, that the first device determines a dual connectivity type based on a communication standard supported by the master base station, a communication standard supported by the secondary base station, and a communication standard supported by a core network includes: When the master base station supports the 5G network standard, the secondary base station supports the 4G network standard, and the core network supports the 5G network standard, the first device determines that the dual connectivity type is NE-DC; or when the master base station supports the 5G network standard, the secondary base station supports the 5G network standard, and the core network supports the 5G network standard, the first device determines that the dual connectivity type is NR-DC; or when the master base station supports the 4G network standard, the secondary base station supports the 5G network standard, and the core network supports the 5G network standard, the first device determines that the dual connectivity type is NGEN-DC; or when the master base station supports the 4G network standard, the secondary base station supports the 5G network standard, and the core network supports the 4G network standard, the first device determines that the dual connectivity type is EN-DC.

According to a sixth aspect, a key generation method is provided. The method is applied to a scenario in which a first device is connected to a master base station and a secondary base station. The first device has an IAB node function. The key generation method includes: The first device learns that the master base station or the secondary base station serves as an IAB donor. When the master base station is an IAB donor, the first device generates an IAB key based on a master base station key and a key input parameter, where the IAB key is used to establish a secure tunnel between an IAB node and the IAB donor, and the master base station key is used to perform security protection on communication between the first device and the master base station; or when the secondary base station is an IAB donor, the first device generates an IAB key based on a secondary base station key and a key input parameter, where the secondary base station key is used to perform security protection on communication between the first device and the secondary base station.

Based on the foregoing technical solution, when the master base station serves as an IAB donor, it is ensured that both the IAB node and the IAB donor generate IAB keys by using the master base station key. When the secondary base station serves as an IAB donor, it is ensured that both the IAB node and the IAB donor generate IAB keys by using the secondary base station key. In this way, it is ensured that in a dual connectivity scenario, a secure tunnel can be established between the IAB donor and the IAB node by using a same IAB key as an authentication credential.

In a possible design, that the first device learns that the master base station or the secondary base station serves as an IAB donor includes: When the first device receives fourth indication information, the first device learns that the master base station is an IAB donor, where the fourth indication information indicates that the master base station is an IAB donor; or when the first device receives fifth indication information, the first device learns that the secondary base station is an IAB donor, where the fifth indication information indicates that the secondary base station is an IAB donor.

In a possible design, that the first device learns that the master base station or the secondary base station serves as an IAB donor includes: When a wireless backhaul link is established between the first device and the master base station, the first device learns that the master base station is an IAB donor; or when a wireless backhaul link is established between the first device and the secondary base station, the first device learns that the secondary base station is an IAB donor.

In a possible design, that the first device learns that the master base station or the secondary base station serves as an IAB donor includes: The first device obtains a frequency band supported by the master base station and a frequency band supported by the secondary base station; and when the frequency band supported by the master base station is greater than the frequency band supported by the secondary base station, the first device learns that the master base station is an IAB donor; or when the frequency band supported by the master base station is less than the frequency band supported by the secondary base station, the first device learns that the secondary base station is an IAB donor.

In a possible design, that the first device learns that the master base station or the secondary base station serves as an IAB donor includes: When the first device receives sixth indication information broadcast by the master base station, the first device learns that the master base station is an IAB donor; or when the first device receives sixth indication information broadcast by the secondary base station, the first device learns that the secondary base station is an IAB donor. The sixth indication information indicates that a base station has an IAB donor function.

According to a seventh aspect, a communication apparatus is provided. The apparatus is applied to a first access network device. The communication apparatus includes a processing module and a communication module. The processing module is configured to: determine that a first device that registers with a 5G core network is an IAB node; when a secondary base station needs to be selected for the first device, determine whether the communication apparatus has an IAB donor function; if the communication apparatus does not have the IAB donor function, select a second access network device having the IAB donor function as the secondary base station of the first device; obtain a first key input parameter associated with the second access network device; and generate a first IAB key $K_{IAB1}$ based on a master base station key and the first key input parameter. The master base station key is used to perform security protection on communication between a master base station (the first access network device) and the first device, and $K_{IAB1}$ is used to establish a secure tunnel between the second access network device and the first device. The communication module is configured to send $K_{IAB1}$ to the second access network device.

In a possible design, the communication module is further configured to: send a first request message to a second device, where the first request message includes an identifier of the first device; and receive a first response message sent by the second device, where the first response message includes an identifier of the second access network device.

In a possible design, the first key input parameter includes a first IP address and a second IP address, the first IP address is an IP address used by the first device to communicate with an IAB donor, and the second IP address is an IP address used by the second access network device to communicate with an IAB node.

In a possible design, the communication module is configured to: send a secondary base station configuration message to the second access network device, where the secondary base station configuration message is used to configure the second access network device as the secondary base station of the first device, the secondary base station configuration message includes first indication information and/or second indication information, the first indication information is used to request the first IP address, and the second indication information is used to request the second IP address; and receive a secondary base station configuration response message sent by the second access network device, where the secondary base station configuration response message includes the first IP address and/or the second IP address.

In a possible design, the secondary base station configuration message includes a secondary base station key derived from the master base station key, and the secondary base station key is used to perform security protection on communication between the secondary base station and the first device.

In a possible design, the communication module is further configured to send the first IP address to the first device.

In a possible design, the communication module is further configured to: receive an IP address notification message sent by the first device, where the IP address notification message includes the first IP address; send a secondary base station configuration message to the second access network device, where the secondary base station configuration message is used to configure the second access network device as the secondary base station of the first device, the secondary base station configuration message includes second indication information, and the second indication information is used to request the second IP address; and receive a secondary base station configuration response message sent by the second access network device, where the secondary base station configuration response message includes the second IP address.

In a possible design, the processing module is further configured to: if the communication apparatus has the IAB donor function, select a third access network device as the secondary base station of the first device; obtain a second key input parameter associated with the first access network device; and generate a second IAB key $K_{IAB2}$ based on the master base station key and the second key input parameter. $K_{IAB2}$ is used to establish a secure tunnel between the communication apparatus and the first device.

In a possible design, the second key input parameter includes the first IP address and a third IP address, the first IP address is the IP address used by the first device to communicate with the IAB donor, and the third IP address is an IP address used by the first access network device to communicate with the IAB node.

In a possible design, the processing module is further configured to: assign the first IP address to the first device; and obtain the third IP address from a database.

In a possible design, the communication module is further configured to receive an IP address notification message sent by the first device. The IP address notification message includes the first IP address. The processing module is further configured to obtain the third IP address from a database.

According to an eighth aspect, a communication apparatus is provided. The apparatus is applied to a second access network device. The communication apparatus includes a communication module and a processing module. The communication module is configured to receive a secondary base station configuration message sent by a first access network device. The secondary base station configuration message is used to configure the second access network device as a secondary base station of a first device. The processing module is configured to: when the secondary base station configuration message includes third indication information, determine whether the communication apparatus has an IAB donor function. The third indication information indicates that the first device is an IAB node. The communication module is further configured to: when the communication apparatus has the IAB donor function, obtain a first IAB key $K_{IAB1}$ from the first access network device. $K_{IAB1}$ is used to establish a secure tunnel between the second access network device and the first device, $K_{IAB1}$ is generated based on a master base station key, and the master base station key is used to perform security protection on communication between the first access network device and the first device.

In a possible design, that $K_{IAB1}$ is generated based on a master base station key includes: $K_{IAB1}$ is generated based on the master base station key and a first key input parameter. The first key input parameter includes a first IP address and a second IP address, the first IP address is an IP address used by the first device to communicate with an IAB donor, and the second IP address is an IP address used by the second access network device to communicate with an IAB node.

In a possible design, the secondary base station configuration message further includes first indication information and/or second indication information, the first indication information is used to request the first IP address, and the second indication information is used to request the second IP address.

In a possible design, the communication module is further configured to send a secondary base station configuration response message to the first access network device. The secondary base station configuration response message includes the first IP address and/or the second IP address.

In a possible design, the communication module is specifically configured to receive a secondary base station reconfiguration complete message sent by the first access network device. The secondary base station reconfiguration complete message includes $K_{IAB1}$.

In a possible design, the communication module is specifically configured to: send a key request message to the first access network device, where the key request message is used to request $K_{IAB1}$; and receive a key response message sent by the first access network device, where the key response message includes $K_{IAB1}$.

In a possible design, the key request message further includes the first IP address and/or the second IP address.

According to a ninth aspect, a communication apparatus is provided. The apparatus is applied to a first device. The communication apparatus includes a processing module. The processing module is configured to: determine a dual connectivity type based on a communication standard supported by a master base station, a communication standard supported by a secondary base station, and a communication standard supported by a core network; and when the dual connectivity type is NE-DC, NR-DC, or NGEN-DC, generate $K_{IAB}$ based on a master base station key and a key input parameter. The master base station key is used to perform security protection on communication security between the first device and the master base station.

In a possible design, the communication apparatus further includes a communication module. The communication module is configured to receive a broadcast message from the master base station. The processing module is further configured to determine, based on a configuration parameter in the broadcast message, the communication standard supported by the master base station. The configuration parameter includes one or more of the following: a base station identifier, a logical cell identifier, a physical cell identifier, an uplink frequency, or a downlink frequency.

In a possible design, the processing module is specifically configured to: when the configuration parameter in the broadcast message belongs to a 5G communication system, determine that the master base station supports a 5G communication standard; or when the configuration parameter in the broadcast message belongs to a 4G communication system, determine that the master base station supports a 4G communication standard.

In a possible design, the communication apparatus further includes a communication module. The communication module is configured to receive an RRC reconfiguration message sent by the master base station. The RRC reconfiguration message includes secondary cell group configuration information. The processing module is configured to determine, based on the secondary cell group configuration information, the communication standard supported by the secondary base station.

In a possible design, the processing module is specifically configured to: when the secondary cell group configuration information belongs to a 5G communication standard, determine that the secondary base station supports the 5G communication standard; or when the secondary cell group configuration information belongs to a 4G communication standard, determine that the secondary base station supports the 4G communication standard.

In a possible design, the communication apparatus further includes a communication module. The communication module is configured to receive a broadcast message sent by the master base station. The processing module is configured to determine, based on cell configuration information in the broadcast message, the communication standard supported by the core network.

In a possible design, the processing module is specifically configured to: when the cell configuration information belongs to a 5G communication standard, determine that the core network supports the 5G communication standard; or when the cell configuration information belongs to a 4G communication standard, determine that the core network supports the 4G communication standard.

In a possible design, the processing module is specifically configured to: when the master base station supports the 5G network standard, the secondary base station supports the 4G network standard, and the core network supports the 5G network standard, determine that the dual connectivity type is NE-DC; or when the master base station supports the 5G network standard, the secondary base station supports the 5G network standard, and the core network supports the 5G network standard, determine that the dual connectivity type is NR-DC; or when the master base station supports the 4G network standard, the secondary base station supports the 5G network standard, and the core network supports the 5G network standard, determine that the dual connectivity type is NGEN-DC; or when the master base station supports the 4G network standard, the secondary base station supports the 5G network standard, and the core network supports the 4G network standard, determine that the dual connectivity type is EN-DC.

According to a tenth aspect, a communication apparatus is provided. The apparatus is applied to a first access network device. The communication apparatus includes a processing module. The processing module is configured to: determine that a first device that registers with a network is an IAB node; when a secondary base station needs to be selected for the first device, determine whether the communication apparatus has an IAB donor function; if the communication apparatus has the IAB donor function, select a third access network device as the secondary base station of the first device; and generate an IAB key $K_{IAB}$ based on a secondary base station key. $K_{IAB}$ is used to establish a secure tunnel between the communication apparatus and the first device, and the secondary base station key is used to perform security protection on communication between the secondary base station and the first device.

In a possible design, the secondary base station key is derived from a master base station key, and the master base station key is used to perform security protection on communication between the first access network device and the first device.

In a possible design, the communication apparatus further includes a communication module. The communication module is configured to send a secondary base station configuration message to a second access network device after the processing module generates $K_{IAB}$, where the secondary base station configuration message includes the secondary base station key; and receive a secondary base station configuration response message sent by the second access network device.

In a possible design, the processing module is specifically configured to generate $K_{IAB}$ based on the secondary base station key after the communication module sends the secondary base station configuration message.

In a possible design, the processing module is specifically configured to generate $K_{IAB}$ based on the secondary base station key after the secondary base station configuration response message is received.

In a possible design, the processing module is further configured to: if the communication apparatus does not have the IAB donor function, select the second access network device having the IAB donor function as the secondary base station of the first device; and send the secondary base station configuration message to the second access network device. The secondary base station configuration message includes the secondary base station key.

According to an eleventh aspect, a communication apparatus is provided. The apparatus is applied to a first device. The communication apparatus includes a processing module. The processing module is configured to: determine a dual connectivity type based on a communication standard supported by a master base station, a communication standard supported by a secondary base station, and a communication standard supported by a core network; and when the dual connectivity type is NE-DC, NR-DC, or NGEN-DC, generate $K_{IAB}$ based on a secondary base station key. The secondary base station key is used to perform security protection on communication security between the first device and the secondary base station.

In a possible design, the communication apparatus further includes communication module. The communication module is configured to receive a broadcast message from the master base station. The processing module is further configured to determine, based on a configuration parameter in the broadcast message, the communication standard supported by the master base station. The configuration parameter includes one or more of the following: a base station identifier, a logical cell identifier, a physical cell identifier, an uplink frequency, or a downlink frequency.

In a possible design, the processing module is specifically configured to: when the configuration parameter in the broadcast message belongs to a 5G communication system, determine that the master base station supports a 5G communication standard; or when the configuration parameter in the broadcast message belongs to a 4G communication system, determine that the master base station supports a 4G communication standard.

In a possible design, the communication apparatus further includes a communication module. The communication module is configured to receive an RRC reconfiguration message sent by the master base station. The RRC reconfiguration message includes secondary cell group configuration information. The processing module is configured to determine, based on the secondary cell group configuration information, the communication standard supported by the secondary base station.

In a possible design, the processing module is specifically configured to: when the secondary cell group configuration information belongs to a 5G communication standard, determine that the secondary base station supports the 5G communication standard; or when the secondary cell group configuration information belongs to a 4G communication standard, determine that the secondary base station supports the 4G communication standard.

In a possible design, the communication apparatus further includes a communication module. The communication module is configured to receive a broadcast message sent by the master base station. The processing module is configured to determine, based on cell configuration information in the broadcast message, the communication standard supported by the core network.

In a possible design, the processing module is specifically configured to: when the cell configuration information belongs to a 5G communication standard, determine that the core network supports the 5G communication standard; or when the cell configuration information belongs to a 4G communication standard, determine that the core network supports the 4G communication standard.

In a possible design, the processing module is specifically configured to: when the master base station supports the 5G network standard, the secondary base station supports the 4G network standard, and the core network supports the 5G network standard, determine that the dual connectivity type is NE-DC; or when the master base station supports the 5G network standard, the secondary base station supports the 5G network standard, and the core network supports the 5G network standard, determine that the dual connectivity type is NR-DC; or when the master base station supports the 4G network standard, the secondary base station supports the 5G network standard, and the core network supports the 5G network standard, determine that the dual connectivity type is NGEN-DC; or when the master base station supports the 4G network standard, the secondary base station supports the 5G network standard, and the core network supports the 4G network standard, determine that the dual connectivity type is EN-DC.

According to a twelfth aspect, a communication apparatus is provided. The apparatus is applied to a first device. The first device has an IAB node function. The communication apparatus includes a processing module. The processing module is configured to: learn that a master base station or a secondary base station serves as an IAB donor; when the master base station is an IAB donor, generate an IAB key based on a master base station key and a key input parameter, where the IAB key is used to establish a secure tunnel between an IAB node and the IAB donor; or when the secondary base station is an IAB donor, generate an IAB key based on a secondary base station key and a key input parameter.

In a possible design, the processing module is specifically configured to: when receiving fourth indication information, learn that the master base station is an IAB donor, where the fourth indication information indicates that the master base station is an IAB donor; or when receiving fifth indication information, learn that the secondary base station is an IAB donor, where the fifth indication information indicates that the secondary base station is an IAB donor.

In a possible design, the processing module is specifically configured to: when a wireless backhaul link is established between the communication apparatus and the master base station, learn that the master base station is an IAB donor; or when a wireless backhaul link is established between the communication apparatus and the secondary base station, learn that the secondary base station is an IAB donor.

In a possible design, the processing module is specifically configured to: obtain a frequency band supported by the master base station and a frequency band supported by the secondary base station; and when the frequency band supported by the master base station is greater than the frequency band supported by the secondary base station, learn that the master base station is an IAB donor; or when the frequency band supported by the master base station is less than the frequency band supported by the secondary base station, learn that the secondary base station is an IAB donor.

In a possible design, the processing module is specifically configured to: when receiving sixth indication information broadcast by the master base station, learn that the master base station is an IAB donor; or when receiving sixth indication information broadcast by the secondary base station, learn that the secondary base station is an IAB donor. The sixth indication information indicates that a base station has an IAB donor function.

According to a thirteenth aspect, a communication apparatus is provided. The communication apparatus includes a processor and a communication port. The processor is configured to execute computer program instructions, so that the communication apparatus implements the method in any design provided in any one of the first aspect to the sixth aspect.

According to a fourteenth aspect, a computer-readable storage medium is provided. The computer-readable storage medium stores instructions. When the instructions are run on a computer, the computer is enabled to implement the method in any design provided in any one of the first aspect to the sixth aspect.

According to a fifteenth aspect, a computer program product is provided. The computer program product includes instructions. When the computer program product runs on a computer, the computer is enabled to implement the method in any design provided in any one of the first aspect to the sixth aspect.

According to a sixteenth aspect, a chip is provided. The chip includes a processor. When the processor executes computer program instructions, a computer is enabled to implement the method in any design provided in any one of the first aspect to the sixth aspect.

For technical effects brought by any design manner in the seventh aspect to the sixteenth aspect, refer to the beneficial effects and the technical effects brought by the design manner in the corresponding method provided above. Details are not described herein again.

BRIEF DESCRIPTION OF DRAWINGS

FIG. 11 is a flowchart of another key generation method according to an embodiment of this application;

FIG. 12A and FIG. 12B are a flowchart of another key generation method according to an embodiment of this application;

FIG. 13A and FIG. 13B are a flowchart of another key generation method according to an embodiment of this application;

FIG. 23 is a flowchart of another key generation method according to an embodiment of this application;

DESCRIPTION OF EMBODIMENTS

Figure 1:
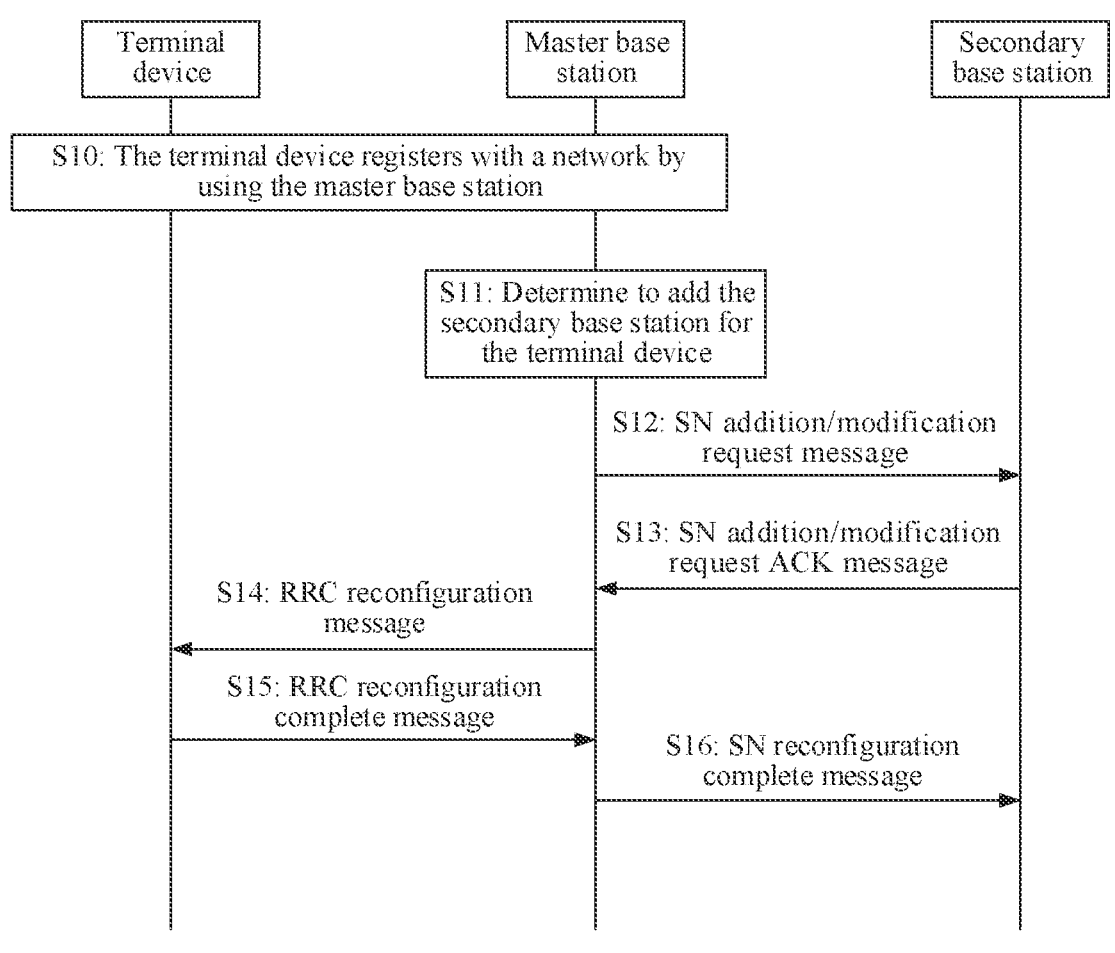
FIG. 1 is a flowchart of a dual connectivity configuration according to a related technology.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity or an execution sequence, and the terms such as "first" and "second" do not indicate a definite difference.

It should be noted that, in this application, words "example" or "for example" are used to represent giving an example, an illustration, or a description. Any embodiment or design scheme described as an "example" or "for example" in this application should not be explained as being more preferred or having more advantages than another embodiment or design scheme. Specifically, use of the word "example", "for example", or the like is intended to present a related concept in a specific manner.

For ease of understanding of the technical solutions in this application, the following describes some technical terms.

1. Dual Connectivity

In the field of wireless communication technologies, to improve a throughput of a user, a dual connectivity (dual connectivity, DC) technology is introduced. DC can support two or more base stations in simultaneously providing data transmission services for one terminal device. These base stations include one master base station and one or more secondary base stations.

The master base station may also be referred to as a master node (master node, MN) or a master access network device, and the secondary base station may also be referred to as a secondary node (secondary node, SN) or a secondary access network device. This is not limited in embodiments of this application.

The master base station is connected to a core network (core network, CN) through an S1/NG interface. At least a control plane connection is included between the master base station and the core network, and a user plane connection may be further included. The S1 interface includes S1-U and S1-C. The NG interface includes NG-U and NG-C. The S1-U/NG-U represents the user plane connection, and the S1-C/NG-C represents the control plane connection.

There may be or may not be a user plane connection between the secondary base station and the core network. When there is no user plane connection between the secondary base station and the core network, data of the terminal device may be offloaded by the master base station to the secondary base station at a packet data convergence protocol (packet data convergence protocol, PDCP) layer.

There may be a plurality of types of dual connectivity based on communication standards supported by the master base station, the secondary base station, and the core network connected to the master base station. For example, the following uses Table 1 as an example to describe dual connectivity types.

TABLE 1

| Dual connectivity type | Master base station | Secondary base station | Core network |
|---|---|---|---|
| EN-DC | 4G base station | 4G base station | 4G core network |
| NE-DC | 5G base station | 4G base station | 5G core network |
| NR-DC | 5G base station | 5G base station | 5G core network |
| NGEN-DC | 4G base station | 4G base station | 5G core network |

In a dual connectivity scenario, the master base station manages one primary cell (primary cell, PCell). The primary cell is a cell that is deployed on a primary frequency and that is accessed by the terminal when the terminal initiates an initial connection establishment process or an RRC connection reestablishment process, or a cell that is indicated as the primary cell in a handover process. Further, in addition to the primary cell, the master base station may manage one or more secondary cells (secondary cell, SCell). Cells, for example, a primary cell and a secondary cell of the master base station, of the master base station that provide services for the terminal may constitute a (master cell group, MCG).

The secondary base station manages one primary secondary cell (primary secondary cell, PSCell). The primary secondary cell may be a cell accessed by the terminal when the terminal initiates a random access procedure to the secondary base station, a cell that is of another secondary base station and to which the terminal initiates data transmission without the random access procedure in a secondary base station change process, or a cell that is of a secondary base station and that is accessed by the terminal when the terminal initiates the random access procedure during a synchronization reconfiguration procedure. Further, in addition to the primary secondary cell, the secondary base station may manage one or more secondary cells. Cells, for example, a primary secondary cell and a secondary cell of the secondary base station, of the secondary base station that provide services for the terminal may constitute a secondary cell group (secondary cell group, SCG).

In embodiments of this application, the terminal device is a device having a wireless transceiver function. The terminal device may be deployed on land, including an indoor or outdoor device, a handheld device, or a vehicle-mounted device; or may be deployed on a water surface (for example, on a ship); or may be deployed in air (for example, on an aircraft, a balloon, or a satellite). The terminal device may be user equipment (user equipment, UE). The UE includes a handheld device, a vehicle-mounted device, a wearable device, or a computing device with a wireless communication function. For example, the UE may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal device in industrial control, a wireless terminal device in self driving, a wireless terminal device in telemedicine, a wireless terminal device in a smart grid, a wireless terminal device in a smart city (smart city), a wireless terminal device in a smart home (smart home), or the like.

The master base station and the secondary base station may be collectively referred to as a network device. The network device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless relay node, a wireless backhaul node, a transmission point (transmission and reception point, TRP, or transmission point, TP), or the like, or may be a gNB or a transmission point (TRP or TP) in a 5G, for example, new radio (new radio, NR) system, or one antenna panel or a group of antenna panels (including a plurality of antenna panels) of a gNodeB in the 5G system, or may be a network node that constitutes a gNB or a transmission point, for example, a baseband unit (baseband unit, BBU), a distributed unit (distributed unit, DU), or a road side unit (road side unit, RSU) having a base station function.

In embodiments of this application, the network device may use a central unit (centralized unit, CU)-DU architecture. In other words, the network device may include a CU and at least one DU. In this case, some functions of the network device are deployed on the CU, and the other functions of the network device are deployed on the DU. The functions of the CU and the DU are divided based on a protocol stack. In an implementation, an RRC layer, a packet data convergence protocol (packet data convergence protocol, PDCP) layer, and a service data adaptation protocol (service data adaptation protocol, SDAP) layer in the protocol stack are deployed on the CU, and a radio link control (radio link control, RLC) layer, a media access control (media access control, MAC) layer, and a physical layer (physical layer, PHY) in the protocol stack are deployed on the DU. Therefore, the CU has processing capabilities of the RRC, the PDCP, and the SDAP. The DU has processing capabilities of the RLC, the MAC, and the PHY. It may be understood that the foregoing function division is merely an example, and does not constitute a limitation on the CU and the DU. In other words, the functions may alternatively be divided between the CU and the DU in another manner. Details are not described herein in embodiments of this application.

2. Dual Connectivity Configuration Procedure

As shown in FIG. 1, a dual connectivity configuration procedure provided in a related technology includes the following steps.

S10: A terminal device registers with a network by using a master base station.

Optionally, after the terminal device registers with the network, the master base station may deliver a measurement event to the terminal device, so that the terminal device reports a measurement report to the master base station. Then, the master base station may determine, based on the measurement report, whether to add a secondary base station for the terminal device. If the master base station determines to add the secondary base station for the terminal device, the master base station may perform the following step S11.

S11: The master base station determines to add the secondary base station for the terminal device.

S12: The master base station sends a secondary node addition/modification request (SN addition/modification request) message to the secondary base station.

The SN addition/modification request message includes secondary base station related configuration information.

It should be noted that the master base station may generate a secondary base station key. Then, the SN addition/modification request message sent by the master base station may carry the secondary base station key. Because the master base station does not use the secondary base station key, the master base station may delete the secondary base station key after sending the SN addition/modification request message.

S13: The secondary base station sends a secondary node addition/modification request acknowledgment (SN addition/modification request ACK) message to the master base station.

The SN addition/modification request ACK message indicates that the secondary base station agrees to use the configuration information carried in the SN addition/modification request message.

S14: The master base station sends an RRC reconfiguration message to the terminal device.

The RRC reconfiguration message is used to configure a radio bearer between the terminal device and the secondary base station.

S15: The terminal device sends an RRC reconfiguration complete message to the master base station.

S16: The master base station sends a secondary node reconfiguration complete (SN reconfiguration complete) message to the secondary base station.

Then, the terminal device and the secondary base station may perform a random access procedure (random access procedure). After the random access procedure is performed, an RRC connection is established between the terminal device and the secondary base station.

3. $K_{gNB}$

In a 5G network, $K_{gNB}$ is separately derived by a terminal device and an access and mobility management function (access and mobility management function, AMF) from KAMF. After deriving $K_{gNB}$, the AMF sends $K_{gNB}$ to an access network device connected to the terminal device. In this way, the terminal device and the access network device maintain the same $K_{gNB}$, and therefore the terminal device and the access network device can perform secure communication by using $K_{gNB}$ and keys derived by the terminal device and the access network device.

4. $K_{eNB}$

In a 4G network, $K_{eNB}$ is derived by a terminal device and a mobility management entity (mobility management entity, MME) from $K_{ASME}$. After deriving $K_{eNB}$, the MME sends $K_{eNB}$ to an access network device connected to the terminal device. In this way, the terminal device and the access network device maintain the same $K_{eNB}$, and therefore the terminal device and the access network device can perform secure communication by using $K_{eNB}$ and keys derived by the terminal device and the access network device.

5. Security Protection

Security protection refers to processing such as encryption/decryption and/or integrity protection/check on data, to avoid risks such as data leakage or data tampering.

(1) Encryption/decryption is used to protect confidentiality of data during transmission (also referred to as confidentiality protection), where confidentiality means that real content is not directly visible. Encryption protection may usually be implemented by encrypting data by using a key and an encryption algorithm.

(2) Integrity protection/check is used to determine whether content of a message is modified during transmission, and may also be used for identity authentication to determine a source of the message.

(3) Anti-replay protection/check is used to determine whether a message is replayed, to determine whether the message is fresh.

The foregoing describes the technical terms used in embodiments of this application, and details are not described below again.

Compared with a 4G mobile communication system, a 5G mobile communication system imposes stricter requirements on all aspects of network performance indicators. For example, the 5G mobile communication system requires 1000 times of increase in capacity indicators, wider coverage, and ultra-high reliability and an ultra-low latency.

To meet a requirement of the 5G mobile communication system for an ultra-high capacity, and in consideration of abundant high-frequency carrier frequency resources, operators generally use high-frequency small cells for networking in hotspot areas. However, high-frequency carriers have a poor propagation characteristic, are severely attenuated if blocked, and have small coverage. Therefore, a large quantity of small cells need to be densely deployed. Correspondingly, it is costly to provide fiber backhaul for the large quantity of densely deployed small cells, and construction is difficult. Therefore, an economical and convenient backhaul solution is required. In addition, in consideration of the requirement of wide coverage, it is difficult and costly to deploy optical fibers for network coverage in some remote areas. Therefore, a flexible and convenient access and backhaul solution is also required.

An integrated access and backhaul (integrated access and backhaul, IAB) technology provides a solution to resolve the foregoing two problems. A wireless transmission solution is used for both an access link (access link) and a backhaul link (backhaul link) of the IAB technology, avoiding optical fiber deployment.

In an IAB network, an IAB node may provide a wireless access service for a terminal device, and is connected to an IAB donor (donor) through a wireless backhaul link to transmit service data of a user.

The IAB node is connected to a core network through the donor node via a wired link. For example, in a 5G standalone architecture, an IAB node is connected to a core network (5G core network, 5GC) of a 5G network through a donor node through a wired link. In a 5G non-standalone architecture, an IAB node is connected to an evolved packet core (evolved packet core, EPC) on a control plane through an evolved NodeB (evolved NodeB, eNB), and is connected to the EPC on a user plane through a donor node and the eNB.

To ensure coverage performance and service transmission reliability of the IAB network, the IAB network supports multi-hop IAB node networking and multi-connection IAB node networking. Therefore, there may be a plurality of transmission paths between a terminal served by the IAB node and the donor node. One transmission path may include a plurality of nodes such as a terminal, one or more IAB nodes, and a donor node. There is a determined hierarchical relationship between IAB nodes and between the IAB node and a donor node serving the IAB node. Each IAB node considers, as a parent node, a node providing a backhaul service for the IAB node. Correspondingly, each IAB node may be considered as a child node of the parent node of the IAB node.

Figure 2:
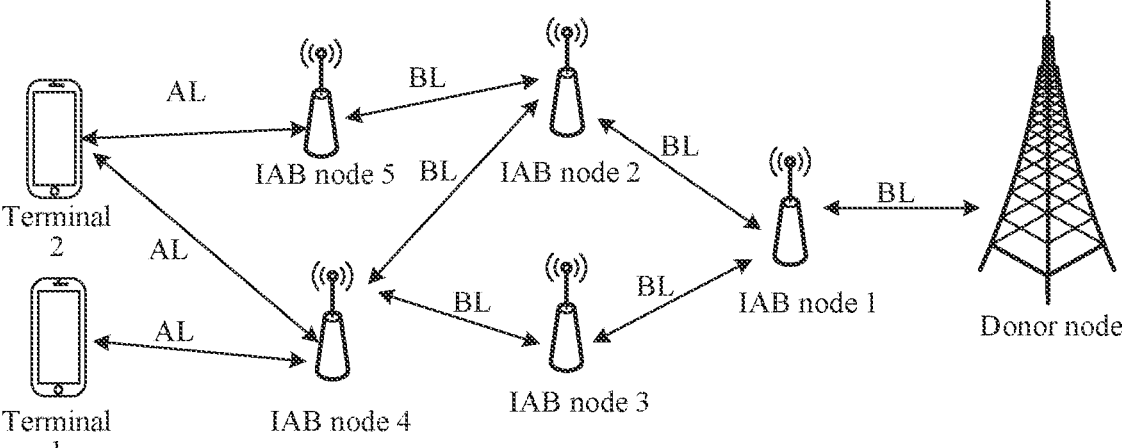
FIG. 2 is a schematic diagram of an IAB networking scenario according to an embodiment of this application.

For example, as shown in FIG. 2, in an IAB independent networking scenario, a parent node of an IAB node 1 is a donor node, the IAB node 1 is further a parent node of an IAB node 2 and an IAB node 3, both the IAB node 2 and the IAB node 3 are parent nodes of an IAB node 4, and a parent node of an IAB node 5 is the IAB node 2. An uplink data packet of a terminal may be transmitted to a donor node through one or more IAB nodes and then sent by the donor node to a mobile gateway device (for example, a user plane function (user plane function, UPF) network element in a 5G network). After the donor node receives a downlink data packet from the mobile gateway device, the donor node sends the downlink data packet to the terminal through the one or more IAB nodes.

It may be understood that, in the IAB network, one transmission path between the terminal and the donor node may include one or more IAB nodes. Each IAB node needs to maintain a wireless backhaul link to a parent node, and further needs to maintain a wireless link to a child node. If an IAB node is a node accessed by the terminal, a wireless access link exists between the IAB node and a child node (namely, the terminal). If an IAB node is a node that provides a backhaul service for another IAB node, a wireless backhaul link exists between the IAB node and a child node (namely, the another IAB node). For example, referring to FIG. 2, in a path "a terminal 1->the IAB node 4->the IAB node 3->the IAB node 1->the donor node", the terminal 1 accesses the IAB node 4 through a wireless access link, the IAB node 4 accesses the IAB node 3 through a wireless backhaul link, the IAB node 3 accesses the IAB node 1 through a wireless backhaul link, and the IAB node 1 accesses the donor node through a wireless backhaul link.

The IAB node may include a mobile terminal (mobile terminal, MT) and a central unit (distributed unit, DU). The MT included in the IAB node has some or all functions of a terminal device. When the IAB node faces a parent node of the IAB node, the IAB node may be considered as a terminal device, in other words, the IAB node plays a role of the MT. When the IAB node faces a child node of the IAB node (the child node may be a terminal or a terminal part of another IAB node), the IAB node may be considered as a network device, in other words, the IAB node plays a role of the DU. In other words, an IAB node may establish a backhaul connection to at least one parent node of the IAB node through the MT part. A DU part of an IAB node may provide an access service for a terminal or an MT part of another IAB node.

The IAB donor may be a complete entity. Alternatively, the IAB donor may be in a form in which a central unit (centralized unit, CU) (referred to as a donor-CU or a CU in this specification) and a distributed unit (distributed unit, DU) (referred to as a donor-DU in this specification) are separated, in other words, the IAB donor includes the donor-CU and the donor-DU. Further, the donor-CU may be in a form in which a user plane (User plane, UP) (referred to as a CU-UP in this specification) and a control plane (Control plane, CP) (referred to as a CU-CP in this specification) are separated, in other words, the donor-CU includes the CU-CP and the CU-UP.

In embodiments of this application, the IAB donor may have another name, for example, a donor base station, a donor node, or a DgNB (namely, a donor gNB). This is not limited herein.

An F1 interface needs to be established between the IAB node and the IAB donor. The F1 interface may also be referred to as an F1* interface. This is not limited herein. The F1 interface supports a user plane protocol of F1-U (or F1*-U) and a control plane protocol of F1-C (or F1*-C).

Figure 3:
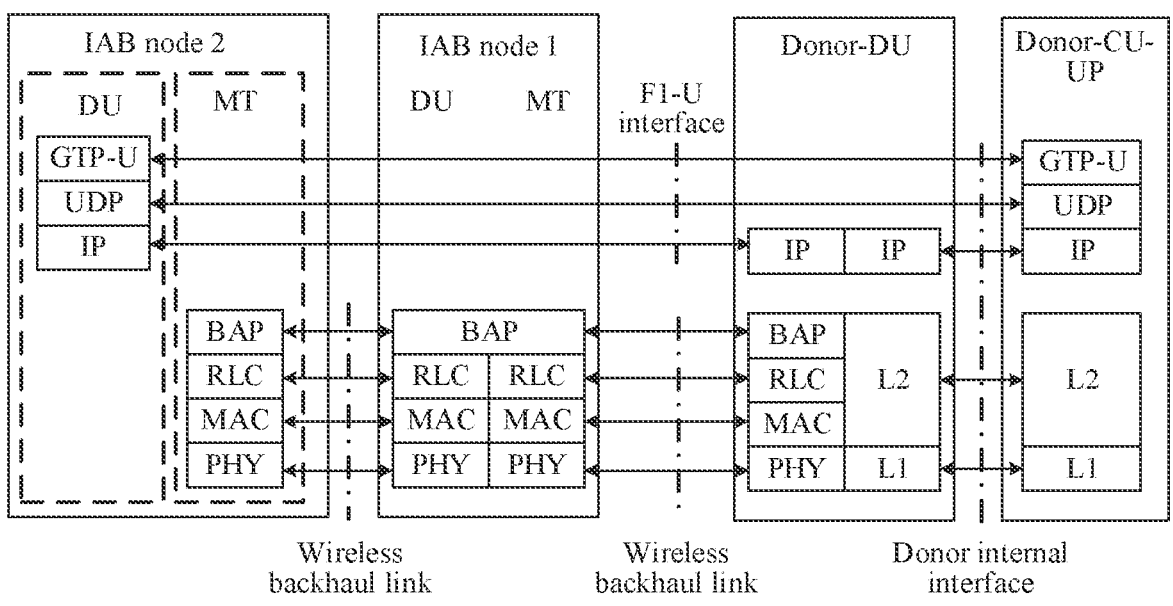
FIG. 3 is a schematic diagram of a user plane protocol stack in an IAB network according to an embodiment of this application.
Figure 6:
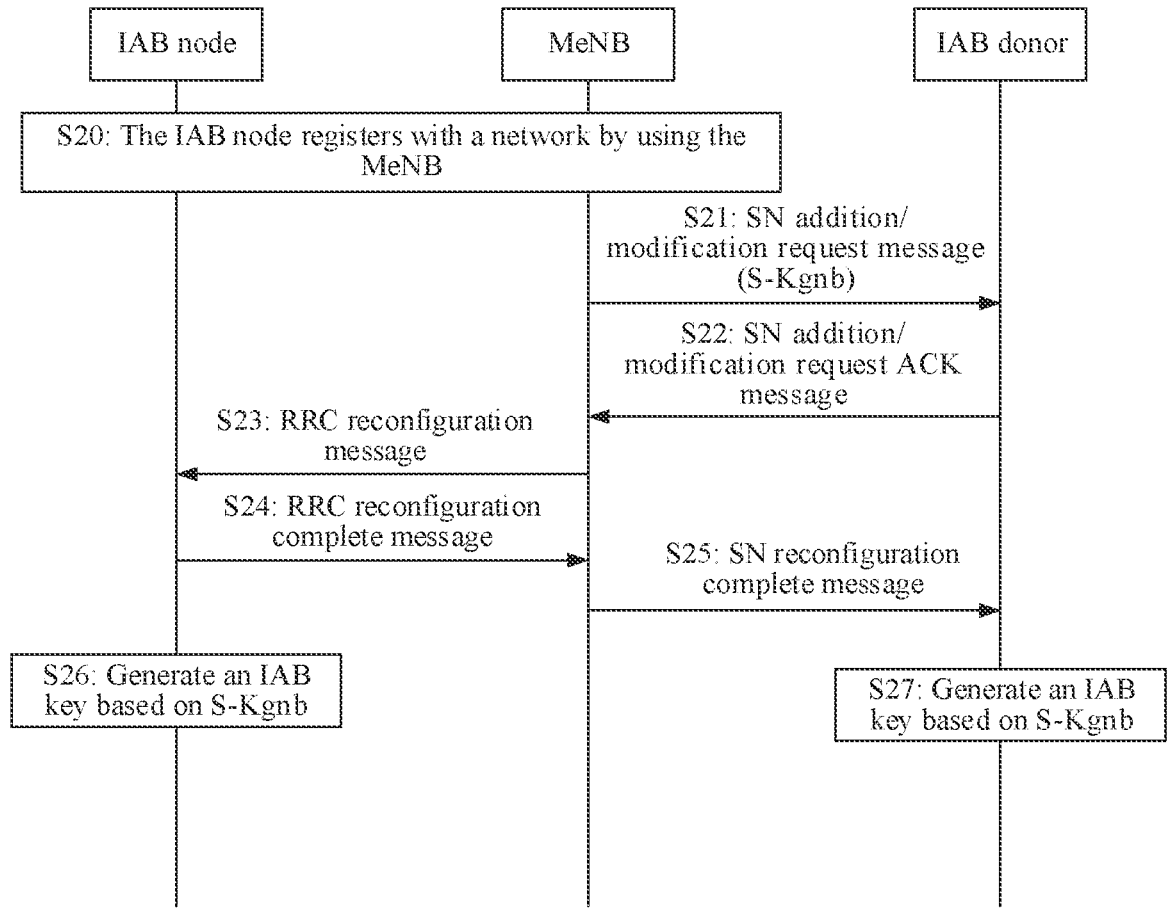
FIG. 6 is a flowchart of generating an IAB key in an EN-DC scenario according to an embodiment of this application.

For example, FIG. 3 is a schematic diagram of a user plane protocol stack in an IAB network according to an embodiment of this application. As shown in FIG. 6, the user plane protocol stack includes one or more of the following protocol layers: a general packet radio service (general packet radio service, GPRS) tunneling protocol user plane (GPRS tunnelling protocol user plane, GTP-U), a user datagram protocol (user datagram protocol, UDP), an internet protocol (internet protocol, IP), a backhaul adaptation protocol (Backhaul Adaptation Protocol, BAP) introduced into a wireless backhaul link, radio link control (radio link control, RLC), media access control (media access control, MAC), and a physical layer (PHY layer). In FIG. 3, an L2 layer may be a data link layer in an open systems intercon-nection (open systems interconnection, OSI) reference model, and an L1 layer may be a physical layer.

Figure 4:
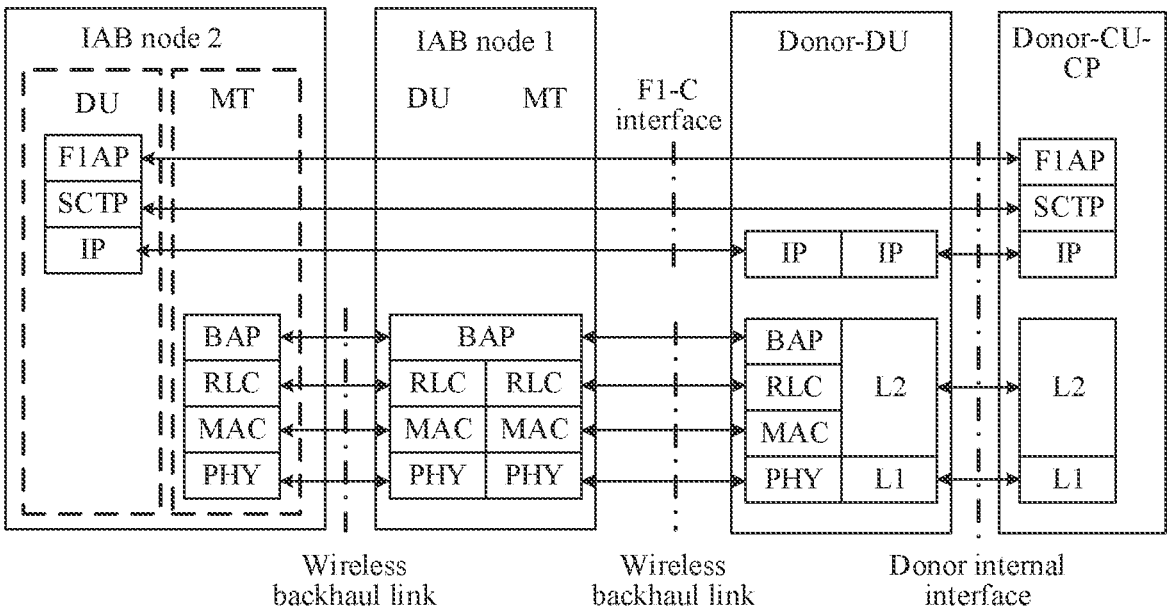
FIG. 4 is a schematic diagram of a control plane protocol stack in an IAB network according to an embodiment of this application.

For example, FIG. 4 is a schematic diagram of a control plane protocol stack in an IAB network according to an embodiment of this application. As shown in FIG. 4, the control plane protocol stack includes one or more of the following protocol layers: an F1 application protocol (F1 application protocol, F1AP), a stream control transport protocol (stream control transport protocol, SCTP), an IP, a BAP, RLC, MAC, a PHY, and the like.

To protect security of the F1 interface, an internet security protocol (internet protocol security, IPSec) secure connec-tion may be established between the IAB node and the IAB donor. An internet key exchange (internet key exchange, IKE) V2 protocol supports use of a pre-shared key (pre-shared secret key, PSK) for security authentication. For example, the IAB node and the IAB donor may preconfigure a PSK, and use of the PSK as an authentication credential in a subsequent IPSec establishment process. Currently, to omit the pre-configuration process of the PSK and implement plug-and-play of the IAB node and the IAB donor, the IAB node and the IAB donor may calculate $K_{IAB}$ as the PSK.

Currently, to ensure network coverage performance and a service transmission reliability requirement, the IAB node may be enabled to support dual connectivity (dual connec-tivity, DC), to cope with a possible exception of a wireless backhaul link, for example, interruption or blockage of the wireless backhaul link.

Figure 5:
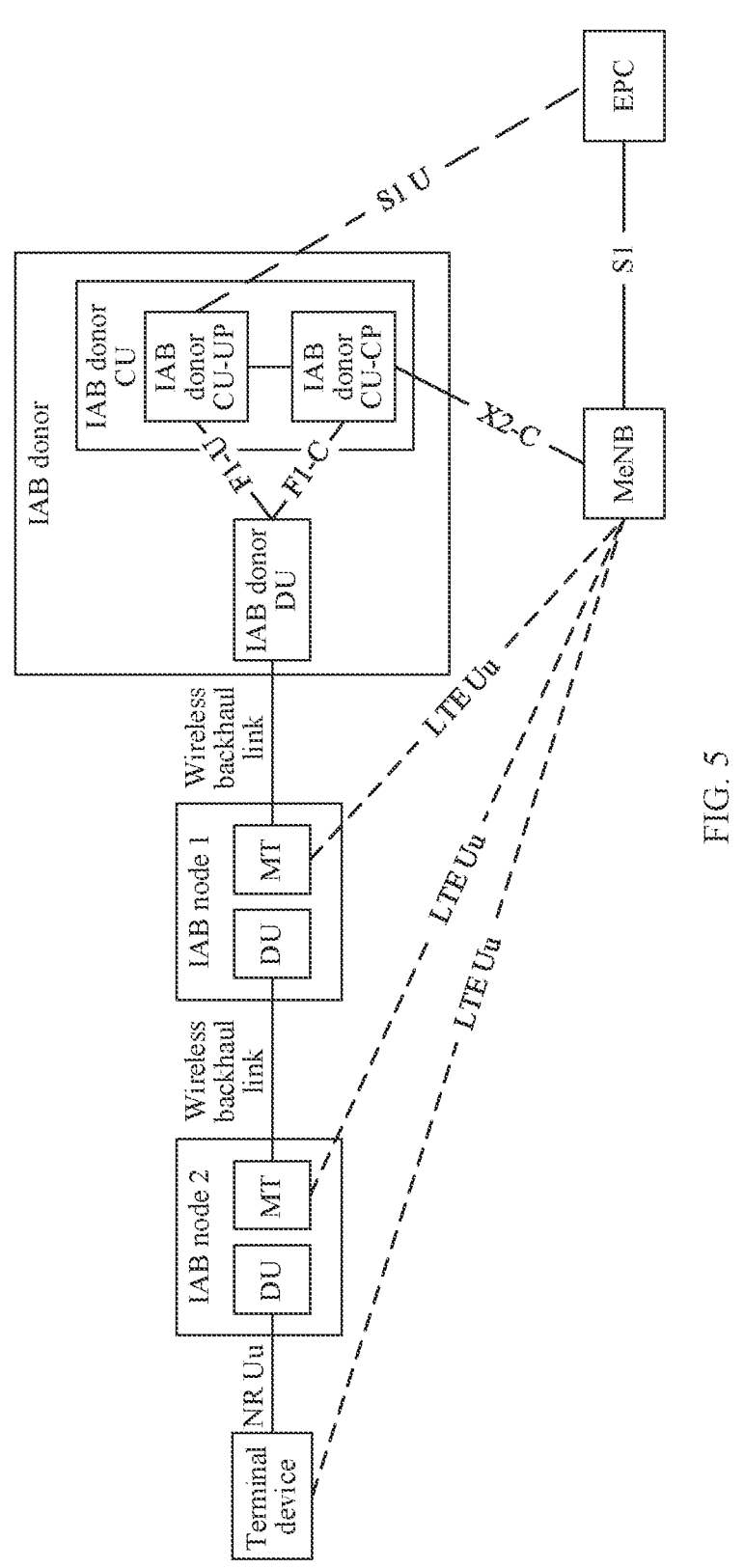
FIG. 5 is a schematic diagram in which an IAB node uses an EN-DC mode according to an embodiment of this application.

FIG. 5 is a schematic diagram in which an IAB node uses an EN-DC mode. As shown in FIG. 5, when the IAB node works in the EN-DC mode, a 4G base station (namely, an eNB) serves as a master base station, and an IAB donor serves as a secondary base station. There is an LTE Uu interface connection between an MeNB and an MT of the IAB node, and there is an X2-C interface connection between the MeNB and an IAB donor-CU-CP. The MeNB is connected to a 4G core network (evolved packet core, EPC) through an S1 interface. Optionally, an IAB donor-CU-UP may be connected to the EPC, for example, con-nected to a serving gateway (serving gateway, SGW), through an S1-U interface.

Currently, in a scenario in which the IAB node uses the EN-DC mode, as shown in FIG. 6, a procedure in which the IAB node and the IAB donor generate $K_{IAB}$ includes the following steps.

S20: The IAB node accesses the core network by using the MeNB.

It should be understood that after the IAB node accesses the core network, both the IAB node and the MeNB store same $K_{eNB}$.

S21: After the MeNB generates S-$K_{gNB}$, the MeNB sends an SN additional/modification request message to the IAB donor.

The SN additional/modification request message includes S-$K_{gNB}$. S-$K_{gNB}$ is derived from $K_{eNB}$.

It may be understood that, after sending S-$K_{gNB}$ to the secondary base station, the MeNB may optionally delete S-$K_{gNB}$. In other words, the MeNB calculates S-$K_{gNB}$ for use by the secondary base station, but the MeNB does not use S-$K_{gNB}$.

S22: The IAB donor sends an SN additional/modification request ACK message to the MeNB.

S23: The MeNB sends an RRC reconfiguration message to the IAB node.

It should be understood that, after receiving the RRC reconfiguration message, the IAB node may derive S-$K_{gNB}$ from $K_{eNB}$.

S24: The IAB node sends an RRC reconfiguration com-plete message to the MeNB.

S25: The MeNB sends an SN reconfiguration complete message to the IAB donor.

S26: The IAB node generates an IAB key based on S-$K_{gNB}$.

S27: The IAB donor generates an IAB key based on S-$K_{gNB}$.

In the EN-DC mode, the IAB donor can and can only be the secondary base station. Therefore, an input key for generating the IAB key may be S-$K_{gNB}$, in other words, the secondary base station derives the IAB key from S-$K_{gNB}$.

In this way, the IAB node and the IAB donor can establish a secure tunnel by using the same IAB key as an authenti-cation credential.

However, with development of communication technolo-gies, the IAB node may alternatively use another type of dual connectivity (for example, NE-DC, NR-DC, or NGEN-DC).

Figure 7:
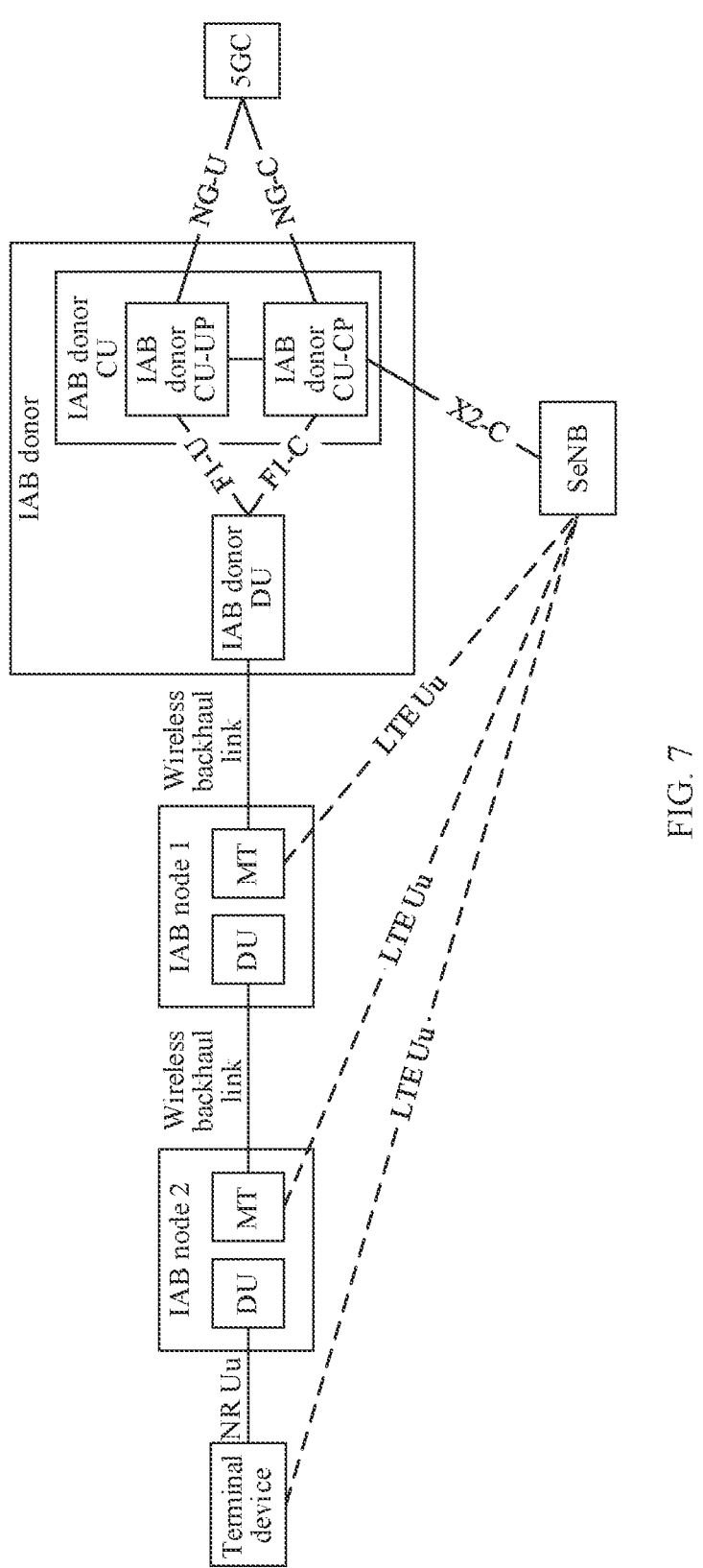
FIG. 7 is a schematic diagram in which an IAB node uses an NE-DC mode according to an embodiment of this application.

FIG. 7 is a schematic diagram in which an IAB node uses an NE-DC mode. As shown in FIG. 7, when the IAB node works in the NE-DC mode, an IAB donor CU-UP is con-nected to a user plane network element in a 5G core network (5G core, 5GC) through an NG-U interface, and an IAB donor CU-CP is connected to a control plane network element in the 5GC through an NG-C interface. There is an LTE Uu interface connection between an SeNB and an MT in the IAB node. There is an X2-C interface between the IAB donor CU-CP and the SeNB.

Figure 8:
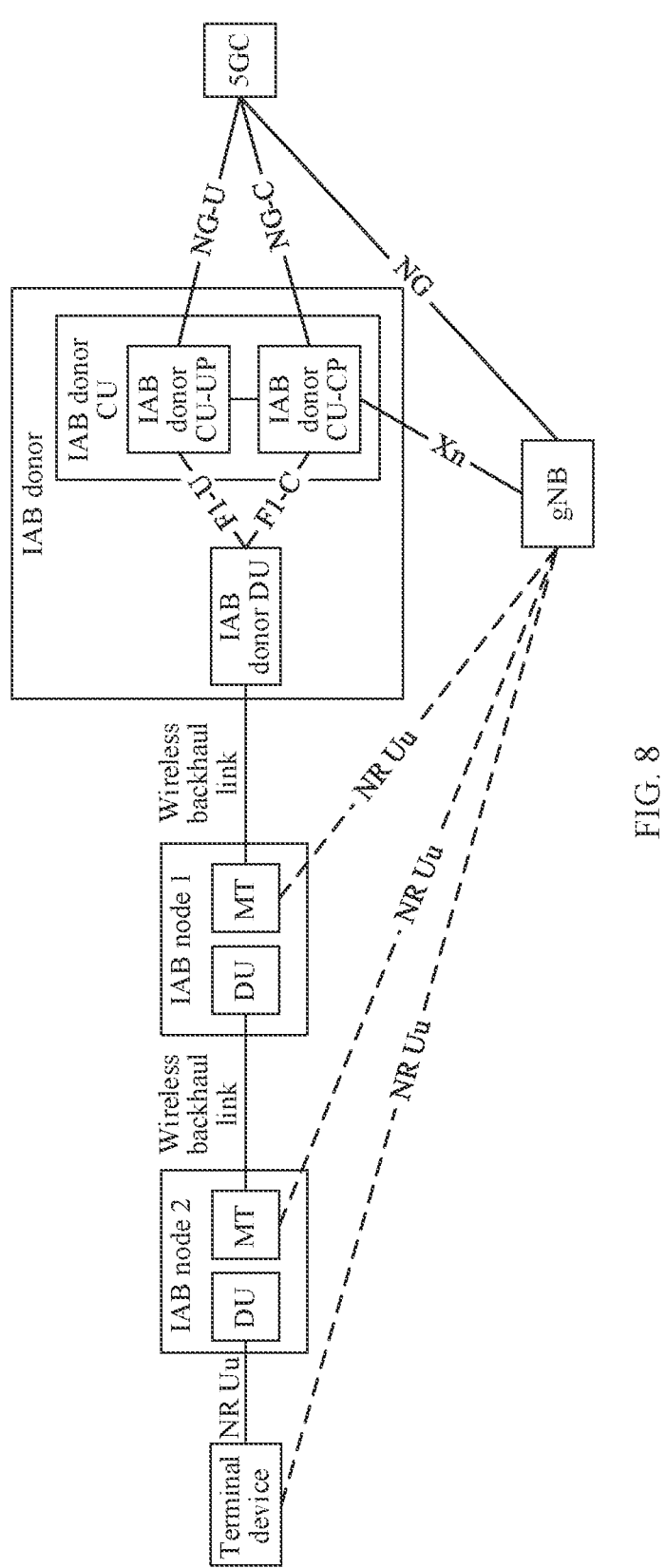
FIG. 8 is a schematic diagram in which an IAB node uses an NR-DC mode according to an embodiment of this application.

FIG. 8 is a schematic diagram in which an IAB node uses an NR-DC mode. As shown in FIG. 8, when the IAB node works in the NR-DC mode, the IAB node is connected to one IAB donor and one gNB. An IAB donor CU-UP is connected to a user plane network element in a 5GC through an NG-U interface, and an IAB donor CU-CP is connected to a control plane network element in the 5GC through an NG-C interface. There is an NR Uu interface between the gNB and an MT in the IAB node.

Figure 9:
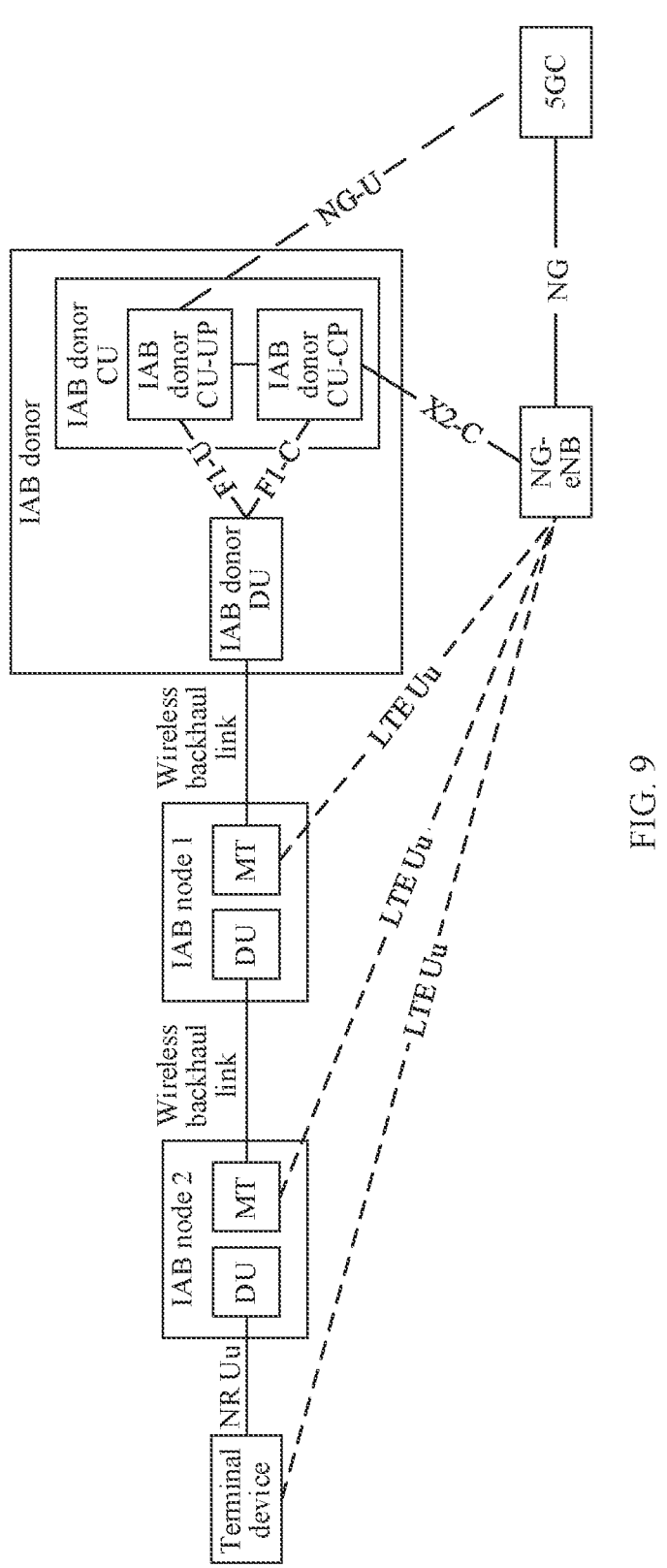
FIG. 9 is a schematic diagram in which an IAB node uses an NGEN-DC mode according to an embodiment of this application.

FIG. 9 is a schematic diagram in which an IAB node uses an NGEN-DC mode. As shown in FIG. 9, when the IAB node works in the NGEN-DC, a master base station connected to the IAB node is an NG-eNB, and a secondary base station connected to the IAB node is an IAB donor. An IAB donor CU-UP is connected to a user plane network element in a 5GC through an NG-U interface. There is an LTE Uu interface between an MT in the IAB node and an NG-eNB.

Currently, for a type of dual connectivity other than EN-DC, a technical solution in which the IAB node and the IAB donor generate $K_{IAB}$ has not been provided in the industry. Consequently, $K_{IAB}$ generated by the IAB node may be different from $K_{IAB}$ generated by the IAB donor, and therefore an IPsec secure connection cannot be properly established between the IAB node and the IAB donor.

For example, when the IAB node accesses a network by using NR-DC, both a master base station and a secondary base station are gNBs. The IAB donor may be the master base station, or may be the secondary base station. The IAB node establishes a connection to the IAB donor based on an IP address, but does not need to perceive whether the IAB donor is a master base station or a secondary base station. Consequently, when the IAB donor is a secondary base station, the IAB donor may calculate an IAB key by using a secondary base station key, and the IAB node may calculate an IAB key by using a master base station key, and therefore the IAB keys respectively maintained by the IAB donor and the IAB node are different. Alternatively, when the IAB donor is a master base station, the IAB donor may calculate an IAB key by using a master base station key, and the IAB node may calculate an IAB key by using a secondary base station key, and therefore the IAB keys respectively maintained by the IAB donor and the IAB node are different.

To resolve the foregoing technical problem, embodiments of this application provide three technical solutions: The following first describes ideas of the three technical solutions.

An idea of a technical solution 1 is as follows: In a scenario of a type of dual connectivity (for example, NE-DC, NR-DC, or NGEN-DC) other than EN-DC, both an IAB donor and an IAB node calculate $K_{IAB}$ by using a master base station key.

An idea of a technical solution 2 is as follows: In a scenario of a type of dual connectivity (for example, NE-DC, NR-DC, or NGEN-DC) other than EN-DC, both an IAB donor and an IAB node calculate $K_{IAB}$ by using a secondary base station key.

An idea of a technical solution 3 is as follows: In a scenario of a type of dual connectivity (for example, NE-DC, NR-DC, or NGEN-DC) other than EN-DC, both an IAB donor and an IAB node calculate $K_{IAB}$ based on a local key of the IAB donor. If a master base station is the IAB donor, the local key is a master base station key; or if a secondary base station is the IAB donor, the local key is a secondary base station key.

In the foregoing technical solution 1 to technical solution 3, it can be ensured that the IAB donor and the IAB node maintain same $K_{IAB}$. It should be understood that any one of the foregoing technical solutions 1 to 3 may be selected for execution in actual application.

For example, the master base station key is used to perform security protection on communication between the master base station (for example, the following first access network device) and a first device. For example, the master base station key may be $K_{gNB}$, $K_{RRCint}$, $K_{RRCenc}$, $K_{UPint}$, or $K_{UPenc}$. $K_{RRCint}$, $K_{RRCenc}$, $K_{UPint}$, and $K_{UPenc}$ are all derived from $K_{gNB}$. $K_{RRCint}$ is used to perform integrity protection on RRC signaling between the master base station and the first device. $K_{RRCenc}$ is used to perform encryption protection on the RRC signaling between the master base station and the first device. $K_{UPint}$ is used to perform integrity protection on user plane data between the master base station and the first device. $K_{UPenc}$ is used to perform encryption protection on the user plane data between the master base station and the first device. The master base station keys are collectively described herein, and details are not described below.

For example, the secondary base station key is used to perform security protection on communication between the secondary base station (for example, the following second access network device or third access network device) and the first device. For example, the secondary base station key may be Ksn, S-$K_{RRCint}$, S-$K_{RRCenc}$, S-$K_{UPint}$, or S-$K_{UPenc}$. This is not limited herein. S-$K_{RRCint}$, S-$K_{RRCenc}$, S-$K_{UPint}$, and S-$K_{UPenc}$ are all derived from Ksn. S-$K_{RRCint}$ is used to perform integrity protection on RRC signaling between the secondary base station and the first device. The S-$K_{RRCenc}$ is used to perform encryption protection on the RRC signaling between the secondary base station and the first device. S-$K_{UPint}$ is used to perform integrity protection on user plane data between the secondary base station and the first device. S-$K_{UPenc}$ is used to perform encryption protection on the user plane data between the secondary base station and the first device. The master base station keys are collectively described herein, and details are not described below.

The following describes in detail specific implementations of the three embodiments with reference to the accompanying drawings of this specification. It should be noted that names of messages/information in the following embodiments are merely examples, and may be other names in specific implementation. This is not limited herein.
Technical Solution 1

Figure 10:
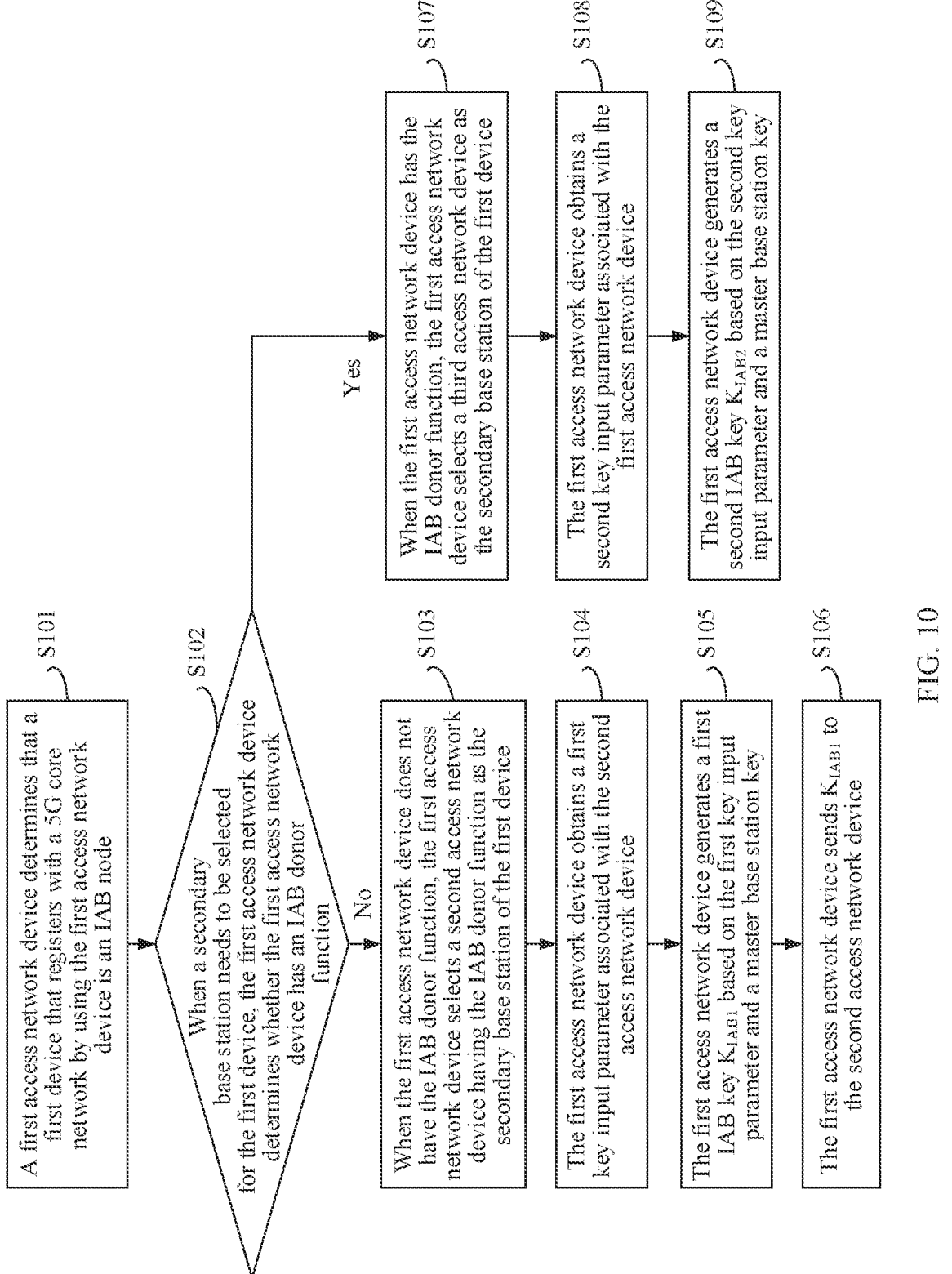
FIG. 10 is a flowchart of a key generation method according to an embodiment of this application.

In a scenario of a type of dual connectivity other than EN-DC, a network side may obtain an IAB key according to an embodiment shown in FIG. 10, and an IAB node may obtain an IAB key according to an embodiment shown in FIG. 11.

FIG. 10 shows a key generation method according to an embodiment of this application. The method includes the following steps.

S101: A first access network device determines that a first device that registers with a 5G core network by using the first access network device is an IAB node.

In a possible implementation, the first access network device receives IAB indication information sent by the first device. The IAB indication information indicates that the first device is an IAB node. Therefore, the first access network device can learn, based on the IAB indication information, that the first device is an IAB node.

For example, the IAB indication information may be denoted as "IAB-indication".

In another possible implementation, the first access network device receives IAB authorization information from a core network element. The IAB authorization information indicates that the first device has permission to serve as an IAB node. Therefore, the first access network device can learn, based on the IAB authorization information, that the first device is an IAB node.

For example, the IAB authorization information may be denoted as "IAB-authorized".

It should be understood that the core network element may actively send the IAB authorization information to the first access network device; or the core network element may check subscription data of the first device according to a request of the first access network device, to determine whether to return the IAB authorization information to the first access network device.

It should be understood that both the first access network device and the first device can obtain a same master base station key in a process in which the first device registers with the 5G core network.

S102: When a secondary base station needs to be selected for the first device, the first access network device determines whether the first access network device has an IAB donor function.

In a possible implementation, the first access network device searches the IAB donor configuration information to determine whether an identifier of the first access network device exists. When the IAB donor configuration information includes the identifier of the first access network device, the first access network device determines that the first access network device has the IAB donor function. When the IAB donor configuration information does not include the identifier of the first access network device, the first access network device determines that the first access network device does not have the IAB donor function.

The IAB donor configuration information is used to record identifiers of one or more access network devices having the IAB donor function. Optionally, the IAB donor configuration information may be configured by an operation administration and maintenance (operation administration and maintenance) system or another device for the first access network device.

In another possible implementation, the first access network device may check whether the first access network device stores a donor configuration file. When the first access network device stores the donor configuration file, the first access network device may determine that the first access network device has the IAB donor function. Otherwise, the first access network device determines that the first access network device does not have the IAB donor function.

It should be understood that the donor configuration file is used to configure a function of an access network device when the access network device serves as an IAB donor. The donor configuration file may be locally configured by the first access network device, or may be configured by the OAM system for the first access network device.

Optionally, when the first access network device does not have the IAB donor function, the first access network device performs the following steps S103 to S106. When the first access network device has the IAB donor function, the first access network device performs the following steps S107 to S109.

S103: When the first access network device does not have the IAB donor function, the first access network device selects a second access network device having the IAB donor function as the secondary base station of the first device.

In a possible implementation, a second device preconfigures an identifier of the second access network device for the first access network device. Therefore, when a secondary base station needs to be added for an IAB node (for example, the first device), the first access network device may select the second access network device as the secondary base station based on the identifier of the second access network device.

In a possible implementation, the first access network device sends a first request message to the second device. The first request message includes an identifier of the first device. The second device may determine, based on the first request message, an access network device (namely, the second access network device) serving as an IAB donor of the first device. Then, the first access network device receives a first response message sent by the second device. The first response message includes an identifier of the second access network device. Therefore, the first access network device may select the second access network device as the secondary base station of the first device.

Optionally, the identifier of the first device may include a cell radio network temporary identifier (cell-radio network temporary identifier, C-RNTI), a device number, or the like. This is not limited herein.

Optionally, the identifier of the second access network device may include an IP address, a device number, or the like. This is not limited herein.

Optionally, the second device may be the OAM system or the core network element. This is not limited herein.

It should be noted that the second device may determine the second access network device based on the first request message in the following two cases:

Case 1: The second device has pre-stored a mapping relationship between the first device and the second access network device. Therefore, the second device can find the identifier of the second access network device based on the identifier of the first device and the mapping relationship between the first device and the second access network device.

Case 2: The second device does not store a mapping relationship between the first device and the second access network device. Therefore, the second device may determine the second access network device based on factors such as topology information.

It should be understood that because the second device is responsible for determining the second access network device, the second device may send, to the first device, an IP address used by the second access network device to communicate with an IAB node, so that the first device can communicate with the second access network device based on the IP address.

In this embodiment of this application, after selecting the second access network device as the secondary base station, the first access network device sends a secondary base station configuration message to the second access network device, so that the second access network device learns that the second access network device serves as the secondary base station of the first device. For example, the secondary base station configuration message may be the SN addition/modification request message in the dual connectivity configuration procedure shown in FIG. 1.

Optionally, when the first device is an IAB node, the secondary base station configuration message may include third indication information. The third indication information indicates that the first device is an IAB node. Therefore, the second access network device can learn, based on the third indication information, that the first device is an IAB node.

For the second access network device, when the secondary base station configuration message includes the third indication information, the second access network device determines whether the second access network device has the IAB donor function. When the second access network device determines that the second access network device has the IAB donor function, the second access network device needs to obtain $K_{IAB1}$ from the first access network device.

For a specific implementation in which the second access network device determines whether the second access network device has the IAB donor function, refer to the foregoing specific implementation in which the first access network device determines whether the first access network device has the IAB donor function. Details are not described herein again.

S104: The first access network device obtains a first key input parameter associated with the second access network device.

The first key input parameter includes a first IP address and/or a second IP address.

The first IP address is an IP address used by the first device to communicate with an IAB donor. Because the first device serves as an IAB node, the first IP address may also be referred to as an IP address of the IAB node or an IP address of an MT in the IAB node.

The second IP address is an IP address used by the second access network device to communicate with an IAB node. Because the second access network device serves as the IAB donor of the first device, the second IP address may also be referred to as an IP address of the IAB donor or an IP address of a CU in the IAB donor.

Optionally, the first access network device may obtain the first IP address in either of the following Implementation 1-1 and Implementation 1-2:

Implementation 1-1: The first access network device obtains the first IP address from the second device.

For example, when the IP address of the first device is assigned by the second device, the first response message sent by the second device to the first access network device may further include the first IP address.

Implementation 1-2: The first access network device obtains the first IP address from the second access network device.

For example, the first access network device sends first indication information to the second access network device. The first indication information is used to request the first IP address. Then, the first access network device receives the first IP address sent by the second access network device.

For example, the first indication information may be carried in newly added signaling, or the first indication information may be carried in existing signaling, for example, the SN addition/modification request message.

For example, the first IP address sent by the second access network device may be carried in newly added signaling, or the first IP address sent by the second access network device may be carried in existing signaling, for example, the SN addition/modification request ACK message.

Optionally, the first access network device may obtain the second IP address in any one of the following Implementation 2-1 to Implementation 2-3:

Implementation 2-1: The first access network device obtains the second IP address from the second device.

For example, if the second device stores an IP address of each access network device having the IAB donor function, the second device stores the second IP address. Therefore, the first response message sent by the second device to the first access network device may further include the second IP address.

Implementation 2-2: The first access network device may use an IP address of an Xn interface of the second access network device as the second IP address.

It should be understood that, Implementation 2-2 is based on that for a communication system, by default, an IP address of an Xn interface of an access network device is usually an IP address of the access network device when the access network device serves as an IAB donor.

Implementation 2-3: The first access network device obtains the second IP address from the second access network device.

For example, the first access network device sends second indication information to the second access network device. The second indication information is used to request the second IP address. The first access network device receives the second IP address sent by the second access network device.

For example, the second indication information may be carried in newly added signaling, or the second indication information may be carried in existing signaling, for example, the SN addition/modification request message.

It should be understood that the second indication information and the first indication information may be carried in same signaling or different signaling. When the second indication information and the first indication information are carried in same signaling, the second indication information and the first indication information may be integrated into one piece of indication information, for example, parameter request indication information (para_request_indicator). Therefore, the parameter request indication information is used to request an IP address of an IAB donor and an IP address of an IAB node.

For example, the second IP address sent by the second access network device may be carried in newly added signaling, or the second IP address sent by the second access network device may be carried in existing signaling, for example, the SN addition/modification request ACK message.

S105: The first access network device generates a first IAB key $K_{IAB1}$ based on the first key input parameter and the master base station key.

$K_{IAB1}$ is used to establish a secure tunnel between the second access network device and the first device.

S106: The first access network device sends $K_{IAB1}$ to the second access network device.

In a possible design, $K_{IAB1}$ may be carried in a newly added message. Taking the dual connectivity configuration procedure shown in FIG. 1 as an example for description, the newly added message used to carry $K_{IAB1}$ may be sent after the SN additional/modification request ACK message or an SN reconfiguration complete message.

In another possible design, $K_{IAB1}$ may be carried in an existing message. Taking the dual connectivity configuration procedure shown in FIG. 1 as an example for description, the first access network device may send an SN reconfiguration complete message to the second access network device. The SN reconfiguration complete message includes $K_{IAB1}$.

It should be understood that the second access network device stores $K_{IAB1}$ after receiving $K_{IAB1}$.

Based on the foregoing steps S103 to S106, when the secondary base station (namely, the second access network device) serves as an IAB donor, a master base station (namely, the first access network device) can actively generate $K_{IAB}$ by using the master base station key, and send $K_{IAB}$ to the secondary base station, to ensure that the IAB donor and the IAB node maintain the same $K_{IAB}$.

S107: When the first access network device has the IAB donor function, the first access network device selects a third access network device as the secondary base station of the first device.

In a possible implementation, the first access network device selects a proper access network device (namely, the third access network device) from surrounding access network devices as the secondary base station of the first device based on factors such as a location of the first device and a measurement report of the first device.

It should be understood that whether the third access network device has the IAB donor function is not limited in this embodiment of this application. In other words, the third access network device may have the IAB donor function or may not have the IAB donor function.

In this case, the first access network device having the IAB donor function serves as the IAB donor of the first device.

S108: The first access network device obtains a second key input parameter associated with the first access network device.

The second key input parameter includes a first IP address and a third IP address.

The third IP address is an IP address used by the first access network device to communicate with an IAB node.

It should be understood that the first access network device may obtain the third IP address locally (in other words, from a database of the first access network device).

In a possible design, the first access network device serving as an IAB donor assigned the first IP address to the first device. Based on this design, the first access network device further needs to send the first IP address to the first device.

In another possible design, when a second device assigned the first IP address to the first device, the first access network device may obtain the first IP address from the second device or the first device.

For example, the first access network device sends an IP address request message to the first device. Then, the first access network device receives an IP address notification message sent by the first device. The IP address notification message includes the first IP address.

S109: The first access network device generates a second IAB key $K_{IAB2}$ based on the second key input parameter and the master base station key.

$K_{IAB2}$ is used to establish a secure tunnel between the first access network device and the first device.

It should be understood that the first access network device stores $K_{IAB2}$ after generating $K_{IAB2}$.

Based on the foregoing steps 107 to S109, when the master base station (namely, the first access network device) serves as an IAB donor, the master base station actively generates $K_{IAB}$ by using the master base station key, to ensure that the IAB donor and the IAB node maintain the same $K_{IAB}$.

FIG. 11 shows a key generation method according to an embodiment of this application. The method is applied to a scenario in which a first device (an IAB node) is connected to a master base station and a secondary base station. The method includes the following steps.

S201: The IAB node determines a dual connectivity type based on a communication standard supported by a master base station, a communication standard supported by a secondary base station, and a communication standard supported by a core network.

Optionally, that the IAB node determines the communication standard supported by the master base station may be specifically implemented as the supported communication standard. The configuration parameter in the broadcast message includes one or more of the following: a base station identifier, a logical cell identifier, a physical cell identifier, an uplink frequency band, or a downlink frequency band. It should be understood that when the configuration parameter in the broadcast message is a configuration parameter in a 5G communication system, the IAB node may determine that the master base station supports a 5G communication standard; or when the configuration parameter in the broadcast message is a configuration parameter in a 4G communication system, the IAB node may determine that the master base station supports a 4G communication standard.

For example, 4G frequencies are A1, A2, and A3, and 5G frequencies are B1, B2, and B3. When a frequency in the broadcast message sent by the master base station is B1, the IAB node may determine that the master base station supports the 5G communication standard.

Optionally, that the IAB node determines the communication standard supported by the secondary base station may be specifically implemented as follows: The IAB node receives an RRC reconfiguration message sent by the master base station. The RRC reconfiguration message is used to configure a radio bearer between the IAB node and the secondary base station, and the RRC reconfiguration message includes secondary cell group configuration information. The IAB node determines, based on the secondary cell group configuration information, the communication standard supported by the secondary base station. It should be understood that when the secondary cell group configuration information belongs to the 5G communication standard, the IAB node may determine that the secondary base station supports the 5G communication standard; or when the secondary cell group configuration information belongs to the 4G communication standard, the IAB node may determine that the secondary base station supports the 4G communication standard.

For example, secondary cell group configuration information belonging to the 5G communication standard may be denoted as nr-SecondaryCellGroupConfig or sourceSCG-NR-Config, and secondary cell group configuration information belonging to the 4G communication standard may be denoted as sourceSCG-EUTRA-Config.

Optionally, that the IAB node determines the communication standard supported by the core network may be specifically implemented as follows: The IAB node receives a broadcast message sent by the master base station. The IAB node determines, based on cell configuration information in the broadcast message, the communication standard supported by the core network. It should be understood that if the cell configuration information in the broadcast message belongs to the 5G communication standard, the IAB node determines that the core network supports the 5G communication standard; or if the cell configuration information in the broadcast message belongs to the 4G communication standard, the IAB node determines that the core network supports the 4G communication standard.

For example, the cell configuration information may include cell access related information (cellAccessRelatedInfo). Cell access related information belonging to the 5G communication standard may be denoted as cellAccessRelatedInfo-5GC, and cell access related information belonging to the 4G communication standard may be denoted as cellAccessRelatedInfo-EUTRA-EPC.

Optionally, the IAB node determines the dual connectivity type in one of the following cases:

Case 1: When the master base station supports the 5G communication standard, the secondary base station supports the 4G communication standard, and the core network supports the 5G communication standard, the IAB node determines that the dual connectivity type is NE-DC.

Case 2: When the master base station supports the 4G communication standard, the secondary base station supports the 5G communication standard, and the core network supports the 5G communication standard, the IAB node determines that the dual connectivity type is NGEN-DC.

Case 3: When the master base station supports the 5G communication standard, the secondary base station supports the 5G communication standard, and the core network supports the 5G communication standard, the IAB node determines that the dual connectivity type is NR-DC.

Case 4: When the master base station supports the 4G communication standard, the secondary base station supports the 5G communication standard, and the core network supports the 4G communication standard, the IAB node determines that the dual connectivity type is EN-DC.

S202: When the dual connectivity type is NE-DC, NR-DC, or NGEN-DC, the IAB node generates $K_{IAB}$ based on a master base station key.

In a possible implementation, the IAB node generates $K_{IAB}$ based on the master base station key and a key input parameter.

The key input parameter includes an IP address of an IAB donor and an IP address of the IAB node.

Optionally, the IAB node may obtain the IP address of the IAB donor from a second device. For example, the second device may be an OAM system or a core network element.

Optionally, when the IP address of the IAB node is assigned by the second device, the IAB node may obtain the IP address of the IAB node from the second device. In this case, the second device may encapsulate the IP address of the IAB node and the IP address of the IAB donor into a message, and send the message to the IAB node.

Optionally, when the IP address of the IAB node is assigned by the IAB donor, the IAB node may obtain the IP address of the IAB node from the master base station or the secondary base station.

For example, the master base station serves as an IAB donor, and the master base station assigned an IP address to the IAB node. Therefore, the IAB node sends an IP address request message to the master base station, and Then, the IAB node receives an IP address notification message sent by the master base station. The IP address notification message includes the IP address of the IAB node.

For another example, the master base station serves as an IAB donor, and the master base station assigned an IP address to the IAB node. Therefore, the IAB node receives an RRC reconfiguration message sent by the master base station. The RRC reconfiguration message includes the IP address of the IAB node.

For another example, the secondary base station serves as an IAB donor, and the secondary base station assigned an IP address to the IAB node. Therefore, the IAB node may send an IP address request message to the secondary base station, and Then, the IAB node receives an IP address notification message sent by the secondary base station. The IP address notification message includes the IP address of the IAB node.

It should be understood that the IAB node stores $K_{IAB}$ after generating $K_{IAB}$.

Based on the embodiment shown in FIG. 11, the IAB node can accurately determine, based on the communication standard supported by the master base station, the communication standard supported by the secondary base station, and the communication standard supported by the core network, the dual connectivity type used by the IAB node. Further, when the dual connectivity type is NE-DC, NR-DC, or NGEN-DC, the IAB node may generate $K_{IAB}$ based on the master base station key, to ensure that the IAB donor and the IAB node maintain the same $K_{IAB}$.

It should be understood that when the dual connectivity type is EN-DC, the IAB node generates $K_{IAB}$ based on a secondary base station key and a key input parameter.

The following describes the technical solution 1 in detail by using examples with reference to specific application scenarios.

Scenario 1: A first device (namely, an IAB node) registers with a network by using a first access network device that does not have an IAB donor function. Then, the first access network device selects, for the first device, a second access network device having the IAB donor function as a secondary base station, and the second access network device is responsible for assigning an IP address of the IAB node to the first device.

Figure 12A:
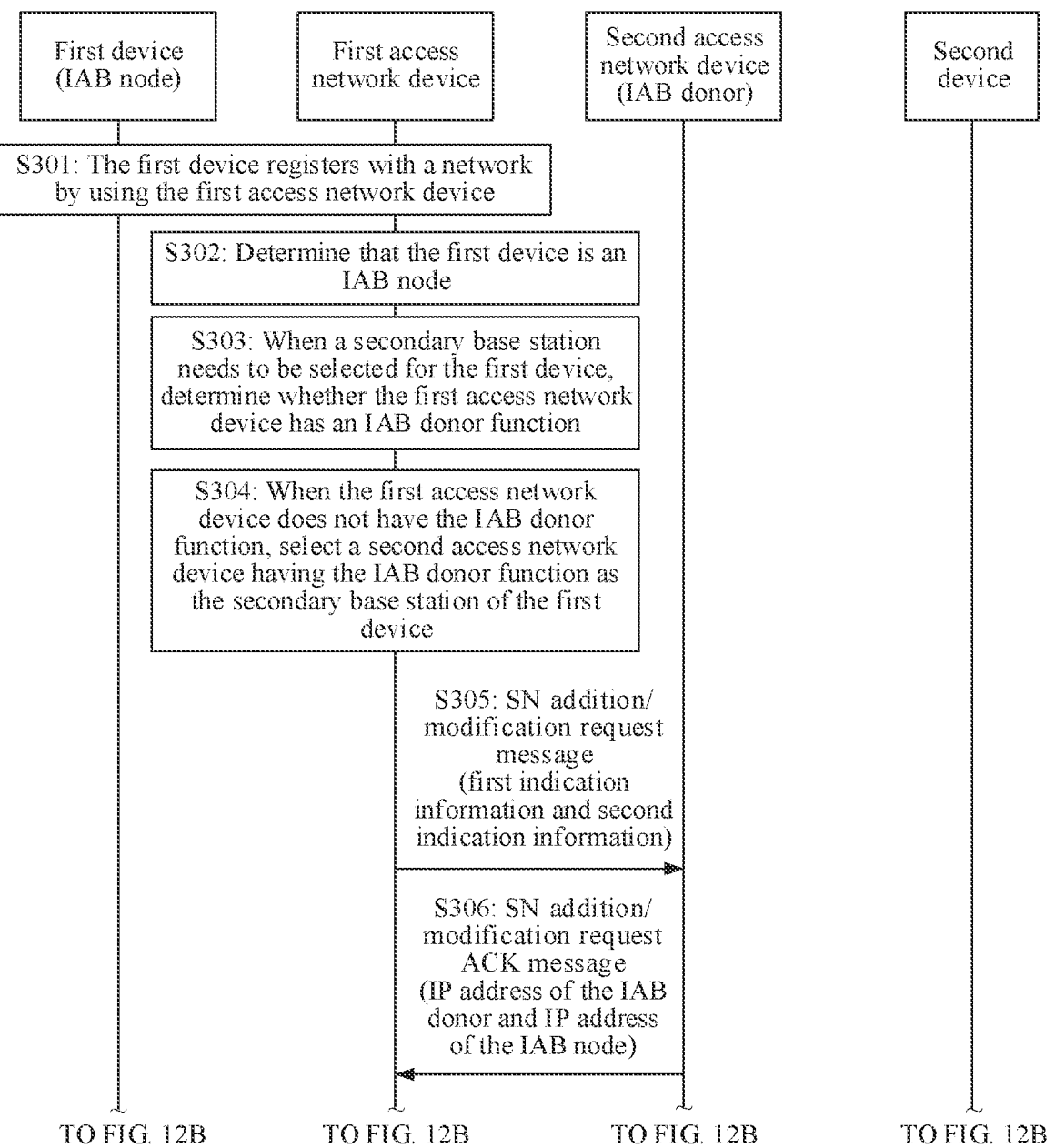

Based on Scenario 1, FIG. 12A and FIG. 12B show a key generation method according to an embodiment of this application. The method includes the following steps.

S301: A first device registers with a network through a first access network device.

In a process of registering with the network, the first device may perform procedures such as authentication and security context negotiation.

In the registration process of the first device, the first device and the first access network device obtain a same AS stratum key. The AS stratum key between the first device and the first access network device is used to perform security protection on AS stratum communication between the first device and the first access network device. In a dual connectivity scenario, because the first access network device serves as a master base station of the first device, the AS stratum key between the first device and the first access network device may be referred to as a master base station key.

S302: The first access network device determines that the first device is an IAB node.

S303: When a secondary base station needs to be selected for the first device, the first access network device determines whether the first access network device has an IAB node function.

S304: When the first access network device does not have the IAB node function, the first access network device selects a second access network device having the IAB donor function as the secondary base station of the first device.

S305: The first access network device sends an SN addition/modification request message to the second access network device.

The SN addition/modification request message includes third indication information. The third indication information indicates that the first device is the IAB node.

Therefore, the second access network device can learn, based on the third indication information, that the first device is an IAB node. Further, because the second access network device has the IAB donor function, the second access network device may serve as an IAB donor of the first device, and assign an IP address of the IAB node to the first device. It should be understood that the IP address of the IAB node herein is the first IP address in the embodiment shown in FIG. 10.

Optionally, the SN addition/modification request message may include first indication information and second indication information in addition to related information elements in the conventional technology.

S306: The first access network device receives an SN addition/modification request ACK message sent by the second access network device.

Optionally, when the SN addition/modification request message includes the first indication information and the second indication information, the SN addition/modification request ACK message includes an IP address of the IAB donor and the IP address of the IAB node.

S307: The first access network device generates $K_{IAB}$ based on the master base station key, the IP address of the IAB donor, and the IP address of the IAB node.

S308: The first access network device sends an RRC reconfiguration message to the first device.

The RRC reconfiguration message includes the IP address of the IAB node.

S309: The first access network device receives an RRC reconfiguration complete message sent by the first device.

S310: The first access network device sends an SN reconfiguration complete message to the second access network device.

The SN reconfiguration complete message includes $K_{IAB}$.

It should be understood that the second access network device obtains $K_{IAB}$ from the SN reconfiguration complete message. Then, the second access network device stores $K_{IAB}$.

S311: The first device receives an IP address notification (IP address notification) message sent by a second device.

The IP address notification message includes the IP address of the IAB donor.

It should be understood that step S311 is performed only after step S304, and a specific execution occasion of step S312 is not limited. For example, step S311 may be performed before step S310.

S312: The first device determines a dual connectivity type.

S313: When the dual connectivity type is NE-DC, NR-DC, or NGEN-DC, the first device generates $K_{IAB}$ based on the master base station key, the IP address of the IAB donor, and the IP address of the IAB node.

For specific implementation details of steps S312 and S313, refer to the embodiment shown in FIG. 11. Details are not described herein again. In addition, steps S312 and S313 may be performed at any moment after step S308. This is not limited in this embodiment of this application.

S314: The first device and the second access network device establish a secure tunnel by using $K_{IAB}$.

Based on the embodiment shown in FIG. 12A and FIG. 12B, when the secondary base station serves as an IAB donor, the master base station generates $K_{IAB}$ by using the master base station key, and sends $K_{IAB}$ to the secondary base station. The IAB node generates $K_{IAB}$ by using the master base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 2: A first device (namely, an IAB node) registers with a network by using a first access network device that does not have an IAB donor function. Then, the first access network device selects, for the first device, a second access network device having the IAB donor function as a secondary base station. A second device is responsible for assigning an IP address of the IAB node to the first device.

Figure 13A:
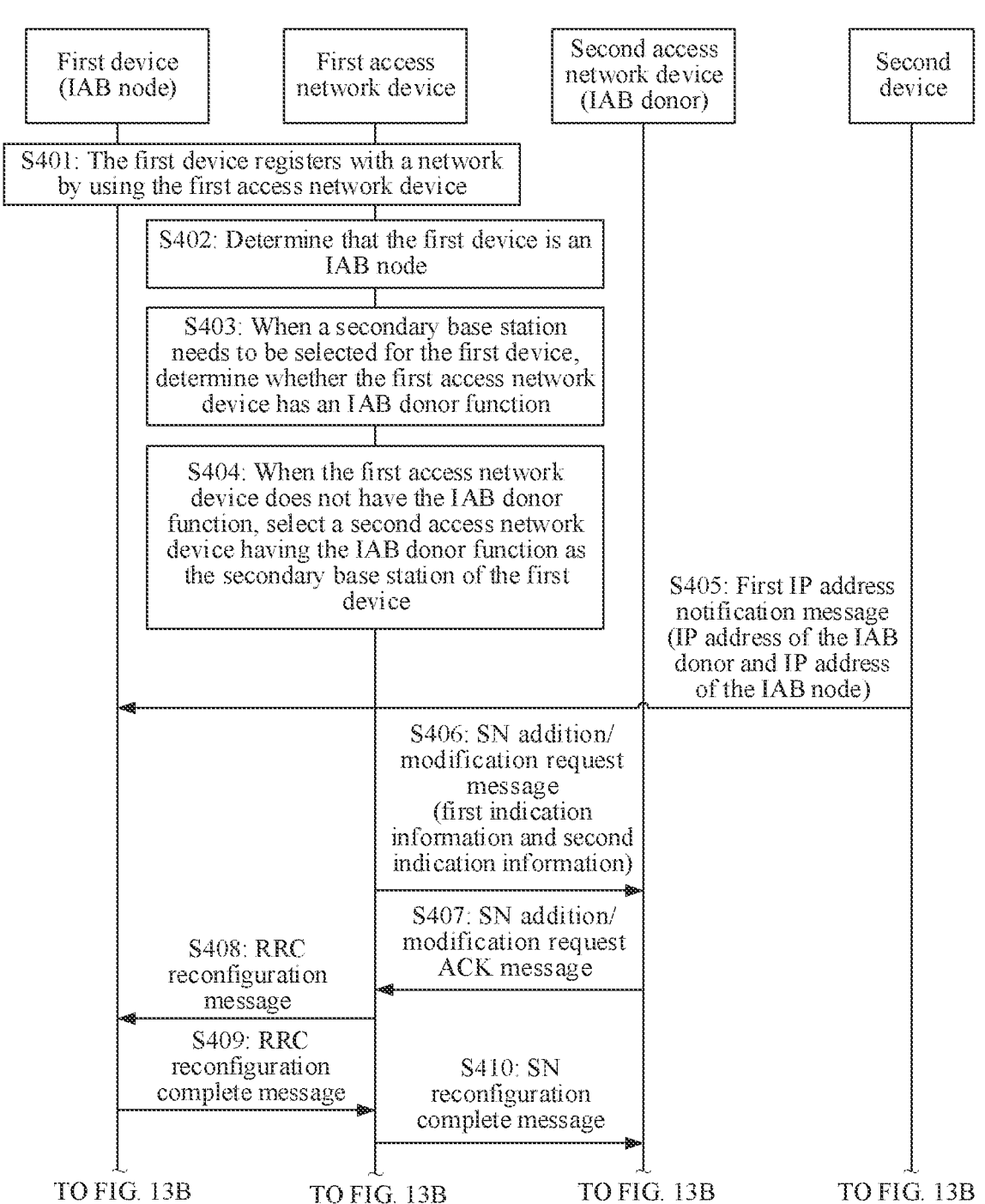

Based on Scenario 2, FIG. 13A and FIG. 13B show a key generation method according to an embodiment of this application. The method includes the following steps.

S401 to S404 are the same as steps S301 to S304. For specific descriptions thereof, refer to the embodiment shown in FIG. 12A and FIG. 12B. Details are not described herein again.

S405: The first device receives a first IP address notification message sent by a second device.

The first IP address notification message includes an IP address of an IAB donor and an IP address of the IAB node.

It should be understood that a sequence of performing step S405 and steps S406 to S410 is not limited in this embodiment of this application. In other words, step S405 may be performed before or after any one of steps S406 to S410.

S406: The first access network device sends an SN addition/modification request message to the second access network device.

The SN addition/modification request message includes third indication information. The third indication information indicates that the first device is the IAB node.

Optionally, the SN addition/modification request message may include first indication information and second indication information in addition to related information elements in the conventional technology.

S407: The first access network device receives an SN addition/modification request ACK message sent by the second access network device.

S408: The first access network device sends an RRC reconfiguration message to the first device.

S409: The first access network device receives an RRC reconfiguration complete message sent by the first device.

S410: The first access network device sends an SN reconfiguration complete message to the second access network device.

S411: The first device sends a second IP address notification message to the second access network device.

The second IP address notification message includes the IP address of the IAB node.

S412: The second access network device sends an SN key request message to the first access network device.

The SN key request message is used to request $K_{IAB}$.

The SN key request message includes the IP address of the IAB donor and the IP address of the IAB node.

S413: The first access network device generates $K_{IAB}$ based on the master base station key, the IP address of the IAB donor, and the IP address of the IAB node.

S414: The first access network device sends an SN key response message to the second access network device.

The SN key response message includes $K_{IAB}$.

S415: The first device determines a dual connectivity type.

S416: When the dual connectivity type is NE-DC, NR-DC, or NGEN-DC, the first device generates $K_{IAB}$ based on the master base station key, the IP address of the IAB donor, and the IP address of the IAB node.

S417: The first device and the second access network device establish a secure tunnel by using $K_{IAB}$.

Based on the embodiment shown in FIG. 13A and FIG. 13B, when the secondary base station serves as an IAB donor, the master base station generates $K_{IAB}$ by using the master base station key, and sends $K_{IAB}$ to the secondary base station. The IAB node generates $K_{IAB}$ by using the master base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 3: A first device (namely, an IAB node) registers with a network by using a first access network device having an IAB donor function. Therefore, the first access network device serves as an IAB donor of the first device, and the first access network device assigned an IP address of the IAB node to the first device. The first access network device selects a third access network device as a secondary base station for the first device.

Figure 14:
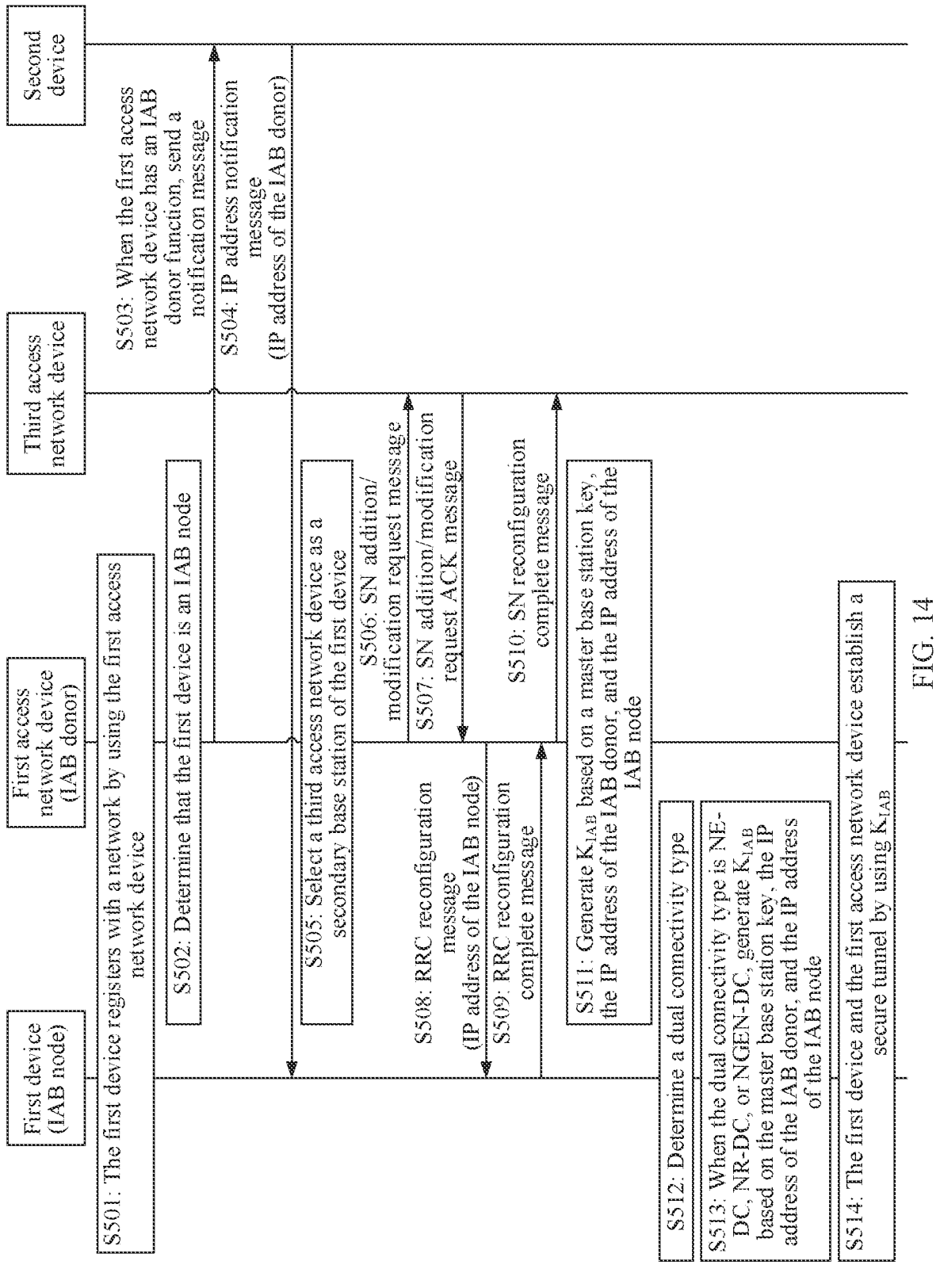
FIG. 14 is a flowchart of another key generation method according to an embodiment of this application.

Based on Scenario 3, FIG. 14 shows a key generation method according to an embodiment of this application. The method includes the following steps.

S501: A first device registers with a network through a first access network device.

S502: The first access network device determines that the first device is an IAB node.

S503: When the first access network device has an IAB node function, the first access network device sends a notification message to a second device.

The notification message indicates that the first device registers with the network by using the first access network device having the IAB donor function. In other words, the notification message indicates that the first access network device serves as an IAB donor of the first device.

Optionally, the notification message may include an identifier of the first device and an identifier of the first access network device.

S504: The second device sends an IP address notification message to the first device. The IP address notification information includes an IP address of the IAB donor.

It should be understood that step S504 may be performed at any moment before step S513. This is not limited in this embodiment of this application.

S505: The first access network device selects a third access network device as a secondary base station of the first device.

S506: The first access network device sends an SN addition/modification request message to the third access network device.

S507: The first access network device receives an SN addition/modification request ACK message sent by the third access network device.

S508: The first access network device sends an RRC reconfiguration message to the first device.

Because the first access network device serves as an IAB donor and is responsible for assigning an IP address of the IAB node to the first device, the RRC reconfiguration message may include the IP address of the IAB node.

S509: The first access network device receives an RRC reconfiguration complete message sent by the first device.

S510: The first access network device sends an SN reconfiguration complete message to the third access network device.

S511: The first access network device generates $K_{IAB}$ based on the master base station key, the IP address of the IAB donor, and the IP address of the IAB node.

It should be understood that a sequence of performing step S511 and steps S504 to S510 is not limited in this embodiment of this application. In other words, step S511 may be performed before or after any one of steps S504 to S510.

S512: The first device determines a dual connectivity type.

S513: When the dual connectivity type is NE-DC, NR-DC, or NGEN-DC, the first device generates $K_{IAB}$ based on the master base station key, the IP address of the IAB donor, and the IP address of the IAB node.

S514: The first device and the first access network device establish a secure tunnel by using $K_{IAB}$.

Based on the embodiment shown in FIG. 14, when the master base station serves as an IAB donor, both the master base station and the IAB node generate $K_{IAB}$ by using the master base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 4: A first device (namely, an IAB node) registers with a network by using a first access network device having an IAB donor function. Therefore, the first access network device serves as an IAB donor of the first device. The first access network device selects a third access network device as a secondary base station for the first device. A second device is responsible for assigning an IP address of the IAB node to the first device.

Figure 15:
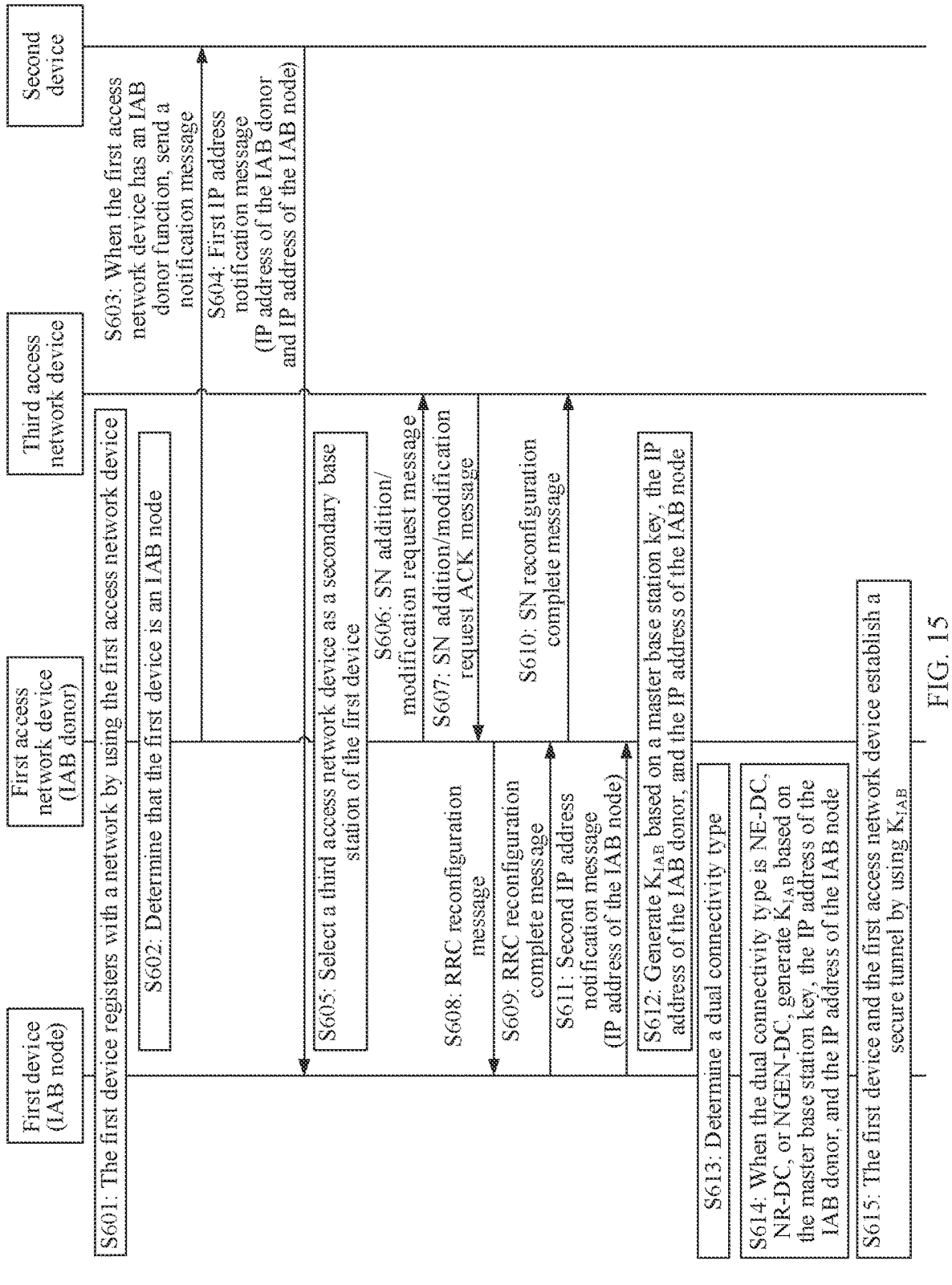
FIG. 15 is a flowchart of another key generation method according to an embodiment of this application.

Based on Scenario 4, FIG. 15 shows a key generation method according to an embodiment of this application. The method includes the following steps.

S601: A first device registers with a network by using a first access network device.

S602: The first access network device determines that the first device is an IAB node.

S603: When the first access network device has an IAB node function, the first access network device sends a notification message to a second device.

The notification message indicates that the first device registers with the network by using the first access network device having the IAB donor function. In other words, the notification message indicates that the first access network device serves as an IAB donor of the first device.

S604: The second device sends a first IP address notification message to the first device.

The first IP address notification message includes an IP address of the IAB node and an IP address of an IAB donor.

It should be understood that a sequence of performing steps S603 and S604 and steps S605 to S610 is not limited in this embodiment of this application. In other words, steps S603 and S604 may be performed before or after any one of steps S606 to S610.

S605: The first access network device selects a third access network device as a secondary base station of the first device.

S606: The first access network device sends an SN addition/modification request message to the third access network device.

S607: The first access network device receives an SN addition/modification request ACK message sent by the third access network device.

S608: The first access network device sends an RRC reconfiguration message to the first device.

S609: The first access network device receives an RRC reconfiguration complete message sent by the first device.

S610: The first access network device sends an SN reconfiguration complete message to the third access network device.

S611: The first access network device receives a second IP address notification message sent by the first device.

The second IP address notification message includes the IP address of the IAB node.

S612: The first access network device generates $K_{IAB}$ based on the master base station key, the IP address of the IAB donor, and the IP address of the IAB node.

It should be understood that steps S611 and S612 may be performed at any moment after step S604. This is not limited in this embodiment of this application.

S613: The first device determines a dual connectivity type.

S614: When the dual connectivity type is NE-DC, NR-DC, or NGEN-DC, the first device generates $K_{IAB}$ based on the master base station key, the IP address of the IAB donor, and the IP address of the IAB node.

S615: The first device and the first access network device establish a secure tunnel by using $K_{IAB}$.

Based on the embodiment shown in FIG. 15, when the master base station serves as an IAB donor, both the master base station and the IAB node generate $K_{IAB}$ by using the master base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Technical Solution 2

Figure 16:
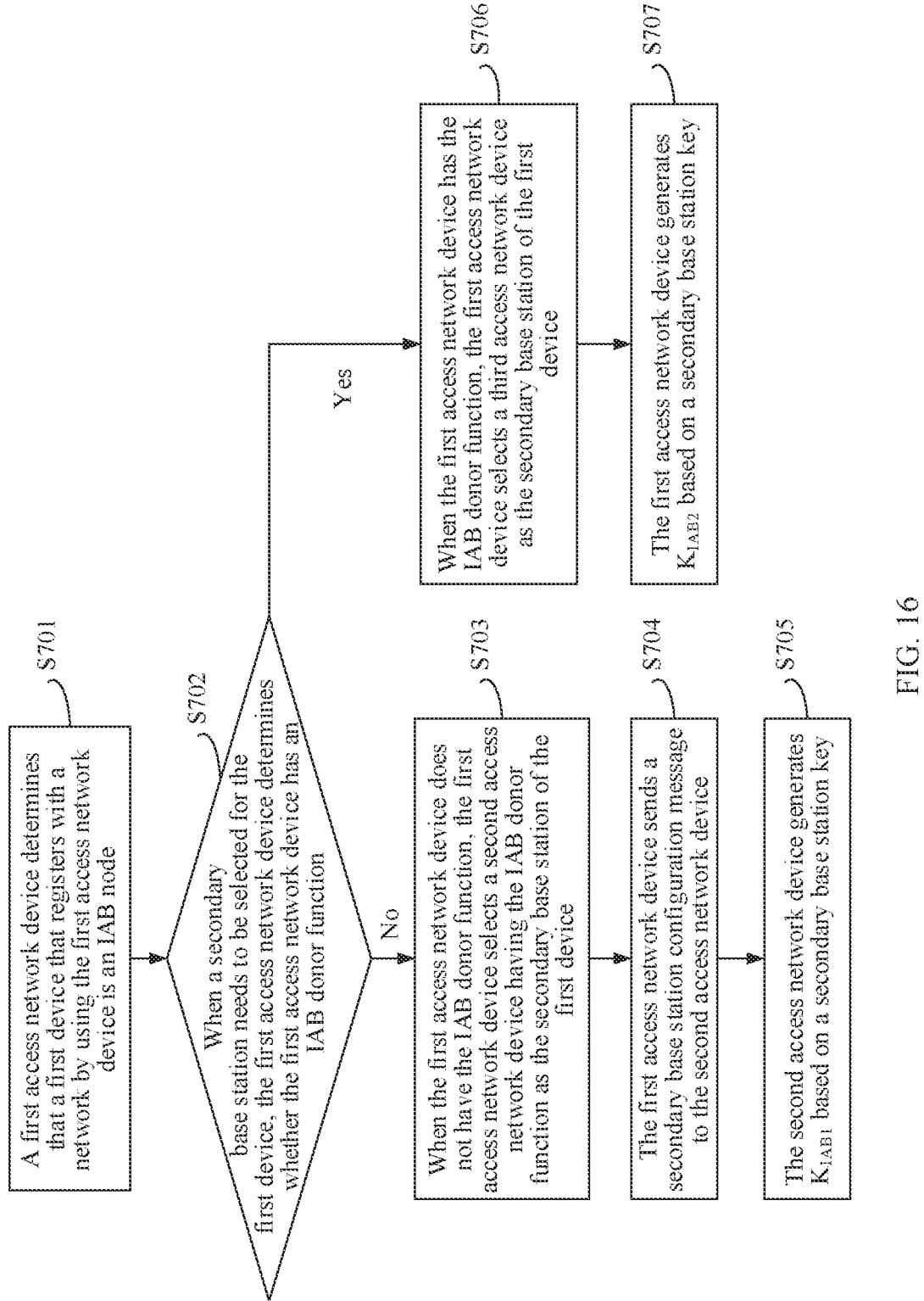
FIG. 16 is a flowchart of another key generation method according to an embodiment of this application.
Figure 17:
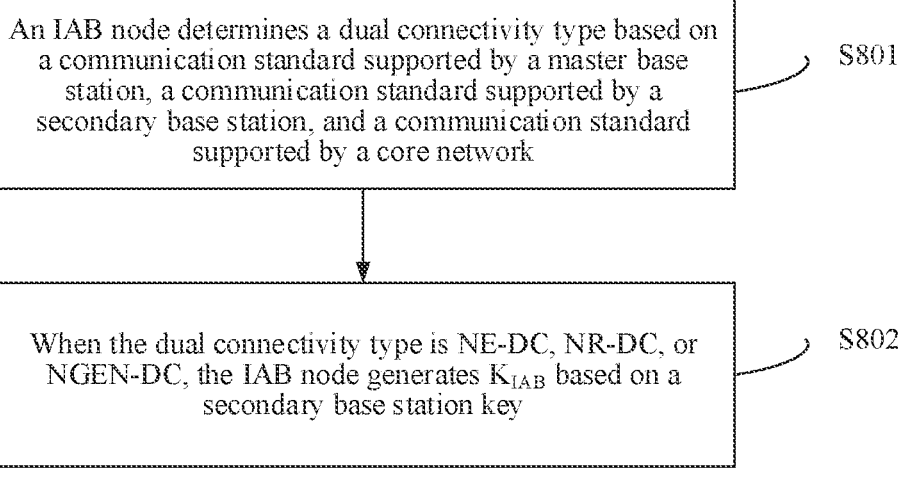
FIG. 17 is a flowchart of another key generation method according to an embodiment of this application.

In a dual connectivity scenario (for example, an NE-DC, NR-DC, or NGEN-DC scenario), a network side may obtain an IAB key according to an embodiment shown in FIG. 16, and an IAB node may obtain an IAB key according to an embodiment shown in FIG. 17.

FIG. 16 shows a key generation method according to an embodiment of this application. The method includes the following steps.

S701: A first access network device determines that a first device that registers with a network by using the first access network device is an IAB node.

S702: When a secondary base station needs to be selected for the first device, the first access network device determines whether the first access network device has an IAB node function.

Steps S701 and S702 are similar to steps S101 and S102 in FIG. 10. For a specific implementation thereof, refer to the descriptions in the embodiment shown in FIG. 10.

It should be understood that the first access network device may generate a secondary base station key based on a master base station key and an SN count value.

Optionally, when the first access network device does not have the IAB donor function, the following steps S703 to S705 are performed; or when the first access network device has the IAB donor function, the following steps S706 and S707 are performed.

S703: When the first access network device does not have the IAB donor function, the first access network device selects a second access network device having the IAB donor function as the secondary base station of the first device.

S704: The first access network device sends a secondary base station configuration message to the second access network device.

The secondary base station configuration message is used to configure the second access network device as the secondary base station of the first device.

In this embodiment of this application, the secondary base station configuration message includes third indication information and a secondary base station key. The third indication information indicates that the first device is the IAB node.

It should be understood that when the secondary base station configuration message includes the third indication information, the second access network device can learn, based on the third indication information, that the first device is an IAB node. Further, the second access network device determines whether the second access network device has the IAB donor function. When the second access network device has the IAB donor function, the second access network device may consider that the second access network device is an IAB donor of the first device, and therefore the second access network device may perform the following step S705.

S705: The second access network device generates $K_{IAB1}$ based on the secondary base station key.

In a possible implementation, the second access network device generates $K_{IAB1}$ based on the secondary base station key and a first key input parameter. The first key input parameter includes a first IP address and a second IP address. The first IP address is an IP address used by the first device to communicate with an IAB donor. The second IP address is an IP address used by the second access network device to communicate with an IAB node.

In this embodiment of this application, the second access network device may obtain the second IP address from a database of the second access network device.

In this embodiment of this application, the second access network device may determine the first IP address, or the second access network device obtains the first IP address from the first device or a second device.

Based on the foregoing steps S703 to S705, when the secondary base station (namely, the second access network device) serves as an IAB donor, the secondary base station actively generates $K_{IAB}$ by using the secondary base station key, to ensure that the IAB donor and the IAB node maintain the same $K_{IAB}$.

S706: When the first access network device has the IAB donor function, the first access network device selects a third access network device as the secondary base station of the first device.

S707: The first access network device generates $K_{IAB2}$ based on the secondary base station key.

In a possible implementation, the first access network device generates $K_{IAB2}$ based on the secondary base station key and a second key input parameter. The second key input parameter includes a first IP address and a third IP address. The first IP address is an IP address used by the first device to communicate with an IAB donor. The third IP address is an IP address used by the first access network device to communicate with an IAB node.

In this embodiment of this application, the first access network device may obtain the third IP address from a database of the first access network device.

In this embodiment of this application, the first access network device may determine the first IP address, or the first access network device obtains the first IP address from the first device or a second device.

Based on the foregoing steps S706 and S707, when a master base station (namely, the first access network device) serves as an IAB donor, the master base station actively generates $K_{IAB}$ by using the secondary base station key, to ensure that the IAB donor and the IAB node maintain the same $K_{IAB}$.

FIG. 17 shows a key generation method according to an embodiment of this application. The method is applied to a scenario in which an IAB node is connected to a master base station and a secondary base station. The method includes the following steps.

S801 is the same as step S20. For specific descriptions thereof, refer to the embodiment shown in FIG. 11. Details are not described herein again.

S802: When the dual connectivity type is NE-DC, NR-DC, or NGEN-DC, the IAB node generates $K_{IAB}$ based on a secondary base station key.

The IAB node may derive the secondary base station key from a master base station key.

In a possible implementation, the IAB node generates $K_{IAB}$ based on the secondary base station key and a key input parameter.

It should be understood that, for specific descriptions and an obtaining manner of the key input parameter, refer to related descriptions of step S202 in the embodiment shown in FIG. 11. Details are not described herein again.

Based on the embodiment shown in FIG. 17, in an NE-DC, NR-DC, or NGEN-DC scenario, it is ensured that the IAB node generates $K_{IAB}$ by using the secondary base station key, to ensure that an IAB donor and the IAB node maintain the same $K_{IAB}$.

The following describes the technical solution 2 in detail by using examples with reference to specific application scenarios.

Scenario 1: A first device (namely, an IAB node) registers with a network by using a first access network device that does not have an IAB donor function. Then, the first access network device selects, for the first device, a second access network device having the IAB donor function as a secondary base station, and the second access network device is responsible for assigning an IP address of the IAB node to the first device.

Figure 18:
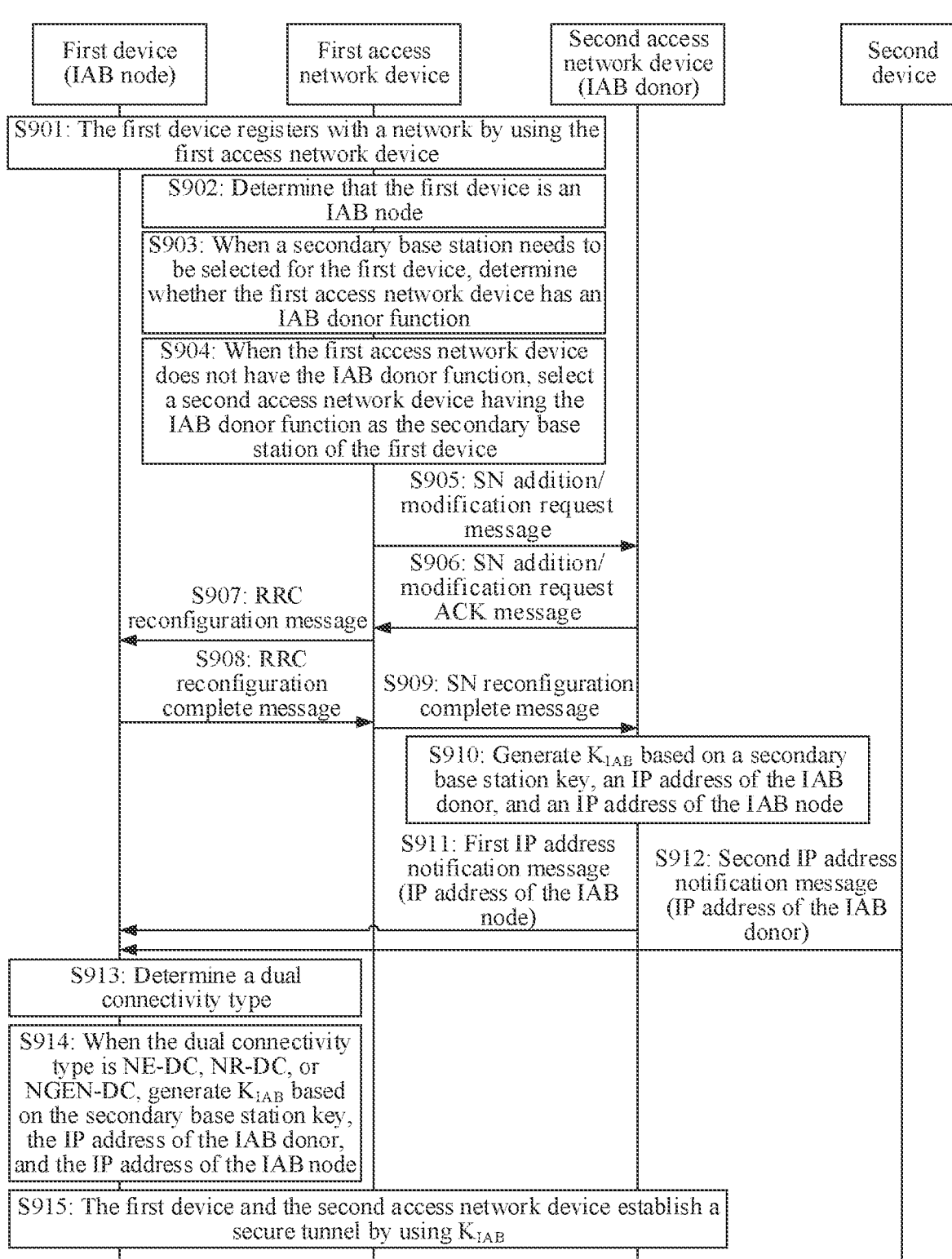
FIG. 18 is a flowchart of another key generation method according to an embodiment of this application.

Based on Scenario 1, FIG. 18 shows a key generation method according to an embodiment of this application. The method includes the following steps.

S901: A first device registers with a network by using a first access network device.

S902: The first access network device determines that the first device is an IAB node.

S903: When a secondary base station needs to be selected for the first device, the first access network device determines whether the first access network device has an IAB node function.

S904: When the first access network device does not have the IAB node function, the first access network device selects a second access network device having the IAB donor function as the secondary base station of the first device.

After selecting the secondary base station, the first access network device may derive a secondary base station key from a master base station key and an SN count value.

S905: The first access network device sends an SN addition/modification request message to the second access network device.

The SN addition/modification request message includes a secondary base station key and third indication information. The third indication information indicates that the first device is the IAB node.

When the SN addition/modification request message includes the third indication information, the second access network device may determine whether the second access network device has the IAB donor function. When the second access network device has the IAB donor function, the second access network device may be considered as an IAB donor of the first device, and therefore the second access network device needs to perform the following step S910.

S906: The first access network device receives an SN addition/modification request ACK message sent by the second access network device.

S907: The first access network device sends an RRC reconfiguration message to the first device.

The RRC reconfiguration message is used to configure a radio bearer between the second access network device and the first device. Therefore, the first device can learn, based on the RRC reconfiguration message, that the second access network device serves as the secondary base station.

In addition, the RRC reconfiguration message further includes an SN count value. Therefore, the first device can derive the secondary base station key from a master base station key and the SN count value.

S908: The first access network device receives an RRC reconfiguration complete message sent by the first device.

S909: The first access network device sends an SN reconfiguration complete message to the second access network device.

It should be understood that after the second access network device receives the SN reconfiguration complete message, the second access network device may establish an RRC connection to the first device, so that the second access network device can directly communicate with the first device.

S910: The second access network device generates $K_{IAB}$ based on the secondary base station key, an IP address of the IAB donor, and an IP address of the IAB node.

It should be understood that the second access network device locally obtains the IP address of the IAB donor. In addition, the second access network device assigned the IP address of the IAB node to the first device.

It should be understood that step S910 may be performed at any moment after step S905. This is not limited in this embodiment of this application.

S911: The second access network device sends a first IP address notification message to the first device.

The first IP address notification message includes the IP address of the IAB node.

S912: A second device sends a second IP address notification message to the first device.

The second IP address notification message includes the IP address of the IAB donor.

It should be understood that step S912 may be performed at any moment after step S904. This is not limited in this embodiment of this application.

Based on steps S911 and S912, the first device can obtain the IP address of the IAB donor and the IP address of the IAB node.

S913: The first device determines a dual connectivity type.

S914: When the dual connectivity type is NE-DC, NR-DC, or NGEN-DC, the first device generates $K_{IAB}$ based on the secondary base station key, the IP address of the IAB donor, and the IP address of the IAB node.

S915: The first device and the second access network device establish a secure tunnel by using $K_{IAB}$.

Based on the embodiment shown in FIG. 18, when the secondary base station serves as an IAB donor, the secondary base station generates $K_{IAB}$ by using the secondary base station key, and the IAB node generates $K_{IAB}$ by using the secondary base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 2: A first device (namely, an IAB node) registers with a network by using a first access network device that does not have an IAB donor function. Then, the first access network device selects, for the first device, a second access network device having the IAB donor function as a secondary base station. A second device is responsible for assigning an IP address of the IAB node to the first device.

Figure 19:
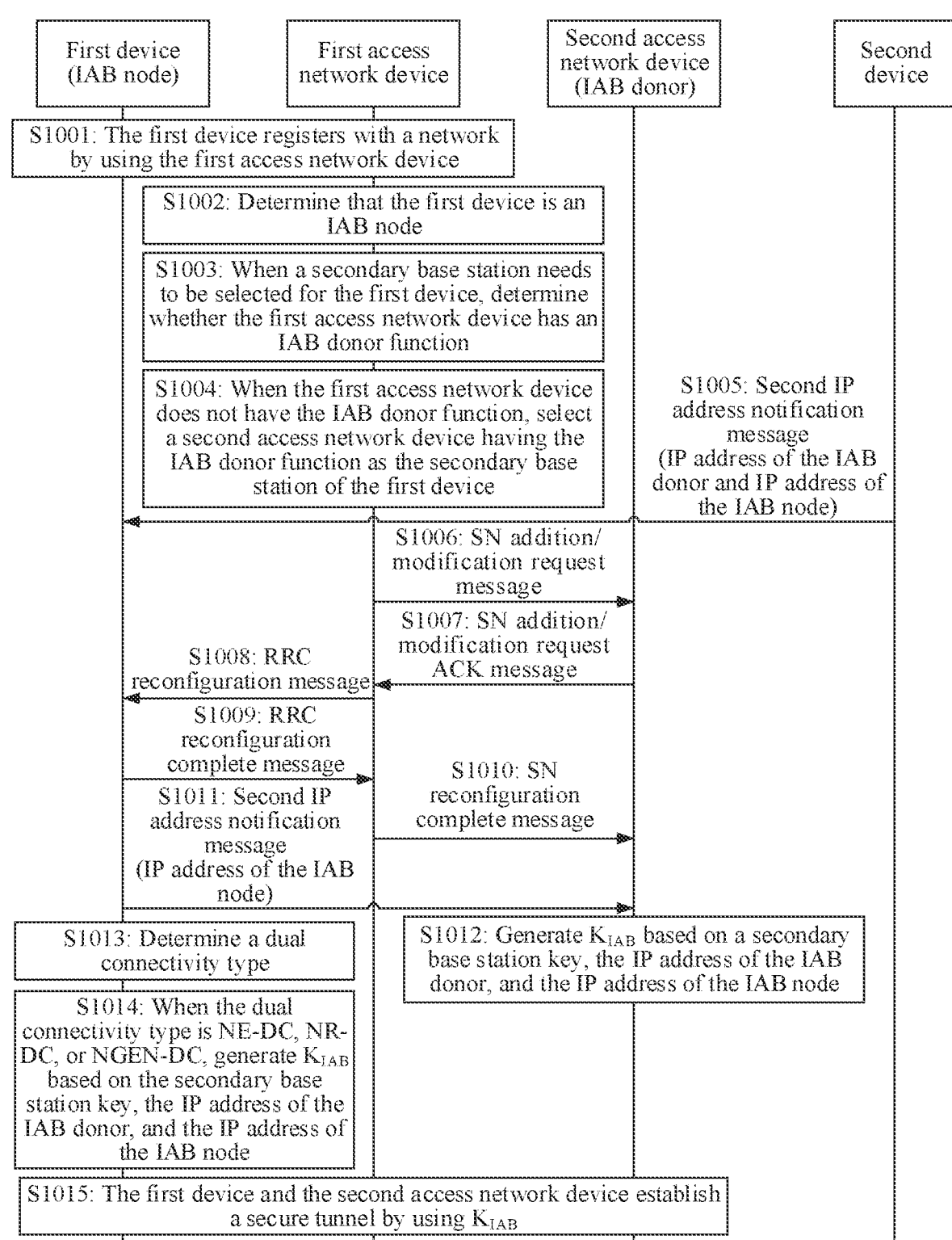
FIG. 19 is a flowchart of another key generation method according to an embodiment of this application.

Based on Scenario 2, FIG. 19 shows a key generation method according to an embodiment of this application. The method includes the following steps.

S1001: A first device registers with a network by using a first access network device.

S1002: The first access network device determines that the first device is an IAB node.

S1003: When a secondary base station needs to be selected for the first device, the first access network device determines whether the first access network device has an IAB node function.

S1004: When the first access network device does not have the IAB node function, the first access network device selects a second access network device having the IAB donor function as the secondary base station of the first device.

S1005: A second device sends a first IP address notification message to the first device.

The first IP address notification message includes an IP address of the IAB node and an IP address of an IAB donor.

It should be understood that step S1005 may be performed at any moment after step S1004 and before step S1011. This is not limited in this embodiment of this application.

S1006: The first access network device sends an SN addition/modification request message to the second access network device.

The SN addition/modification request message includes a secondary base station key and third indication information. The third indication information indicates that the first device is the IAB node.

When the SN addition/modification request message includes the third indication information, the second access network device may determine whether the second access network device has the IAB donor function. When the second access network device has the IAB donor function, the second access network device may be considered as an IAB donor of the first device, and therefore the second access network device needs to perform the following step S1012.

S1007: The first access network device receives an SN addition/modification request ACK message sent by the second access network device.

S1008: The first access network device sends an RRC reconfiguration message to the first device.

The RRC reconfiguration message is used to configure a radio bearer between the second access network device and the first device. Therefore, the first device can learn, based on the RRC reconfiguration message, that the second access network device serves as the secondary base station.

In addition, the RRC reconfiguration message further includes an SN count value. Therefore, the first device can derive the secondary base station key from a master base station key and the SN count value.

S1009: The first access network device receives an RRC reconfiguration complete message sent by the first device.

S1010: The first access network device sends an SN reconfiguration complete message to the second access network device.

It should be understood that after the second access network device receives the SN reconfiguration complete message, the second access network device may establish an RRC connection to the first device, so that the second access network device can directly communicate with the first device.

S1011: The first device sends a second IP address notification message to the second access network device.

The second IP address notification message includes the IP address of the IAB donor.

S1012: The second access network device generates $K_{IAB}$ based on the secondary base station key, an IP address of the IAB donor, and an IP address of the IAB node.

It should be understood that the second access network device locally obtains the IP address of the IAB donor. The second access network device obtains the IP address of the IAB node based on the second IP address notification message.

S1013: The first device determines a dual connectivity type.

S1014: When the dual connectivity type is NE-DC, NR-DC, or NGEN-DC, the first device generates $K_{IAB}$ based on the secondary base station key, the IP address of the IAB donor, and the IP address of the IAB node.

It should be understood that steps S1013 and S1014 may be performed at any moment after step S1008. This is not limited in this embodiment of this application.

S1015: The first device and the second access network device establish a secure tunnel by using $K_{IAB}$.

Based on the embodiment shown in FIG. 19, when the secondary base station serves as an IAB donor, the secondary base station generates $K_{IAB}$ by using the secondary base station key, and the IAB node generates $K_{IAB}$ by using the secondary base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 3: A first device (namely, an IAB node) registers with a network by using a first access network device having an IAB donor function. Therefore, the first access network device serves as an IAB donor of the first device, and the first access network device assigned an IP address of the IAB node to the first device. The first access network device selects a third access network device as a secondary base station for the first device.

Figure 20:
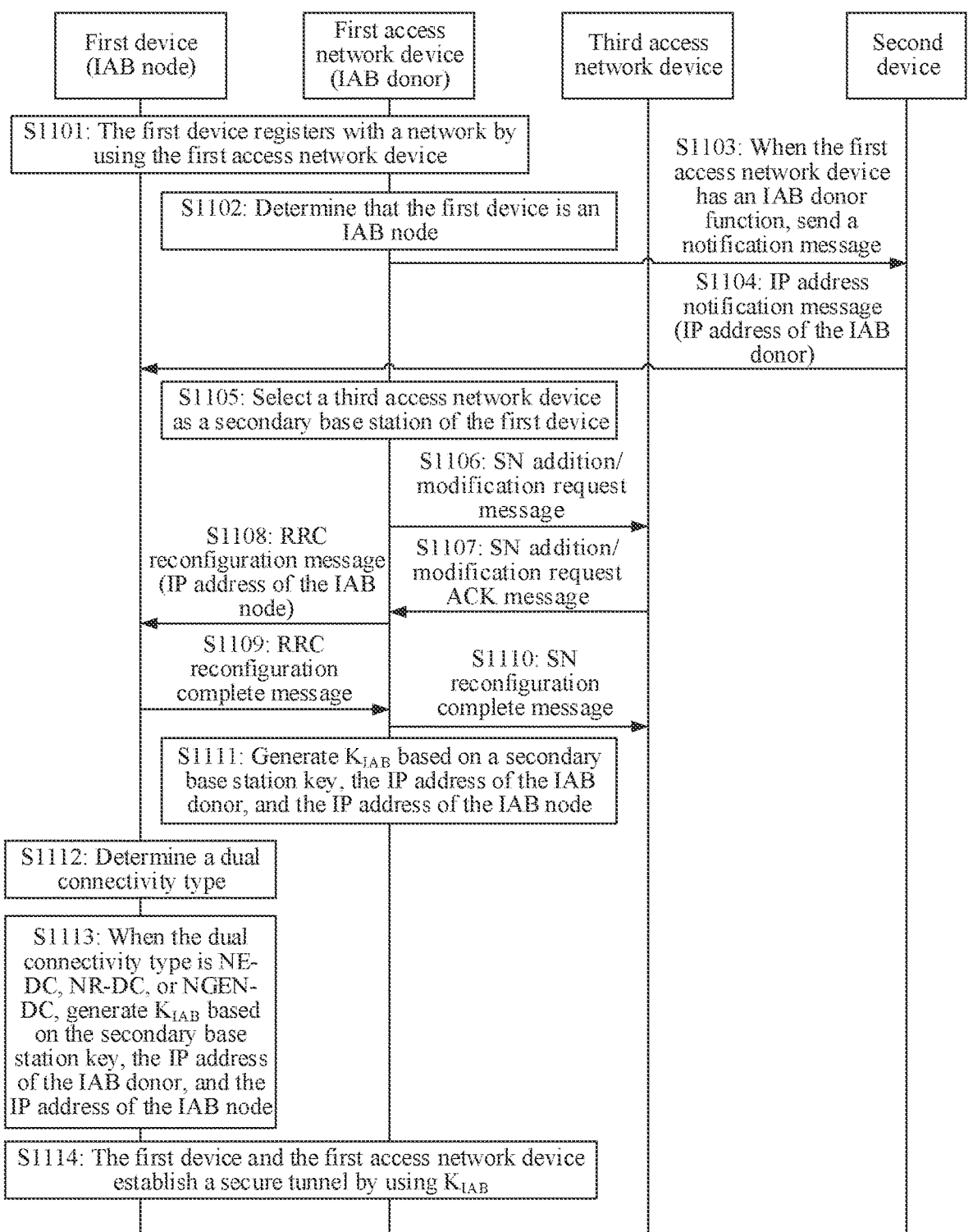
FIG. 20 is a flowchart of another key generation method according to an embodiment of this application.

Based on Scenario 3, FIG. 20 shows a key generation method according to an embodiment of this application. The method includes the following steps.

S1101 to S1110 are the same as steps S501 to S510. For specific descriptions thereof, refer to the embodiment shown in FIG. 14. Details are not described herein again.

After selecting the third access network device as the secondary base station, the first access network device generates a secondary base station key, and sends the secondary base station key to the third access network device by using the SN addition/modification request message.

S1111: The first access network device generates $K_{IAB}$ based on the secondary base station key, the IP address of the IAB donor, and the IP address of the IAB node.

It should be understood that step S1111 may be performed at any moment after S1105. This is not limited in this embodiment of this application.

Optionally, if step S1111 is performed before step S1106, the first access network device may delete the secondary base station key after completing performing step S1106.

Optionally, if step S1111 is performed after step S1106, the first access network device needs to store the secondary base station key before completing performing step S1106, until the first access network device completes performing step S1111.

S1112: The first device determines a dual connectivity type.

S1113: When the dual connectivity type is NE-DC, NR-DC, or NGEN-DC, the first device generates $K_{IAB}$ based on the secondary base station key, the IP address of the IAB donor, and the IP address of the IAB node.

It should be understood that steps S1112 and S1113 may be performed at any moment after step S1108. This is not limited in this embodiment of this application.

S1114: The first device and the first access network device establish a secure tunnel by using $K_{IAB}$.

Based on the embodiment shown in FIG. 20, when a master base station serves as an IAB donor, both the master base station and the IAB node generate $K_{IAB}$ by using the secondary base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 4: A first device (namely, an IAB node) registers with a network by using a first access network device having an IAB donor function. Therefore, the first access network device serves as an IAB donor of the first device. The first access network device selects a third access network device as a secondary base station for the first device. A second device is responsible for assigning an IP address of the IAB node to the first device.

Figure 21:
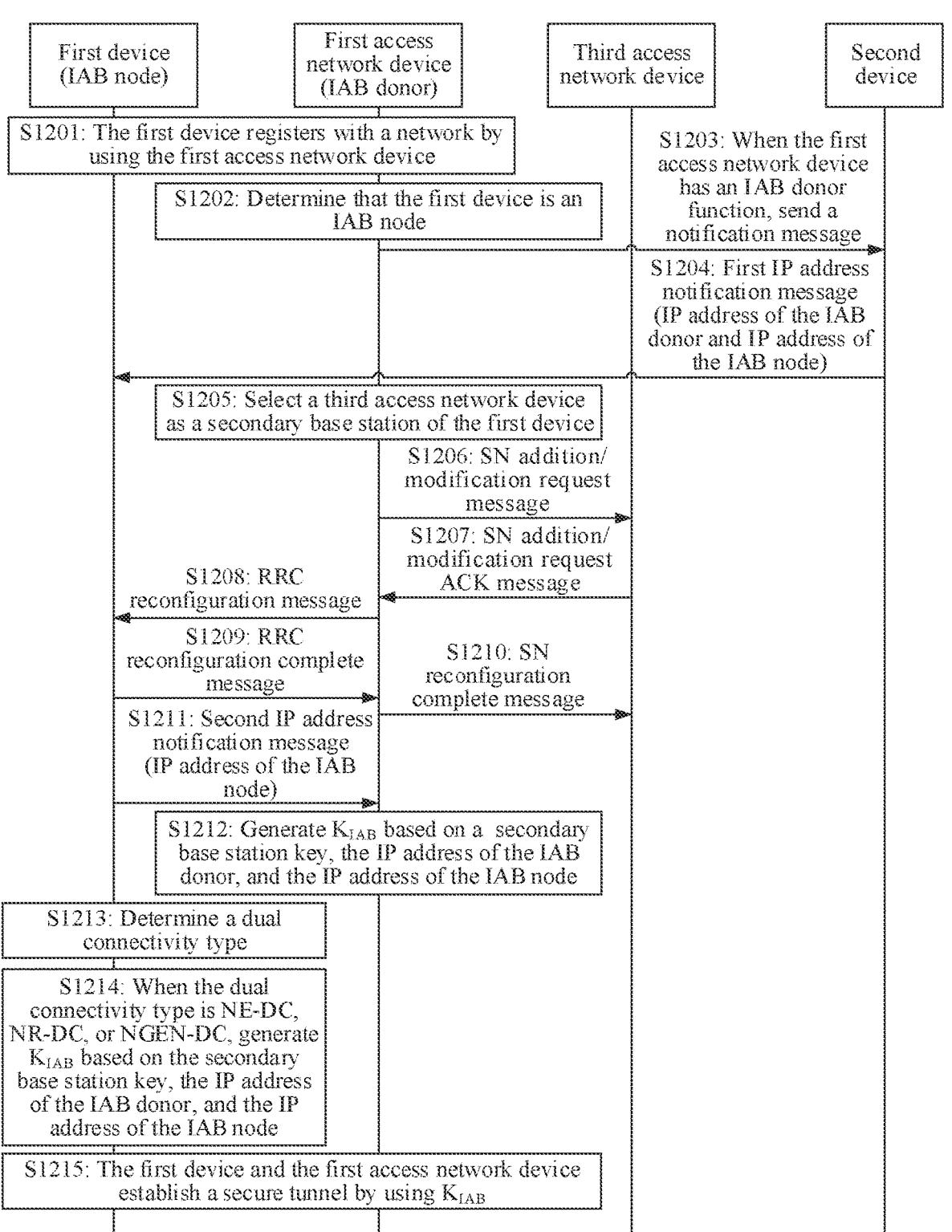
FIG. 21 is a flowchart of another key generation method according to an embodiment of this application.

Based on Scenario 4, FIG. 21 shows a key generation method according to an embodiment of this application. The method includes the following steps.

S1201 to S1211 are the same as steps S601 to S611. For specific descriptions thereof, refer to the embodiment shown in FIG. 15. Details are not described herein again.

After selecting the third access network device as the secondary base station, the first access network device generates a secondary base station key, and sends the secondary base station key to the third access network device by using the SN addition/modification request message.

S1212: The first access network device generates $K_{IAB}$ based on the secondary base station key, the IP address of the IAB donor, and the IP address of the IAB node.

It should be understood that step S1211 may be performed at any moment after step S1204. Step S1212 may be performed at any moment after steps S1205 and S1211.

Optionally, if step S1212 is performed before step S1206, the first access network device may delete the secondary base station key after completing performing step S1206.

Optionally, if step S1212 is performed after step S1206, the first access network device needs to store the secondary base station key before completing performing step S1206, until the first access network device completes performing step S1212.

S1213: The first device determines a dual connectivity type.

S1214: When the dual connectivity type is NE-DC, NR-DC, or NGEN-DC, the first device generates $K_{IAB}$ based on the secondary base station key, the IP address of the IAB donor, and the IP address of the IAB node.

It should be understood that steps S1213 and S1214 may be performed at any moment after step S1208. This is not limited in this embodiment of this application.

S1215: The first device and the first access network device establish a secure tunnel by using $K_{IAB}$.

Based on the embodiment shown in FIG. 21, when a master base station serves as an IAB donor, both the master base station and the IAB node generate $K_{IAB}$ by using the secondary base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Technical Solution 3

Figure 22:
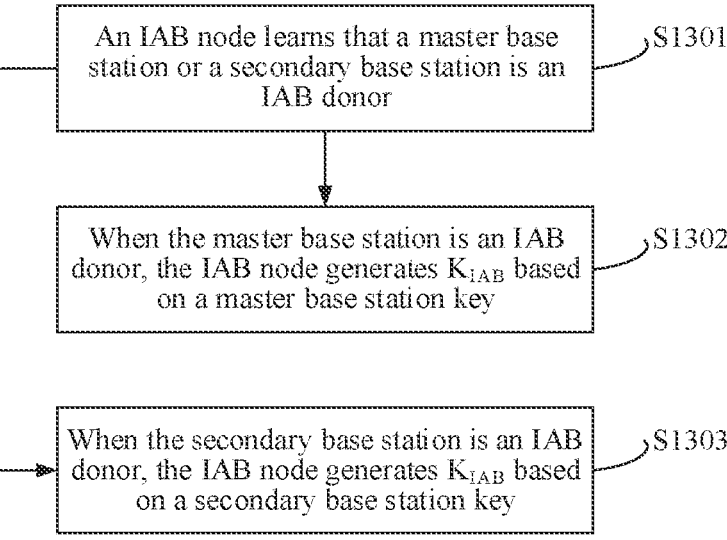
FIG. 22 is a flowchart of another key generation method according to an embodiment of this application.

In some dual connectivity scenarios (for example, an NE-DC, NR-DC, or NGEN-DC scenario), an IAB node may obtain $K_{IAB}$ according to an embodiment shown in FIG. 22, and a network side may obtain $K_{IAB}$ according to an embodiment shown in FIG. 23.

FIG. 22 shows a key generation method according to an embodiment of this application. The method is applied to a scenario in which a first device (an IAB node) is connected to a master base station and a secondary base station. The method includes the following steps.

S1301: The IAB node determines that the master base station or the secondary base station serves as an IAB donor.

Optionally, step S1301 may be performed in any one of the following implementations:

Implementation 1: When the IAB node receives fourth indication information, the IAB node learns that the master base station is an IAB donor. The fourth indication information indicates that the master base station is an IAB donor. Alternatively, when the IAB node receives fifth indication information, the IAB node learns that the secondary base station is an IAB donor. The fifth indication information indicates that the secondary base station is an IAB donor.

Optionally, that the IAB node receives fourth indication information may be specifically implemented as follows: The IAB node receives fourth indication information sent by the master base station. For example, in this case, the fourth indication information may be carried in an RRC reconfiguration message sent by the master base station to the IAB node.

Optionally, that the IAB node receives fifth indication information may be specifically implemented as follows: The IAB node receives fifth indication information sent by the master base station or the secondary base station. For example, in this case, the fifth indication information may be carried in an RRC reconfiguration message sent by the master base station to the IAB node. Alternatively, the fifth indication information may be carried in an AS message sent by the secondary base station to the IAB node.

Implementation 2: When a wireless backhaul link is established between the IAB node and the master base station, the IAB node learns that the master base station is an IAB donor; or when a wireless backhaul link is established between the IAB node and the secondary base station, the IAB node learns that the secondary base station is an IAB donor.

Implementation 3: The IAB node obtains a frequency band supported by the master base station and a frequency band supported by the secondary base station. When the frequency band supported by the master base station is greater than the frequency band supported by the secondary base station, the IAB node learns that the master base station is an IAB donor; or when the frequency band of the master base station is less than the frequency band supported by the secondary base station, the IAB node learns that the secondary base station is an IAB donor.

Implementation 4: When the IAB node receives sixth indication information broadcast by the master base station, the IAB node learns that the master base station is an IAB donor; or when the IAB node receives sixth indication information broadcast by the secondary base station, the IAB node learns that the secondary base station is an IAB donor. The sixth indication information indicates that a base station has an IAB donor function.

S1302: When the master base station serves as an IAB donor, the IAB node generates $K_{IAB}$ based on a master base station key.

In a possible implementation, the IAB node generates $K_{IAB}$ based on the master base station key and a key input parameter.

The master base station key is generated in a process in which the IAB node registers with a network through the master base station.

S1303: When the secondary base station serves as an IAB donor, the IAB node generates $K_{IAB}$ based on a secondary base station key.

In a possible implementation, the IAB node generates $K_{IAB}$ based on the secondary base station key and a key input parameter.

The secondary base station key is generated by the IAB node based on the master base station key.

Based on the embodiment shown in FIG. 22, regardless of whether the master base station serves as an IAB donor or the secondary base station serves as an IAB donor, the IAB node can generate $K_{IAB}$ by using a local key of the IAB donor, to ensure that the IAB node and the IAB donor maintain the same $K_{IAB}$.

FIG. 23 shows a key generation method according to an embodiment of this application. The method includes the following steps.

S1401: A first access network device determines that a first device that registers with a network by using the first access network device is an IAB node.

S1402: When a secondary base station needs to be selected for the first device, the first access network device determines whether the first access network device has an IAB node function.

Steps S1401 and S1402 are similar to steps S101 and S102 in FIG. 10. For a specific implementation thereof, refer to the descriptions in the embodiment shown in FIG. 10.

Optionally, when the first access network device does not have the IAB donor function, the following steps S1403 to S1405 are performed; or when the first access network device has the IAB donor function, the following steps S1406 and S1407 are performed.

S1403: When the first access network device does not have the IAB donor function, the first access network device selects a second access network device having the IAB donor function as the secondary base station of the first device.

S1404: The first access network device sends a secondary base station configuration message to the second access network device.

The secondary base station configuration message is used to configure the second access network device as the secondary base station of the first device.

In this embodiment of this application, the secondary base station configuration message includes third indication information and a secondary base station key. The third indication information indicates that the first device is the IAB node.

It should be understood that when the secondary base station configuration message includes the third indication information, the second access network device can learn that the first device is an IAB node. Therefore, the second access network device may determine whether the second access network device has the IAB donor function. When the second access network device has the IAB donor function, the second access network device may consider that the second access network device is an IAB donor of the first device, and therefore the second access network device may perform the following step S1405.

S1405: The second access network device generates $K_{IAB1}$ based on the secondary base station key.

In a possible implementation, the second access network device generates $K_{IAB1}$ based on the secondary base station key and a first key input parameter. The first key input parameter includes a first IP address and a second IP address. The first IP address is an IP address used by the first device to communicate with an IAB donor. The second IP address is an IP address used by the second access network device to communicate with an IAB node.

In this embodiment of this application, the second access network device may obtain the second IP address from a database of the second access network device.

In this embodiment of this application, the second access network device may determine the first IP address, or the second access network device obtains the first IP address from the first device or a second device.

Based on the foregoing steps S1403 to S1405, when the secondary base station (namely, the second access network device) serves as an IAB donor, the secondary base station actively generates $K_{IAB}$ by using the secondary base station key, to ensure that the IAB donor and the IAB node maintain the same $K_{IAB}$.

S1406: When the first access network device has the IAB donor function, the first access network device selects a third access network device as the secondary base station of the first device.

S1407: The first access network device generates $K_{IAB2}$ based on a master base station key.

In a possible implementation, the first access network device generates $K_{IAB2}$ based on the master base station key and a second key input parameter. The second key input parameter includes a first IP address and a third IP address. The first IP address is an IP address used by the first device to communicate with an IAB donor. The third IP address is an IP address used by the first access network device to communicate with an IAB node.

In this embodiment of this application, the first access network device may obtain the third IP address from a database of the first access network device.

In this embodiment of this application, the first access network device may determine the first IP address, or the first access network device obtains the first IP address from the first device or a second device.

Based on the foregoing steps S1406 and S1407, when the master base station (namely, the first access network device) serves as an IAB donor, the master base station actively generates $K_{IAB}$ by using the master base station key, to ensure that the IAB donor and the IAB node maintain the same $K_{IAB}$.

The following describes the technical solution 3 in detail by using examples with reference to specific application scenarios.

Scenario 1: A first device (namely, an IAB node) registers with a network by using a first access network device that does not have an IAB donor function. Then, the first access network device selects, for the first device, a second access network device having the IAB donor function as a secondary base station, and the second access network device is responsible for assigning an IP address of the IAB node to the first device.

Figure 24:
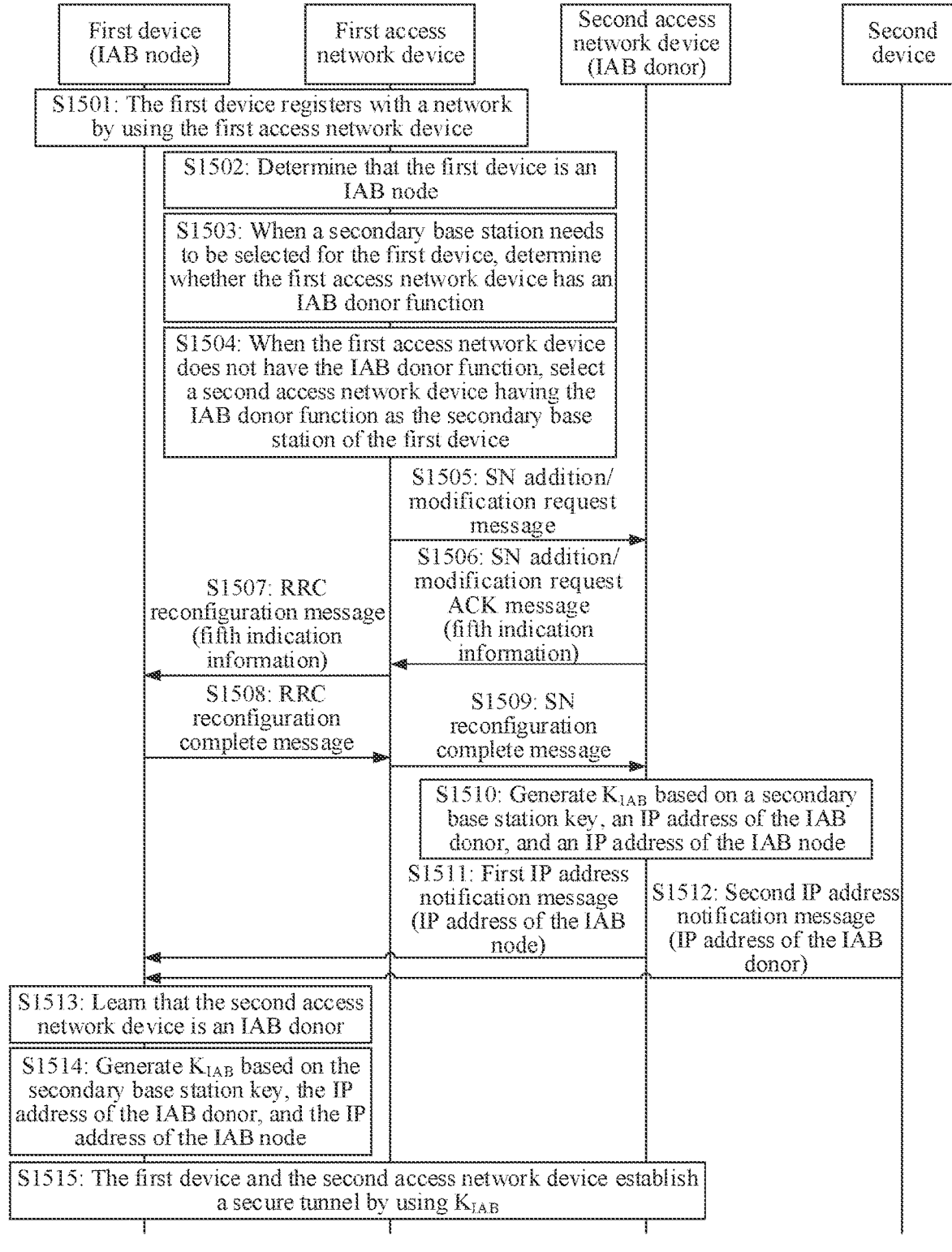
FIG. 24 is a flowchart of another key generation method according to an embodiment of this application.

Based on Scenario 1, FIG. 24 shows a key generation method according to an embodiment of this application. The method includes the following steps.

S1501 to S1512 are similar to steps S901 to S912. For specific descriptions thereof, refer to the embodiment shown in FIG. 18. Details are not described herein again.

Optionally, different from step S906, in step S1506, the SN addition/modification request ACK message sent by the second access network device may include fifth indication information.

Optionally, different from step S907, in step S1507, the RRC reconfiguration message sent by the first access network device may include fifth indication information, so that the first device learns that the secondary base station (namely, the second access network device) is an IAB donor.

S1513: The first device learns that the second access network device is an IAB donor.

S1514: The first device generates $K_{IAB}$ based on the secondary base station key, the IP address of the IAB donor, and the IP address of the IAB node.

S1515: The first device and the second access network device establish a secure tunnel by using $K_{IAB}$.

Based on the embodiment shown in FIG. 24, when the secondary base station serves as an IAB donor, the secondary base station generates $K_{IAB}$ by using the secondary base station key, and the IAB node generates $K_{IAB}$ by using the secondary base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 2: A first device (namely, an IAB node) registers with a network by using a first access network device that does not have an IAB donor function. Then, the first access network device selects, for the first device, a second access network device having the IAB donor function as a secondary base station. A second device is responsible for assigning an IP address of the IAB node to the first device.

Figure 25:
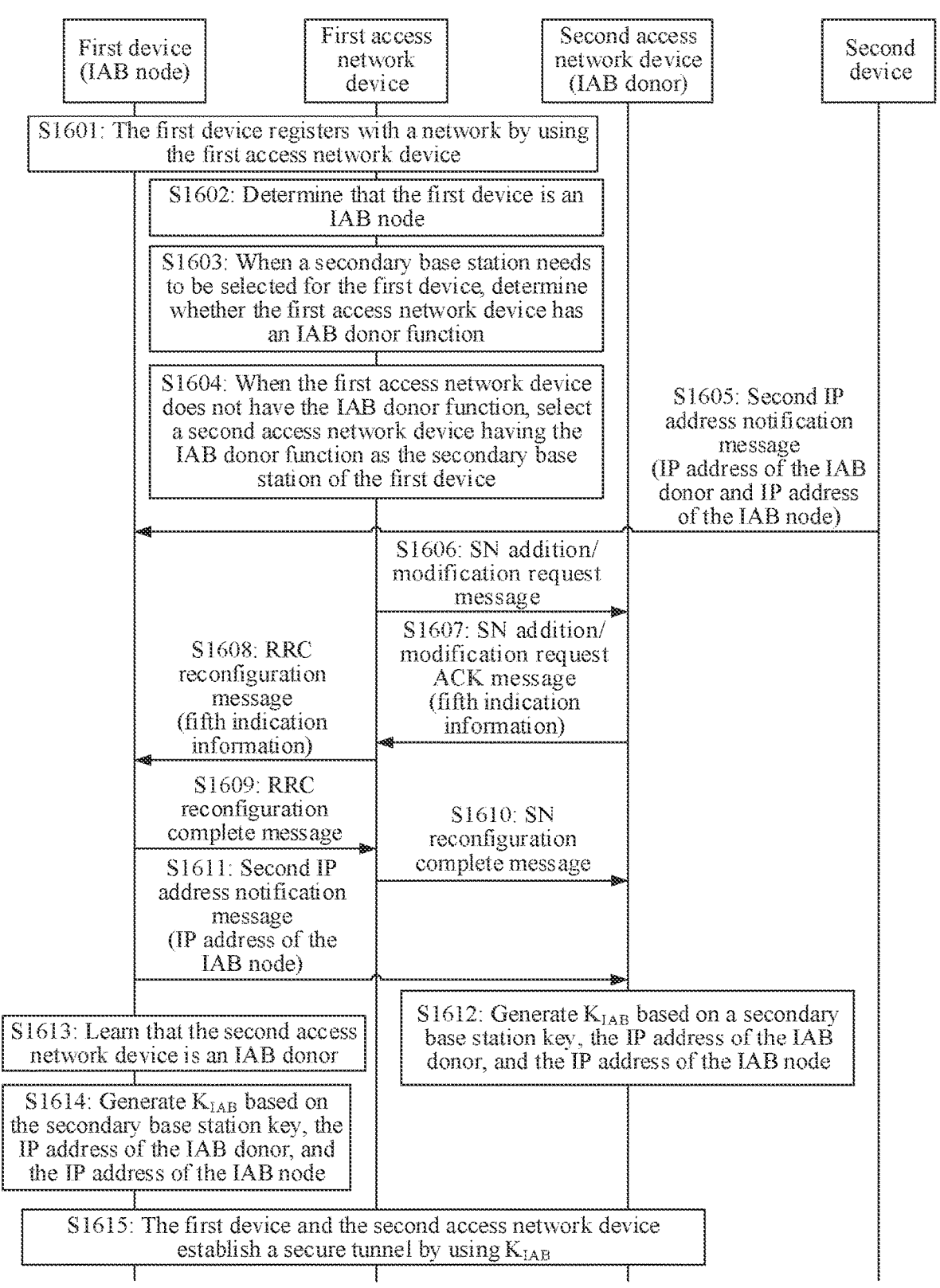
FIG. 25 is a flowchart of another key generation method according to an embodiment of this application.

Based on Scenario 2, FIG. 25 shows a key generation method according to an embodiment of this application. The method includes the following steps.

S1601 to S1612 are similar to steps S1001 to S1012. For specific descriptions thereof, refer to the embodiment shown in FIG. 19. Details are not described herein again.

Optionally, different from step S1007, in step S1607, the SN addition/modification request ACK message sent by the second access network device may include fifth indication information.

Optionally, different from step S1008, in step S1608, the RRC reconfiguration message sent by the first access network device may include fifth indication information, so that the first device learns that the secondary base station (namely, the second access network device) is an IAB donor.

S1613: The first device learns that the second access network device is an IAB donor.

S1614: The first device generates $K_{IAB}$ based on the secondary base station key, the IP address of the IAB donor, and the IP address of the IAB node.

S1615: The first device and the second access network device establish a secure tunnel by using $K_{IAB}$.

Based on the embodiment shown in FIG. 25, when the secondary base station serves as an IAB donor, the secondary base station generates $K_{IAB}$ by using the secondary base station key, and the IAB node generates $K_{IAB}$ by using the secondary base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 3: A first device (namely, an IAB node) registers with a network by using a first access network device having an IAB donor function. Therefore, the first access network device serves as an IAB donor of the first device, and the first access network device assigned an IP address of the IAB node to the first device. The first access network device selects a third access network device as a secondary base station for the first device.

Figure 26:
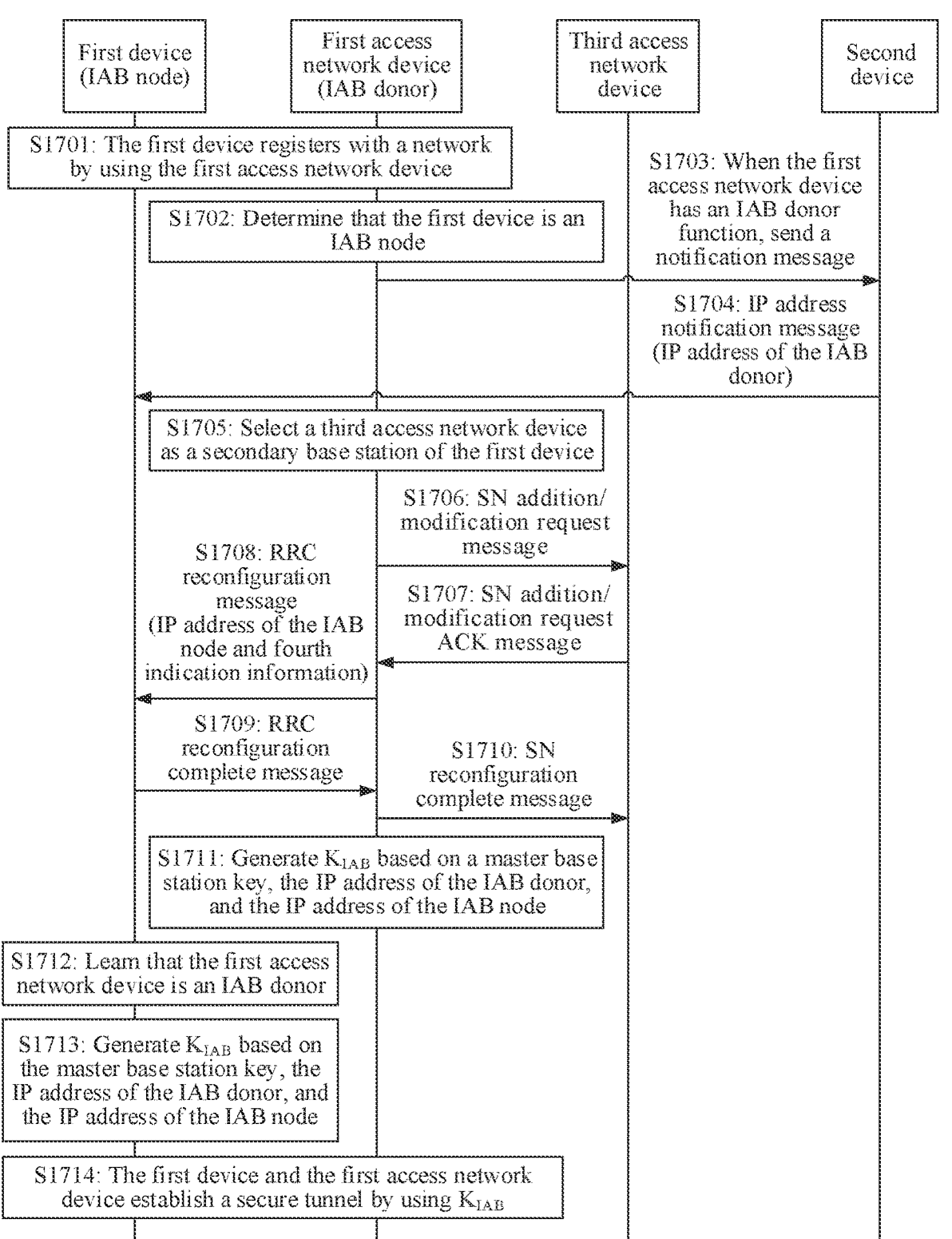
FIG. 26 is a flowchart of another key generation method according to an embodiment of this application.

Based on Scenario 3, FIG. 26 shows a key generation method according to an embodiment of this application. The method includes the following steps.

S1701 to S1711 are similar to steps S501 to S511. For specific descriptions thereof, refer to the embodiment shown in FIG. 14. Details are not described herein again.

Optionally, different from step S508, in step S1708, the RRC reconfiguration message sent by the first access network device may include fourth indication information, so that the first device learns that a master base station (namely, the first access network device) is an IAB donor.

S1712: The first device determines that the first access network device is an IAB donor.

S1713: The first device generates $K_{IAB}$ based on the master base station key, the IP address of the IAB donor, and the IP address of the IAB node.

S1714: The first device and the first access network device establish a secure tunnel by using $K_{IAB}$.

Based on the embodiment shown in FIG. 26, when the master base station serves as an IAB donor, both the master base station and the IAB node generate $K_{IAB}$ by using the master base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

Scenario 4: A first device (namely, an IAB node) registers with a network by using a first access network device having an IAB donor function. Therefore, the first access network device serves as an IAB donor of the first device. The first access network device selects a third access network device as a secondary base station for the first device. A second device is responsible for assigning an IP address of the IAB node to the first device.

Figure 27:
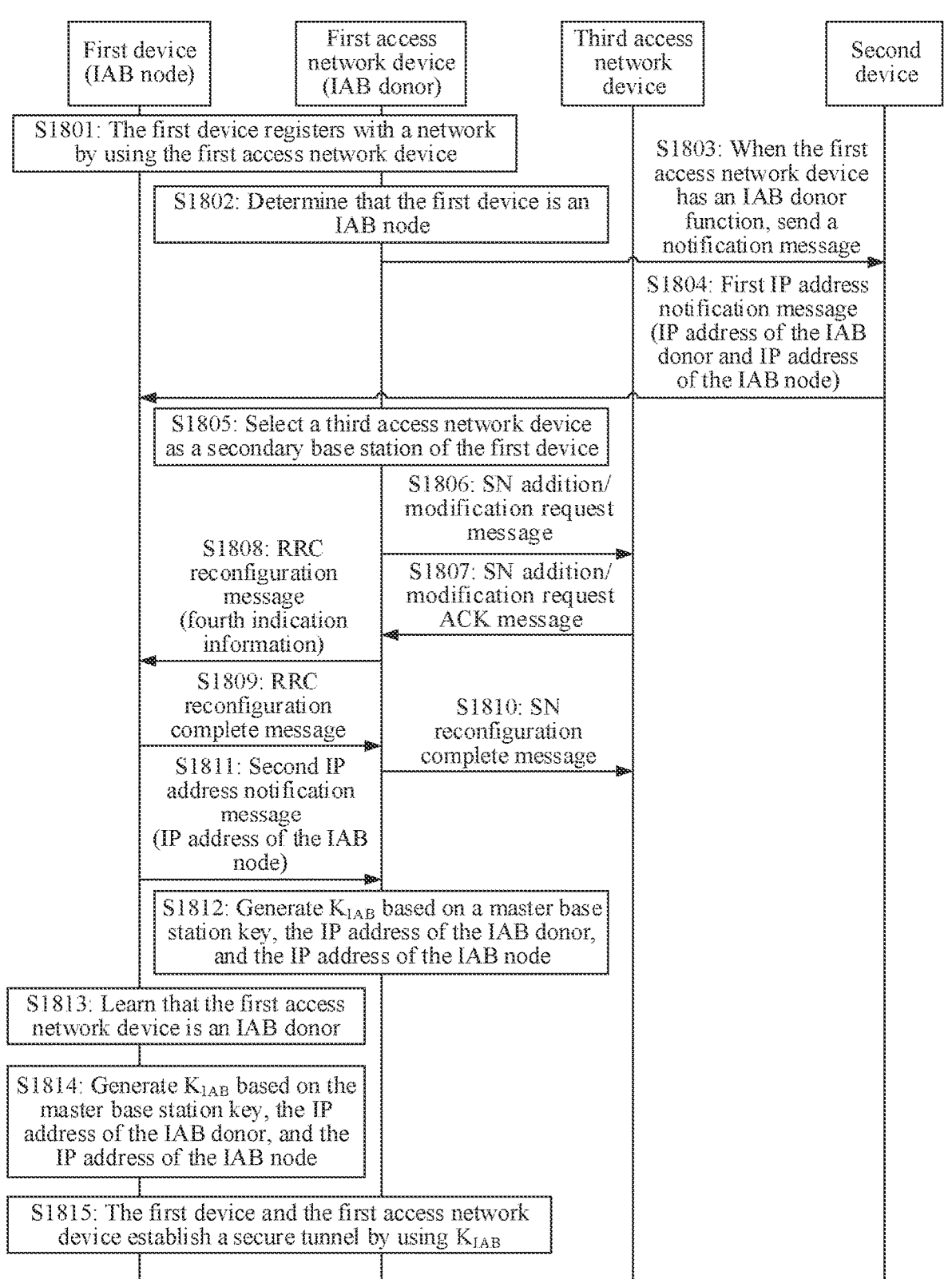
FIG. 27 is a flowchart of another key generation method according to an embodiment of this application.

Based on Scenario 4, FIG. 27 shows a key generation method according to an embodiment of this application. The method includes the following steps.

S1801 to S1812 are similar to steps S601 to S612. For specific descriptions thereof, refer to the embodiment shown in FIG. 15. Details are not described herein again.

Optionally, different from step S608, in step S1808, the RRC reconfiguration message sent by the first access network device may include fourth indication information, so that the first device learns that a master base station (namely, the first access network device) is an IAB donor.

S1813: The first device learns that the first access network device is an IAB donor.

S1814: The first device generates $K_{IAB}$ based on the master base station key, the IP address of the IAB donor, and the IP address of the IAB node.

S1815: The first device and the first access network device establish a secure tunnel by using $K_{IAB}$.

Based on the embodiment shown in FIG. 27, when the master base station serves as an IAB donor, both the master base station and the IAB node generate $K_{IAB}$ by using the master base station key. In this way, the IAB node and the IAB donor maintain the same $K_{IAB}$, so that the secure tunnel is established between the IAB node and the IAB donor based on $K_{IAB}$, thereby facilitating networking performed by the IAB node in a dual connectivity manner.

The foregoing mainly describes the solutions provided in embodiments of this application from the perspective of the methods. It may be understood that, to implement the foregoing functions, a communication apparatus (for example, the first device, the first access network device, and the second access network device) includes corresponding hardware structures and/or software modules for performing the functions. With reference to the units and algorithm steps described in the embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions of embodiments of this application.

In embodiments of this application, the communication apparatus may be divided into function units based on the foregoing method examples. For example, the function units may be obtained through division based on corresponding functions, or two or more functions may be integrated into one processing unit. The integrated unit may be implemented in a form of hardware, or may be implemented in a form of a software function unit. It should be noted that unit division in embodiments of this application is an example, and is merely logical function division. In actual implementation, there may be another division manner.

Figure 28:
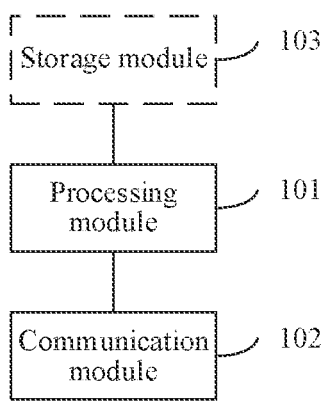
FIG. 28 is a schematic diagram of a structure of a communication apparatus according to an embodiment of this application.

FIG. 28 shows a communication apparatus according to an embodiment of this application. The communication apparatus includes a processing module 101 and a communication module 102.

In a possible example, the communication apparatus is an IAB node. The processing module 101 is configured to support the IAB node in performing steps S201 and S202 in FIG. 11, steps S801 to S805 in FIG. 17, steps S1301 to S1303 in FIG. 22, and/or another processing operation that needs to be performed by the IAB node in embodiments of this application. The communication module 102 is configured to support the IAB node in performing steps S308, S309, and S311 in FIG. 12A and FIG. 12B, steps S405, S408, S409, and S411 in FIG. 13A and FIG. 13B, and/or another communication operation that needs to be performed by the IAB node in embodiments of this application.

In another possible example, the communication apparatus is a first access network device. The processing module 101 is configured to support the first access network device in performing steps S101 to S105 and S107 to S109 in FIG. 10, steps S701 to S703, S706, and S707 in FIG. 16, steps S1401 to S1403, S1406, and S1407 in FIG. 23, and/or another processing operation that needs to be performed by the first access network device in embodiments of this application. The communication module 102 is configured to support the first access network device in performing step S106 in FIG. 10, step S704 in FIG. 16, step S1404 in FIG. 23, and/or another communication operation that needs to be performed by the first access network device in embodiments of this application.

In another possible example, the communication apparatus is a second access network device. The processing module 101 is configured to support the second access network device in performing step S705 in FIG. 16, step S1405 in FIG. 23, and/or another processing operation that needs to be performed by the second access network device in embodiments of this application. The communication module 102 is configured to support the second access network device in performing step S106 in FIG. 10, step S704 in FIG. 16, step S1404 in FIG. 23, and/or another communication operation that needs to be performed by the second access network device in embodiments of this application.

Optionally, the communication apparatus may further include a storage module 103, configured to store program code and data of the communication apparatus. The data may include but is not limited to original data, intermediate data, or the like.

The processing module 101 may be a processor or a controller. For example, the processing module 101 may be a CPU, a general-purpose processor, an application-specific integrated circuit (application specific integrated circuit, ASIC), a field programmable gate array (field programmable gate array, FPGA), another programmable logic device, a transistor logic device, a hardware component, or any combination thereof. The processing module may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The communication module 102 may be a communication interface, a transceiver, a transceiver circuit, or the like. The communication interface is a general name. In specific implementation, the communication interface may include a plurality of interfaces, for example, may include an interface between a base station and a terminal and/or another interface.

The storage module 103 may be a memory.

Figure 29:
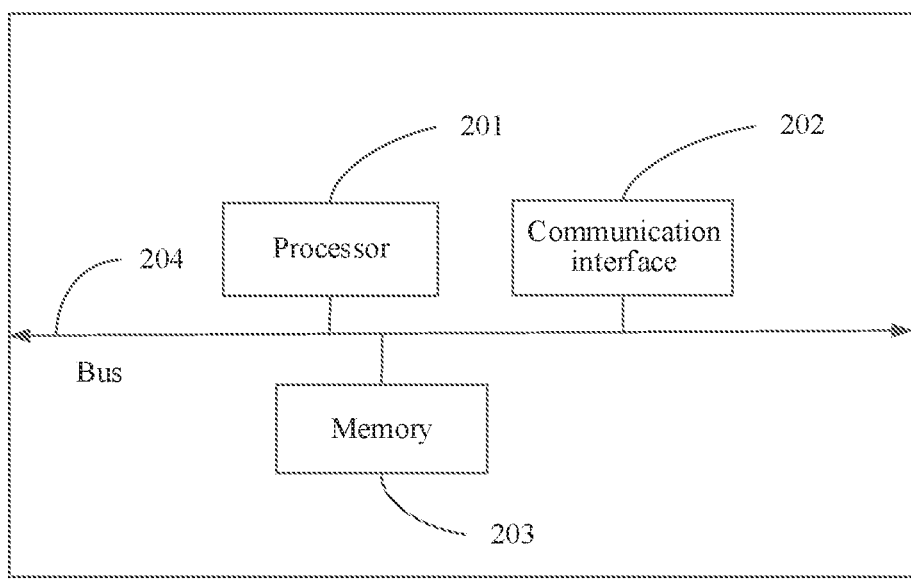
FIG. 29 is a schematic diagram of a hardware structure of a communication apparatus according to an embodiment of this application.

When the processing module 101 is a processor, the communication module 102 is a communication interface, and the storage module 103 is a memory, the communication apparatus in this embodiment of this application may be shown in FIG. 29.

As shown in FIG. 29, the communication apparatus includes a processor 201, a communication interface 202, and a memory 203. Optionally, the communication apparatus may further include a bus 204. The communication interface 202, the processor 201, and the memory 203 may be connected to each other through the bus 204. The bus 204 may be a peripheral component interconnect (peripheral component interconnect, PCI) bus, an extended industry standard architecture (extended industry standard architecture, EISA) bus, or the like. The bus 204 may be classified into an address bus, a data bus, a control bus, and the like. For ease of representation, only one thick line is used for representation in FIG. 29. However, it does not mean that there is only one bus or only one type of bus.

Optionally, an embodiment of this application further provides a computer program product carrying computer instructions. When the computer instructions are run on a computer, the computer is enabled to perform the methods described in the foregoing embodiments.

Optionally, an embodiment of this application further provides a computer-readable storage medium. The computer-readable storage medium stores computer instructions. When the computer instructions are run on a computer, the computer is enabled to perform the methods described in the foregoing embodiments.

Optionally, an embodiment of this application further provides a chip, including a processing circuit and a transceiver pin. The processing circuit and the transceiver pin are configured to implement the methods described in the foregoing embodiments. The processing circuit is configured to perform a processing action in a corresponding method, and the transceiver pin is configured to perform a receiving/sending action in the corresponding method.

A person of ordinary skill in the art may understand that all or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (Digital Video Disc, DVD)), a semiconductor medium (for example, a solid state disk (Solid State Disk, SSD)), or the like.

In the embodiments provided in this application, it should be understood that the disclosed system, apparatus, and method may be implemented in other manners. For example, the described apparatus embodiments are merely examples. For example, the unit division is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, and may be located in one position, or may be distributed on a plurality of devices. Some or all of the units may be selected based on actual requirements to achieve the objectives of the solutions of the embodiments.

In addition, function units in embodiments of this application may be integrated into one processing unit, or each of the function units may exist alone physically, or two or more units may be integrated into one unit. The integrated unit may be implemented in a form of hardware, or may be implemented in a form of hardware and a software function unit.

Based on the foregoing descriptions of the implementations, a person skilled in the art may clearly understand that this application may be implemented by software in addition to necessary universal hardware or by hardware. In most circumstances, the former is a preferred implementation. Based on such an understanding, the technical solutions in this application essentially or the part contributing to the conventional technology may be implemented in a form of a software product. The computer software product is stored in a readable storage medium, for example, a floppy disk, a hard disk, or an optical disc of a computer, and includes several instructions for instructing a computer device (which may be a personal computer, a server, a network device, or the like) to perform the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A key generation method, comprising:
determining, by a communication apparatus, that a master base station or a secondary base station serves as an integrated access and backhaul (IAB) donor, wherein the master base station and the secondary base station are connected to an IAB node, wherein the communication apparatus is the IAB node or a component of the IAB node; and
performing at least one of following:
in response to that the communication apparatus determines that the master base station serves as the IAB donor, generating, by the communication apparatus and based on a master base station key, an IAB key for a secure tunnel between the IAB node and the IAB donor; or
in response to that the communication apparatus determines that the secondary base station serves as the IAB donor, generating, by the communication apparatus and based on a secondary base station key, the IAB key for the secure tunnel between the IAB node and the IAB donor.

2. The method according to claim 1, wherein the determining, by the communication apparatus, that the master base station or the secondary base station serves as an IAB donor comprises:
receiving, by the communication apparatus, fourth indication information from the master base station; and
determining, by the communication apparatus based on the fourth indication information, that the master base station serves as the IAB donor.

3. The method according to claim 2, wherein the fourth indication information is carried in a Radio Resource Control (RRC) reconfiguration message from the master base station.

4. The method according to claim 1, wherein the determining, by the communication apparatus, that the master base station or the secondary base station serves as an IAB donor comprises:
receiving, by the communication apparatus, fifth indication information from the secondary base station; and
determining, by the communication apparatus based on the fifth indication information, that the secondary base station serves as the IAB donor.

5. The method according to claim 1, further comprising:

establishing, by the communication apparatus based on the IAB key, the secure tunnel between the IAB node and the IAB donor.

6. The method according to claim 1, wherein the master base station key is for performing security protection on communication between the master base station and the IAB node.

7. The method according to claim 1, wherein the secondary base station key is for performing security protection on communication between the secondary base station and the IAB node.

8. The method according to claim 1, wherein both the master base station and the secondary base station are 5th generation 5G base stations.

9. The method according to claim 1, wherein the master base station key is generated in a process in which the IAB node registers with a network through the master base station.

10. The method according to claim 1, wherein, the secondary base station key is generated by the communication apparatus based on the master base station key.

11. A communication apparatus, comprising:

at least one processor, configured to execute instructions to cause the communication apparatus to perform operations comprising:

determining that a master base station or a secondary base station serves as an integrated access and backhaul (IAB) donor, wherein the master base station and the secondary base station are connected to an IAB node, wherein the communication apparatus is the IAB node or a component of the IAB node; and performing at least one of following:

in response to determining that the master base station serves as the IAB donor, generating, based on a master base station key, an IAB key for a secure tunnel between the IAB node and the IAB donor; or in response to determining that the secondary base station serves as the IAB donor, generating, based on a secondary base station key, the IAB key for the secure tunnel between the IAB node and the IAB donor.

12. The communication apparatus according to claim 11, wherein the determining that the master base station or the secondary base station serves as an IAB donor comprises:

receiving fourth indication information from the master base station; and determining, based on the fourth indication information, that the master base station serves as the IAB donor.

13. The communication apparatus according to claim 12, wherein the fourth indication information is carried in a Radio Resource Control (RRC) reconfiguration message from the master base station.

14. The communication apparatus according to claim 11, wherein the determining that the master base station or the secondary base station serves as an IAB donor comprises:

receiving fifth indication information from the secondary base station; and determining, based on the fifth indication information, that the secondary base station serves as the IAB donor.

15. The communication apparatus according to claim 11, wherein the operations further comprise:

establishing, based on the IAB key, the secure tunnel between the IAB node and the IAB donor.

16. The communication apparatus according to claim 11, wherein the master base station key is for performing security protection on communication between the master base station and the IAB node.

17. The communication apparatus according to claim 11, wherein the secondary base station key is for performing security protection on communication between the secondary base station and the IAB node.

18. The communication apparatus according to claim 11, wherein both the master base station and the secondary base station are 5th generation 5G base stations.

19. One or more non-transitory computer-readable media storing computer instructions, that when executed by one or more processors, cause an integrated access and backhaul (IAB) node or a component in the IAB node to perform operations comprising:

determining that a master base station or a secondary base station serves as an IAB donor, wherein the master base station and the secondary base station are connected to the IAB node; and performing at least one of following:

in response to determining that the master base station serves as the IAB donor, generating, based on a master base station key, an IAB key for a secure tunnel between the IAB node and the IAB donor; or in response to determining that the secondary base station serves as the IAB donor, generating, based on a secondary base station key, the IAB key for the secure tunnel between the IAB node and the IAB donor.

20. The one or more non-transitory computer-readable media according to claim 19, wherein the determining that the master base station or the secondary base station serves as an IAB donor comprises:

receiving fourth indication information from the master base station; and determining, based on the fourth indication information, that the master base station serves as the IAB donor.

21. The one or more non-transitory computer-readable media according to claim 20, wherein the fourth indication information is carried in a Radio Resource Control (RRC) reconfiguration message from the master base station.

22. The one or more non-transitory computer-readable media according to claim 19, wherein the determining that the master base station or the secondary base station serves as an IAB donor comprises:

receiving fifth indication information from the secondary base station; and determining, based on the fifth indication information, that the secondary base station serves as the LAB donor.

* * * * *